(12) United States Patent
Johnson

(10) Patent No.: US 8,121,904 B2
(45) Date of Patent: **\*Feb. 21, 2012**

(54) ELECTRONIC PROPOSAL PREPARATION SYSTEM

(75) Inventor: Jerome D. Johnson, North Mankato, MN (US)

(73) Assignee: Clear With Computers, LLC, Indian Wells, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/577,194

(22) Filed: Oct. 11, 2009

(65) Prior Publication Data

US 2010/0030665 A1     Feb. 4, 2010

Related U.S. Application Data

(63) Continuation of application No. 09/566,029, filed on May 8, 2000, now Pat. No. 7,606,739, which is a continuation of application No. 08/823,534, filed on Mar. 24, 1997, now abandoned, which is a continuation of application No. 08/596,575, filed on Feb. 5, 1996, now Pat. No. 5,615,342, which is a continuation of application No. 07/878,602, filed on May 5, 1992, now Pat. No. 5,493,490.

(51) Int. Cl.
    *G06Q 30/00*      (2006.01)
(52) U.S. Cl. .................................... 705/26.5; 705/27.1
(58) Field of Classification Search ............... 705/26–27
See application file for complete search history.

(56) References Cited

U.S. PATENT DOCUMENTS

| | | |
|---|---|---|
| 3,265,891 A | 8/1966 | Games |
| 3,757,037 A | 9/1973 | Bialek |
| 3,949,159 A | 4/1976 | Ricards et al. |
| 4,134,537 A | 1/1979 | Glaser et al. |
| 4,149,246 A | 4/1979 | Goldman |
| 4,186,438 A | 1/1980 | Benson et al. |
| 4,258,478 A | 3/1981 | Scott et al. |
| 4,261,012 A | 4/1981 | Maloomian |

(Continued)

FOREIGN PATENT DOCUMENTS

DE     3426818 A1    1/1986

(Continued)

OTHER PUBLICATIONS

Tilden, Scott; "Harnessing DTP," Direct Marketing, Jan 1988, p. 50, Proquest #337018, 4pgs.*

(Continued)

*Primary Examiner* — Robert M. Pond
(74) *Attorney, Agent, or Firm* — Hershkovitz & Associates LLC; Abraham Hershkovitz

(57) ABSTRACT

An electronic system for creating customized product proposals stores a plurality of pictures and text segments to be used as building blocks in creating the proposal. The pictures may include various products, environments in which the products may be used, and available product options. The text segments may include textual descriptions of the product, environments in which the product may be used, and its performance specifications. The system queries a user to determine a customer's needs and interests. Based upon the answers to the queries, the system selects the appropriate picture and text building blocks to fill in proposal templates. The system can print the completed proposal templates to provide the user with a customized, printed proposal that describes features and benefits of a product, in a particular environment, that are of interest to the customer who is to receive the proposal.

40 Claims, 43 Drawing Sheets

U.S. PATENT DOCUMENTS

| | | | |
|---|---|---|---|
| 4,297,724 A | | 10/1981 | Masuda et al. |
| 4,359,631 A | | 11/1982 | Lockwood et al. |
| 4,449,186 A | * | 5/1984 | Kelly et al. ................... 705/5 |
| 4,486,774 A | | 12/1984 | Maloomian |
| 4,539,585 A | | 9/1985 | Spackova et al. |
| 4,546,434 A | | 10/1985 | Gioello |
| 4,553,206 A | | 11/1985 | Smutek et al. |
| 4,553,222 A | | 11/1985 | Kurland et al. |
| 4,567,359 A | * | 1/1986 | Lockwood ................ 235/381 |
| 4,591,983 A | | 5/1986 | Bennett et al. |
| 4,605,294 A | | 8/1986 | Bourdier et al. |
| 4,670,798 A | | 6/1987 | Campbell et al. |
| 4,706,212 A | | 11/1987 | Toma |
| 4,730,260 A | | 3/1988 | Mori et al. |
| 4,731,743 A | | 3/1988 | Blancato |
| 4,763,356 A | | 8/1988 | Day, Jr. et al. |
| 4,775,935 A | | 10/1988 | Yourick |
| 4,845,641 A | | 7/1989 | Ninomiya et al. |
| 4,860,123 A | | 8/1989 | McCalley et al. |
| 4,863,384 A | | 9/1989 | Slade |
| 4,896,791 A | | 1/1990 | Smith |
| 4,899,292 A | | 2/1990 | Montagna et al. |
| 4,899,299 A | | 2/1990 | MacPhail |
| 4,905,094 A | | 2/1990 | Pocock et al. |
| 4,926,325 A | | 5/1990 | Benton et al. |
| 4,931,929 A | | 6/1990 | Sherman |
| 4,947,028 A | | 8/1990 | Gorog |
| 4,972,318 A | | 11/1990 | Brown et al. |
| 4,982,346 A | | 1/1991 | Girouard et al. |
| 4,992,939 A | | 2/1991 | Tyler |
| 4,992,940 A | | 2/1991 | Dworkin |
| 5,041,972 A | | 8/1991 | Frost |
| 5,047,918 A | | 9/1991 | Schwartz et al. |
| 5,053,956 A | * | 10/1991 | Donald et al. ................ 713/601 |
| 5,056,029 A | | 10/1991 | Cannon |
| 5,072,536 A | | 12/1991 | Matthews et al. |
| 5,099,422 A | | 3/1992 | Foresman et al. |
| 5,111,392 A | | 5/1992 | Malin |
| 5,117,354 A | | 5/1992 | Long et al. |
| 5,142,662 A | | 8/1992 | Gump et al. |
| 5,146,404 A | | 9/1992 | Calloway et al. |
| 5,206,804 A | | 4/1993 | Thies et al. |
| 5,212,634 A | | 5/1993 | Washizaki et al. |
| 5,216,594 A | | 6/1993 | White et al. |
| 5,235,680 A | | 8/1993 | Bijnagte |
| 5,237,157 A | | 8/1993 | Kaplan |
| 5,241,464 A | | 8/1993 | Greulich et al. |
| 5,241,671 A | | 8/1993 | Reed et al. |
| 5,255,207 A | | 10/1993 | Cornwell |
| 5,272,623 A | | 12/1993 | Grubb et al. |
| 5,309,355 A | * | 5/1994 | Lockwood ................ 705/6 |
| 5,319,542 A | | 6/1994 | King, Jr. et al. |
| 5,343,386 A | | 8/1994 | Barber |
| 5,383,111 A | | 1/1995 | Homma et al. |
| 5,392,220 A | | 2/1995 | van den Hamer et al. |
| 5,396,417 A | | 3/1995 | Burks et al. |
| 5,432,904 A | | 7/1995 | Wong |
| 5,493,490 A | | 2/1996 | Johnson |
| 5,504,674 A | | 4/1996 | Chen et al. |
| 5,528,490 A | | 6/1996 | Hill |
| 5,576,951 A | | 11/1996 | Lockwood |
| 5,608,638 A | | 3/1997 | Tain et al. |
| 5,615,342 A | | 3/1997 | Johnson |
| 5,625,776 A | | 4/1997 | Johnson |
| 5,649,216 A | | 7/1997 | Sieber |
| 5,758,331 A | | 5/1998 | Johnson |
| 5,970,471 A | | 10/1999 | Hill |
| 5,993,048 A | | 11/1999 | Banks et al. |
| 6,067,525 A | | 5/2000 | Johnson et al. |
| 6,357,036 B1 | | 3/2002 | Eka et al. |
| 6,453,302 B1 | | 9/2002 | Johnson et al. |
| 6,550,057 B1 | | 4/2003 | Bowman-Amuah |
| 6,571,282 B1 | | 5/2003 | Bowman-Amuah |
| 6,578,068 B1 | | 6/2003 | Bowman-Amuah |
| 6,601,192 B1 | | 7/2003 | Bowman-Amuah |
| 6,601,234 B1 | | 7/2003 | Bowman-Amuah |
| 6,606,660 B1 | | 8/2003 | Bowman-Amuah |
| 6,615,199 B1 | | 9/2003 | Bowman-Amuah |
| 6,640,145 B2 | | 10/2003 | Hoffberg et al. |
| 6,640,244 B1 | | 10/2003 | Bowman-Amuah |
| 6,640,249 B1 | | 10/2003 | Bowman-Amuah |
| 6,850,252 B1 | | 2/2005 | Hoffberg |

FOREIGN PATENT DOCUMENTS

| | | |
|---|---|---|
| DE | 3609933 A1 | 10/1987 |
| EP | 0 194 167 B1 | 9/1986 |
| EP | 0 302 843 | 2/1989 |
| EP | 0 302 843 A1 | 2/1989 |
| EP | 0 325 564 A1 | 7/1989 |
| EP | 0 344 976 | 12/1989 |
| EP | 0 404 541 A2 | 12/1990 |
| EP | 0 477 152 A2 | 3/1992 |
| GB | 2 105 075 | 4/1982 |
| GB | 2 177 245 | 1/1987 |
| GB | 2 177 245 A | 1/1987 |
| GB | 2 201 017 | 8/1988 |
| GB | 2 202 264 | 9/1988 |
| GB | 2 224 380 | 5/1990 |
| GB | 2 224 970 | 5/1990 |
| GB | 2 243 970 | 11/1991 |
| JP | 62-206671 | 9/1987 |
| JP | 63-068061 | 3/1988 |
| JP | 63-189974 | 10/1988 |
| JP | 2-018669 | 1/1990 |
| JP | 2-019897 | 1/1990 |
| JP | 2-268369 | 11/1990 |
| JP | 2-276657 | 11/1990 |
| JP | 3-139768 | 6/1991 |
| JP | 3-228781 | 10/1991 |
| JP | 3-265891 | 11/1991 |
| WO | 8 503 152 | 7/1985 |
| WO | WO 89/0318 | 1/1989 |
| WO | WO 89/11235 | 11/1989 |
| WO | WO 91/17676 | 11/1991 |

OTHER PUBLICATIONS

*20-20 Computerized Kitchen Design, Operations Guide*, MKS Compu-Group, Inc., 1989, pp. 1-355 (3 copies).

*ADP Parts Station*, Author: unknown; Automatic Data Processing, Inc., 1988; pp. 1-5.

Advanced Marketing Technology Group, *Express Shop USA—Electronic Merchandising Systems Brochure*, Amtech, Sep. 23, 1985; pp. 1-5.

Anzovin, *Exploring Hypercard*, Compute! Books, 1988; pp. 107-183.

Baker, *dBase III Plus Advanced Applications for Nonprogrammers*, McGraw Hill Educ. Group, 1987; pp. 1-96 (2 copies).

Bell & Howell Publication Systems Company, Inc. *PAIS User's Manual*, Bell & Howell Publication Systems Company, Inc., 1988, revised Apr. 6, 1990; pp. 1-150.

Brooks, Cal, *The Silent Type*, Babcox Publications, Inc., Jun. 1984, pp. 14-16.

Brooks,*Catalog Creature*, Counterman, Sep. 1985, pp. 1-10.

Chrysler Corporation et al.,*D.I.A.L. Vehicle Order Entry (VOE) Training Installation Procedure*, Chrysler Corporation, 1984; pp. 1-70 (3 copies).

*Buick Slide Show*, Author: unknown; Publisher: unknown; Date: unknown; pp. 1-45.

Castro et al., *Chapter Nine: Database Design, Advanced Programmers Guide*, Ashton-Tate; 1985; pp. 103-110 (2 copies).

Clear With Computers, Inc., *PACCAR—Prospector 1989 Business Plan*, Clear With Computers, Inc., Mar. 20, 1989.

Clear With Computers, Inc., *Truck Force Tools User's Guide*, Clear With Computers, Inc., Mar. 5, 1992; pp. 1-233.

Comsell, Inc., *Comsell Realty Showcase Sales Brochure*, Comsell, Inc., 1984; pp. 1-6.

*Creative Presentation System*, Article, Author: unknown; Publisher: unknown; Date: unknown; 1 page.

Creative Technologies Corporation, *iPOP Sales Brochure*, Creative Technologies Corporation, Mar. 5, 1992.

Cycom Corporation, The Motorcycle Dealership Hardware Package from Cycom Corporation, Cycle Computer Systems, Date: unknown; pp. 1-4.

Defendant Hyundai's Preliminary Invalidity Contentions of *Orion IP, LLC v. Mercedes-Benz USA, LLC et al.*, civil action No. 6:05-CV322-LED, pending in the U.S. District Court for the Eastern District of Texas, Tyler Division, filed May 5, 2006, pp. 1-92.

Defendants' Joint Invalidity Contentions *Orion IP, LLC v. Xerox et al.*, civil action No. 6:07-cv-138LED, pending in the U.S. District Court for the Eastern District of Texas, Tyler Division, filed Mar. 27, 2008, pp. 1-43.

Dega Technology, Inc., *Dega-View 1000*, Article, Dega Technology, Inc., 1989; pp. 1-6 (2 copies).

Dega Technology, Inc., *Dega-View 1000, v. 2.0, Manuals—Honda*, Dega Technology, Inc., Aug. 2, 1989; pp. 1-13.

Dega Technology, Inc., *Dega-View 1000, v. 2.02, Manuals—Honda*, Dega Technology, Inc., Sep. 1, 1989; pp. 1-88.

Diann Merit & Lynn Griggs, *Triad Manual*, Steve MacDonald, 1987.

Ford Motor Company, *Ford Selection Center*, Ford Motor Company, Date: unknown; pp. 1-55.

Hollander Computer Systems, Inc., *Pre-Install Manual*, Hollander Systems, Inc., Revised May 31, 1988; pp. 1-154.

Irving, *Imagedisks Combine Digital Data & Optical Images on One Medium*, Computer Technology Review, 1982, pp. 1-6.

Jay et al., *Advanced Programming Guide*, Ashton-Tate Publishing, 1985.

*Lexus Electronic Parts Catalog*, Author: unknown; Publisher: unknown; Date: unknown; pp. 1-16.

Matheny et al., *Ordering Parts via Videodisc and Computer*, E-ITV, Jun. 1984; pp. 33-35.

Merit et al., *Triad Electronic Catalog*, Triad Systems Corporation, 1987-1989; pp. 1-47.

Mitsubishi, *Mitsubishi Build Your Own System*, Mitsubishi, 1989.

Miyaoka et al, *Vision and Image Processing Application Technology*, Journal of the Institute of Electronics, Information, and Communication Engineers, Apr. 1991, vol. 74, No. 4; pp. 392-397.

Motro, *Baroque, a Browser for Relational Databases*, ACM on Transactions on Office Information Systems, Apr. 1986; pp. 164-181 (2 copies).

Peterson, *Electronic Cataloging: Tomorrow's Technology Aids Today's Counterman*, Babcox Publications, Inc., Jan. 1987, pp. 34-41 (2 copies).

Plaintiff Hyundai's Invalidity Contentions of *Hyundai Motor America, Inc. v. Clear With Computers, LLC,* civil action No. 6:08-CV-302-LED, pending in the U.S. District Court for the Eastern District of Texas, Tyler Division, filed Feb. 5, 2009, pp. 164.

Poulsen, *Computer Update*, Babcox Publications, Inc., Nov. 1987, pp. 4-5.

Poulsen, *Computer Wars*, Babcox Publications, Inc., Apr. 1987, pp. 4-5.

*Read Me First Manual disclosing CASS Parts*, Author: unknown; Clear With Computers, Inc., Jun. 1988; pp. 1-13.

*Read Me First Manual disclosing CASS Program*, Author: unknown; Clear With Computers, Inc., Apr. 1988; pp. 1-15 (2 copies).

*Reynolds Announces New Products that Make the Productivity and Profitability of Automobile Dealerships*, Author: unknown; PR Newswire Association, Inc., Jan. 30, 1987; pp. 1-2.

*Reynolds Introduces EPC to Speed Manufactures Information Retrieval*, Visions, Mar./Apr. 1987; pp. 1-6.

Sakuma, *Automobile Parts—Image Retrieval System Using a Personal Computer and a CD ROM—The Case of Nissan Motor Company, Ltd.*, Nissan Motor Company, Ltd., Apr. 1989; pp. 1-14 (2 copies).

SoftAd, *SoftAd Software*, SoftAd, 1986.

The Ford Motor Company, *The Ford Simulator*, The SoftAd Group, Inc.,1986-1987; pp. 1-25.

Toyota Motor Corporation, *Electronic Parts Catalog*, Toyota Motor Sales U.S.A., Inc., Jul. 8, 1988; pp. 1-38.

Toyota Motor Corporation, *Toyota Parts* (Japanese), Toyota Motor Corporation; v.4,1984; pp. 1-5.

Toyota Motor Corporation, *Toyota UOE Implementation*, Toyota Motor Corporation Date: unknown; pp. 1-16.

Toyota, *Easy Lookup of Supply Parts, An Electronic Catalog for Toyota Setting Up at 1400 Stores*, Nikkei Sangyo Shimbun, Jul. 9, 1988; pp. 1-8.

Toyota, *Electronic Catalog Developed for Toyota Supply*, Nikkei Jidousha Shimbun, Jul. 8, 1988; pp. 1-74.

Toyota, *Ordering Parts With a PC: Toyota Develops an Electronic Catalog*, Chunichi Shimbun, Jul. 8, 1988; 1 page.

Toyota, *Supply Parts Lookup Software*, Sikkan Kougyou Shimbun, Jul. 8, 1988; 1 page.

*Lookup Software Developed by Toyota*, Nippon Kougyou Shimbun, Jul. 8, 1988; pp. 1-2.

Toyota, *Supply Parts Lookups With Pictures, Electronic Catalog System Developed, Test Introduction for Suppliers*, Sikkan Kougyou Shimbun, Jul. 8, 1988; 1 page.

Toyota, *Toyota, Speeding Up Parts Supplies, Electronic Catalog System Developed*, Chubu Keizai Shimbun, Jul. 8, 1988; pp. 1-2.

*TRIAD Systems*, Author: unknown; Business Press Announces new computerized parts application catalog system, Business Wire, Inc., Mar. 5, 1984.

Triad Systems, Inc., *2 Minute Transaction*, Triad Systems, Inc., 1985; pp. 1-15.

Triad Systems, Inc., *Laser-Cat Electronic Catalog Video*, Triad Systems, Inc., 1988; pp. 1-4.

Triad Technical Publications Dept., *Triad Series 12 Electronic Catalog Manual Level 22*, Triad Systems, Apr. 1987.

Uchiyama et al., The New FM Series, *Fujitsu Journal*, vol. 15, No. 4, Special Ed., 1989; pp. 1-14 (2 copies).

Volkswagen AG, *German Publication*, Volkswagen AG, Nov. 1989, pp. 1-20.

Volkswagen AG, *German Publication*, KFZ, 1989, pp. 1-3.

Warehouse Distributor, *A Computer Guide for WDs & Jobbers*, Babcox Publications, Inc., Mar./ Apr. 1984, pp. 14-23.

Compass Startup Guide and Operator's Computer's, Inc. (CWC), 1991.

"GM Truck Compass, Read Me First, Operator's Manual", Clear With Computers (1991).

"Truck Force Tools Sales and Training System Operator's Manual, Ford Trucks", Clear With Computers (1992).

"Videodisc Product Search System Launched for Architects and Interior Designers", *Videodisc and Optical Disk*, vol. 5, No. 4, Jul./Aug. 1985, pp. 244-247.

"White GMC Volvo, TruckMatch Read Me First, TruckMatch," Clear With Computers (1990).

Computer Systems, Ltd., DesignWorks™/Schematic-Advanced Circuit Design Tools User's Guide by *Capilano Computing*, version 3.1.4, released Apr. 21, 1994.

EMIGH, Firm gives terminals role in Image Nets, *Network World*, v7n53/v8n1, Dec. 31 1990-Jan. 7, 1991 (Dialog file 15, acc. No. 00530779).

From http://usa.autodesk.com/, Autodesk-Press Room—Facts.

From http://www.amazon.com/, Amazon.com books search results (for related subject of "building blocks" from available libraries.

From http://www.cadence.com/products/analog_design.html, an analog design environment where building blocks are put together from a library.

From http://www.pspice.com/publications/, Spice Books—pspice.com design . . . , prior books about a similar concept as the pending invention.

From Internet archive Wayback Machine, http://web.archive.org/, searching pages of http://www.cadence.com/ & U http://www.microsim.com.

Gupta, Database Processing Power of PCs Can Drive Imaging Systems, *Computer Technology Review*, v9n16, pp. 85-86, published on Winter 1989 (Dialog file 15, ace. No. 00484476).

Herniter, Schematic capture with MicroSim Pspice, $2^{nd}$ ed., 1996, including several pages showing the components and th functional of an electronic proposal drawing from beginning to finishing.

Mehmood et al., "IDESS—An Integrated Design Automation System," Proceedings of the 1987 IEEE International Conference on Computer Design: VLSI in Computers & processors, Oct. 1987, pp. 407-412.

Schaff, "Dealing With Dealers," *Automotive News*, Nov. 21, 1988, p. 67.

Telzer, "The 'Silent Salesman,'" *Marketing Communications*, vol. 14, No. 5, May 1989, pp. 20-24.

"Touchcom™ Interactive Videodisc Catalog Markets Furniture at Dayton's", *Videodisc and Optical Disk*, vol. 5, No. 5, Sep./Oct. 1985, pp. 343-345.
*ADP Parts Station*, Author unknown; Automatic Data Processing, Inc., 1988; pp. 1-5.
Advanced Marketing Technology Corporation (AMTECH), *Media Coverage Highlights: Express Shop USA Electronic Merchandising System*, Advanced Marketing Technology Corporation, at least 1986; pp. 1-12.
AutoInfo, *AutoInfo Checkmate User's Manual*, AutoInfo, Date: unknown; pp. 1-240.
AutoInfo, *AutoInfo Computer Inventory System*, AutoInfo, as early as 1977; screen shot; pp. 1.
AutoInfo, *AutoInfo System A-4*, AutoInfo, as early as 1977; a screen shot, pp. 1.
AutoInfo, *Pre-Installation Book*, AutoInfo, 1988; pp. 1-50.
Automatic Data Processing (ADP), ADP Parts Station: The Fully Automated Parts Work Station, Automatic Data Processing, Inc., 1987, pp. 1-6.
Automatic Data Processing (ADP), *The Integrated Parts Department Onsite Computing Systems*, brochure, Automatic Data Processing, Inc., 1988, pp 1-19.
Barker et al., *Expert Systems for Configuration at Digital: XCON and Beyond*, Communications of the ACM, vol. 32, No. 3, Mar. 1989; pp. 298-315.
Bauman, *The Modem is the Message; newest interactive entry employs Mac graphics, targets consumers*, LookSmart, Jun. 1991, available at http://findarticles.com/p/articles/mi_m3815/is_n6_v3/ai_11303132/print on8/20/2005; pp. 1-2.
Bell & Howell Publication Systems Company, Inc., *PAIS User's Manual*, Bell & Howell Publication Systems Company, Inc., 1988, revised Apr. 6, 1990; pp. 1-151 (3 copies).
Bell & Howell, *IDB 2000 Handles Chrysler and GM Parts at 17-Line Auto Giant*, Bell & Howell Co., 1988, pp. 1-2.
Bell & Howell, *IDB 2000 Makes "Invincible" Partsman 1/3 Faster*, Bell & Howell Co., 1987; pp. 1-2.
Bell & Howell, *IDB 2000*, sales brochure, Bell & Howell Co., 1987; pp. 1-12.
Bell & Howell, *Memphis Parts Department Wades Free from a Sea of Paper with IDB2000*, Bell & Howell Co., 1987; pp. 1-2.
Bell & Howell, *New IDB 2000 Electronic System Boosts Service Flat Rate Hours*, Bell & Howell Co., 1987; pp. 1-2.
Bell & Howell, *New Illustrated Electronic Parts Catalog Speeds Look Ups*, Bell Howell, Date: unknown; pp. 1-3.
Bell & Howell, *Paper Catalog—IDB2000 System Benefit Comparison*, 1987; pp. 1-19.
Bell & Howell, *The Only Terminal You Need: The IDB 2000*, sales brochure, Bell & Howell, Co., 1988; pp. 1-6.
Bell & Howell, *Years of Experience Behind New IDB2000 Electronic Parts Catalog System*, Bell & Howell, Date: unknown; pp. 1-4.
Berger, What's New in Computerized Customer Service; No More Nasty Surprises in Hair-Dos and Makeup, *The New York Times*, Nov. 27, 1988, at F 11.
Berney, Customizing for Customer Service, *Nation's Business*, Mar. 1986, v.74, i.3, pp. 1-4.
Bluebird Systems, Bluebird Systems, *Warehouse Distributor News*, Mar./Apr. 1984; pp. 1-11.
Bodnar, The Months Ahead, *Changing Times*, Oct. 1987, v.41, i.10, pp. 7.
Brooks, *Catalog Creature*, Counterman, Sep. 1985, pp. 1-10.
Buick, *The 1988 Buick Dimension Quick Start Guide*, Buick, 1988; pp. 1-4.
Buick, the Buick Dimensiion User's Guide, Buick, Date: unknown; pp. 1-119.
Business Systems Development Corp., *Distributor Computer System*, Warehouse Distributor News, Mar./Apr. 1984, pp. 15.
Byles, Auto Parts Companies Term EDI Invaluable, *Journal of Commerce*, Apr. 14, 1988; pp. 1-2
Byvideo, Inc., *ByVideo Sales Terminal*, ByVideo, Inc., Date: unknown; pp. 1-19.
Cabinet Vision Inc., Cabinet Vision Face Frame System User's Manual, Cornewell Automation, 1985; pp. 1-139.
Cabinet Vision Inc., *Cabinet Vision User's Manual*, Cabinet Vision Inc., 1990; pp. 1-563.
Cableshare Inc., *Touch N' Shop Software: A Technical Overview*, Cableshare Inc., Date: unknown; pp. 1-9.
Cabnetware, *Cabnetware Product Pricing*, Cabnetware Inc., Mar. 1990; pp. 1-2.
Cabnetware, Inc., *Detailer Program Version 2.21 with Manual*, Cabnetware, Inc., 1988; pp. 1-203.
Cabnetware, Inc., *Detailer Program Version 3.0 with Manual*, Cabnetware Inc., 1990; pp. 1-256.
*Cad Quest, Cad Quest deck design software*, screenshots; Cad. Quest Inc., Date: unknown; pp. 1-22.
*Cad Quest, Cad Quest software Version 1.50*, screenshots; Cad Quest Inc., 1990; pp. 1-12.
CCI, *Price List*, CCI, Nov. 1, 1988; pp. 1-19.
Chevy/GM Parts Dealer Wades Free from a Paper Sea With a Bell + Howell Electronic Parts Catalog System News Release; pp. 1-6.
Chuck Hutton, *We Don't Go By The Book Anymore*, brochure, Chuck Hutton, Date: unknown; pp. 1-5.
Clairol Canada, *Computer Aids Hair Color Shade Selection at Retail*, Publisher: unknown; May/Jun. 1989; pp. 97.
*Clairol introduces a computer imaging system to allow customers to view simulated haircolor and makeup changes before they are made*, Author: unknown; PR Newswire, May 12, 1986; pp. 1-2.
Clear With Computers Incorporated, *Read Me First Manual disclosing CASS Parts*, Clear With Computers, Inc., Jun. 1988; pp. 1-13.
Clear With Computers Incorporated, *Read me First Manual disclosing CASS Program*, Clear With Computers, Inc., Apr. 1988; pp. 1-15 (2 copies).
Clear With Computers Incorporated, *Read me First StartUp Guide disclosing CASS Program*, Clear With Computers, Inc., 1988; pp. 1-62.
Clear With Computers, Inc., Freightliner SpecPro 1989 Business Plan, Clear With Computers Inc., Mar. 20, 1989; 1-71.
Clear With Computers, Inc., *PACCAR —Prospector 1989 Business Plan*, Clear With Computers, Inc., Mar. 20, 1989; pp. 1-120.
Clear With Computers, Inc., *Truck Force Tools User's Guide*, Clear With Computers Inc., Mar. 5, 1992; pp. 1-233.
Clear With Computers, Inc., *CASS Whole Goods*, screenshots, Clear With Computers, Inc., Nov. 10, 1988; pp. 1-13.
Compusave Corporation, *Touch-n-Save Computer Kiosk*, sales brochure, CompuSave Corporation, Date: unknown; pp. 1-10 (2 copies).
Compuserve, *The Electronic Mall*, CompuServe, Date: unknown; pp. 1-147.
Computer Attracts Users, Author: unknown; Chain Drug Review, v.11, n.20, Jul. 3, 1989; pp. 74.
Comsell, Inc., *Comsell Realty Showcase Sales Brochure*, Comsell, Inc., 1984; pp. 1-6 (2 copies).
Cooperative Computer, Inc., *Part-Finder*, Cooperative Computer, Inc., as early as Feb. 1988; pp. 1-147.
Cooperative Computing, Inc., A-DIS 500 system from Cooperative Computing, Inc., *Warehouse Distributor News* ; Mar./Apr. 1984; pp. 15-16.
Counterman magazine, Jan. 1987, Warehouse Distributor News Articles, 1987, Warehouse Distributor News Articles, 1987.
Counterman, Micro-AIM hardware and software system from Ann Arbor Computer, *Warehouse Distribution News*, Mar./Apr. 1984; pp. 1-11.
Covia-Corp., Covia Corp, Intorduces FocalPoint; First Travel Agency application of IBM Personal-System 2; *Business Wire*, Apr. 2, 1987; p. 1.
Creative Technologies Corporation, *Columbus at your Fingertips makes debut*, Interactions, Summer 1985; pp. 1-16.
Creative Technologies Corporation, *iPOP Sales Brochure*, Creative Technologies Corporation, Mar. 5, 1992; pp. 1-9.
*Cycom (later known as Talon)*, screenshots, since at least 1982, pp. 1-13.
Cycom Corporation, *The Motorcycle Dealership Computer Software Package from Cycom Corporation*, brochure, Cycom Corporation, Date: unknown; pp. 1-6.
Datatron Systems Corporation, *Auto Maintenance System (AMS) Electronic Catalog*, advertisement in Counterman, Apr. 1989; p. 29.

Day, *Computer Parts Description*, Publisher: unknown; 1971; pp. 169-175.

Defendant AutoZone, Inc.'s Amended Invalidity Contentions of *Orion IP, LLC* v. *Nike, Inc. et al.*, civil action No. 6:06-cv-323 (LED), pending in the U.S. District Court for the Eastern District of Texas, Tyler Division, dated Nov. 10, 2006; pp. 1-109 (and Attachment A and Claim Charts 1-75).

Defendant AutoZone, Inc.'s Preliminary Invalidity Contentions of *Orion IP, LLC* v. *Nike, Inc. et al.*, civil action No. 6:06-cv-323 (LED), pending in the U.S. District Court for the Eastern District of Texas, Tyler Division, dated Sep. 13, 2006; pp. 1-100 (and Attachment A, Claim Charts 46, 47, 55, 58, 62, 69, and Exhibits 30, 48, 49, 50, 73 and 74).

Defendant Harley-Davidson, Inc.'s Disclosures Pursuant to Patent Rules 3-3 and 3-4 of *Orion IP, LLC* v. *Staples, Inc. et al.*, civil action No. 2:04-cv-297 LD, pending in the U.S. District Court for the Eastern District of Texas, Marshall Division, dated Mar. 14, 2005, pp. 1-4 (2 copies).

Defendant Hyundai's Preliminary Invalidity Contentions of *Orion IP, LLC* v. *Mercedes-Benz USA LLC et al.*, civil action No. 6:05-cv-322, pending in the U.S. District Court for the Eastern District of Texas, Tyler Division, dated May 5, 2006; pp. 1-92 (and Exhibits 1-74).

Defendant Hyundai's Suppiletnental Preliminary Invalidity Contentions of *Orion IP, LLC* v. *Mercedes-Benz USA LLC et al.*, civil action No. 6:05-cv-322, pending in the U.S. District Court for the Eastern District of Texas, Tyler Division, dated Jul. 3, 2006; pp. 1-31 (and Exhibits 30, 34, 48, 48, 49, 50, and 73-75).

Defendant Michelin North America's Supplemental Invalidity Contentions of *Clear With Computers, LLC* v. *Belkin International, Inc. et al.*, civil action No. 6:08-cv-188, pending in the U.S. District Court for the Eastern District of Texas, Tyler Division, dated Apr. 15, 2009; pp. 1-97 (including Exhibit 1).

Defendant Pep Boys—Manny, Moe & Jack's Disclosures Pursuant to Patent Rules 3-3 and 3-4 of *Orion IP, LLC* v. *Staples, Inc. et al.*, civil action No. 2:04-cv-297 LD, pending in the U.S. District Court for the Eastern District of Texas, Marshall Division, dated Mar. 14, 2005, pp. 1-4.

Defendant Pep Boys—Manny, Moe & Jack's Notice of Service of the Pep Boys—Manny, Moe & Jack's Disclosures Pursuant to Patent Rules 3-3 and 3-4 of *Orion IP, LLC* v. *Staples, Inc. et al.*, civil action No. 2:04-cv-297 LD, pending in the U.S. District Court for the Eastern District of Texas, Marshall Division, dated Mar. 14, 2005, pp. 1-4.

Defendant Rolls-Royce North America Inc.'s Preliminary Invalidity Contentions of *Orion IP, LLC* v. *Mercedes-Benz USA LLC et al.*, civil action No. 6:05-cv-322, pending in the U.S. District Court for the Eastern District of Texas, Tyler Division, dated Jun. 23, 2006; pp. 1-3.

Defendant Toyota Motor Sales, USA, Inc.'s Disclosures Pursuant to Patent Rules 3-3 and 3-4 of *Orion IP, LLC* v. *Staples, Inc. et al.*, civil action No. 2:04-cv-297 LD, pending in the U.S. District Court for the Eastern District of Texas, Marshall Division, dated Mar. 14, 2005, pp. 1-8.

Defendant Yokohama Tire Corporation's Preliminary Invalidity Contentions of *Orion IP, LLC* v. *Yokohama Tire Corporation et al.*, civil action No. 6:06-cv-364, pending in the U.S. District Court for the Eastern District of Texas, Tyler Division, dated Jun. 23, 2006; pp. 1-127 (and Exhibits 1-75).

Defendants Crutchfield, Hasbro, J. Jill and Talbot's Invalidity Contentions of *Clear With Computers, LLC* v. *Bergdorf Goodman, Inc. et al.*, civil action No. 6:09-cv-481 (LED), pending in the U.S. District Court for the Eastern District of Texas, Tyler Division, dated Sep. 1, 2010; pp. 1-87 (and Exhibits 1-43).

Defendants' First Supplemental Joint Invalidity Contentions of *Clear With Computers, LLC* v. *Bassett Furniture Industries, Inc. et al.*, civil action No. 6:09-cv-095 (LED), pending in the U.S. District: Court for the Eastern District of Texas, Tyler Division, dated Jun. 28, 2010; pp. 1-8 (including Exhibit A).

Defendants' First Supplemental Preliminary Invalidity Contentions of *Orion IP, LLC* v. *Staples, Inc. et al.*, civil action No. 2:04-cv297 LD, pending in the U.S. District Court for the Eastern District of Texas, Marshall Division, filed May 16, 2005, pp. 1-8 (and accompanying Claim Chart).

Defendants' Joint Invalidity Contentions of *Clear With Computers, LLC* v. *Belkin International, Inc. et al.*, civil action No. 6:08-cv-188, pending in the U.S. District Court for the Eastern District of Texas, Tyler Division, dated Dec. 15, 2008; pp. 1-26 (and Exhibits A-D).

Defendants' Joint Invalidity Contentions of *Clear With Computers, LLC* v. *Bassett Furniture Industries, Inc. et al.*, civil action No. 6:09-cv-095 (LED), pending in the U.S. District Court for the Eastern District of Texas, Tyler Division, dated Oct. 27, 2009; pp. 1-15.

Defendants' Joint Invalidity Contentions of *Clear With Computers, LLC* v. *Hyundai Construction Equipment USA, Inc. et al.*, civil action No. 6:09-cv-139, pending in the U.S. District Court for the Eastern District of Texas, Tyler Division, dated Dec. 7, 2009; pp. 1-14 (and Exhibits A-L).

Defendants' Joint Invalidity Contentions of *Orion IP, LLc* v. *Xerox et al.*, civil action No. 6:07-cv-138LED, pending in the U.S. District Court for the Eastern District of Texas, Tyler Division, filed Mar. 27, 2008, pp. 1-43.

Defendants' Joint Invalidity Contentions of *Orion IP, LLC* v. *Xerox et al.*, civil action No. 6:07-cv-138LED, pending in the U.S. District Court for the Eastern District of Texas, Tyler Division, dated Mar. 27, 2008; pp. 1-43 (and Exhibits 1-44).

Defendants' Preliminary Invalidity Contentions of *Orion IP, LLC* v. *Staples, Inc. et al.*, civil action No. 2:04-cv-297 LD, pending in the U.S. District Court for the Eastern District of Texas, Marshall Division, dated Mar. 14, 2005, pp. 1-92 (and Exhibits 1-47).

Defendants' Preliminary Invalidity Contentions of *Orion IP, LLC* v. *Ford Motor Company et al.*, civil action No. 2:04-cv-313 TJW, pending in the U.S. District Court for the Eastern District of Texas, Marshall Division, dated Sep. 1, 2005; pp. 1-108 (and Exhibits 1-71).

Defendants' Preliminary Invalidity Contentions of *Orion IP, LLC* v. *Hitachi Koki USA, Ltd. et al.*, civil action No. 2:04-cv-418 (LED), pending in the U.S. District Court for the Eastern District of Texas, Marshall Division, dated Dec. 5, 2005; pp. 1-109 (and Exhibits 1-73, as well as accompanying charts).

Defendants' Second Supplemental Preliminary Invalidity Contentions of *Orion IP, LLC* v. *Staples, Inc. et al.*, civil action No. 2:04-cv297 LD, pending in the U.S. District Court for the Eastern District of Texas, Marshall Division, dated Jun. 22, 2005, pp. 1-13 (and accompanying Claim Charts).

Defendants' Third Supplemental P.R. 3-3 Disclosure to Plaintiff Orion IP, LLC of *Orion IP, LLC* v. *Staples, Inc. et al.*, civil action No. 2:04-cv-297 LD, pending in the U.S. District Court for the Eastern District of Texas, Marshall Division, dated Jul. 1, 2005, pp. 1-29 (including Exhibit 1).

Dega Technology, Inc., *Dega-View 1000, v. 2.0, Manuals—Honda*, Dega Technology, Inc., Aug. 2, 1989; pp. 1-13.

Department and Specialty Stores, Author: unknown; *The Washington Post*, Jun. 8, 1986; pp. 1-2 (5 copies).

Digital Techniques Inc., *TouchCom: The Future of Communication*, sales brochure, Digital Techniques Inc., Date: unknown; pp. 1-11.

Electronistore Services, Inc., *Electronistore*, sales brochure, Electronistore Services, Inc., Date: unknown; pp. 1-6.

Electronistore Services, Inc., *R.R. Donnelley Introduces Electronistore System: Major Commitment Made to Interactive Electronic Shopping*, Electronistore Services Inc., Nov. 28, 1984; 1-22 (2 copies).

Elmer-Dewitt, The (Digitized) Eye of the Beholder, *Time*, Feb. 10, 1986, available at http://www.time.com/time/printout/0.8816.960629.00.html on Oct. 20, 2008; pp. 1-4.

Experts on Beauty Techniques at Revco Expo, Author: unknown; *PR Newswire*, Mar. 16, 1990; pp. 1-2.

Factiva Inc., System One, Murdoch Electronic Sign Letter of Intent to Develop Jaguar (Jaguar Hotel Information and Reservation System), *PR Newswire*, Feb. 2, 1988; pp. 1-2 (2 copies).

Farah, Beauty by Liz, *Health*, Dec. 1984; p. 3.

Fellowes et al., *Pictures and Parts: Delivering an Automated Automotive Parts Catalog*, in Managing Innovation: Cases from the Services Industries, The National Academy of Sciences, 1988; pp. 36-56.

Fitzgerald, Marketing Computing to Promote More Beauty Products, *Newsday*, Dec. 8, 1985; pp. 1-3.

Ford Motor Company, *1988 Ford Selection Center Reference Guide*, Ford Motor Company, 1988; pp. 1-5.

Ford Motor Company, *Ford Introduces Cubic Computer system into dealership showrooms*, Business Editors, Aug. 21, 1984, available at http://web.lexis-nexis.com.libproxy.mit.edu/universe/printdoc on Dec. 22, 2004; pp. 1-2.
Ford Motor Company, *Ford Selection Center Video Version 2.0*, photo shots, Ford Motor Company, 1987; pp. 1-5.
Ford Motor Company, *Guide to the Ford Selection Center*, sales brochure, *Ford Motor Company*, Date: unknown; pp. 1-4.
Ford Motor Company, *SoftAd SIM II system, software*, photo of CD, Buick, 1998; pp. 1.
Ford Motor Company, *SoftAd SIM II system, user's guide*, Ford Motor Company, 1990; pp. 1-7.
Ford Motor Company, *SoftAd SIM III system, user's guide*, photo of CD, Buick, 1998; pp. 1.
Ford Motor Company, *The Ford Simulator*, The SoftAd Group, Inc., 1986-1987; pp. 1-25.
Ford Motor Company, *You'd be surprised what you can do with just the touch of a hand . . . Announcing the development of a computer sales system for Ford Dealers*, Ford Motor Company, Date: unknown; pp. 1-4.
Formic Videotex Systems, *Let Formic Introduce you to the New Opportunities in Electronic Marketing and Retailing*, Formic Videotex Systems, Date: unknown; pp. 1-2.
Ganger, *Computer-Based Training Improves Job Performance*, Personnel Journal, Jun. 1989; pp. 116-123.
Gleisser, *Stores Here Testing New TV Shopping*, The Plain Dealer, Oct. 24, 1984; p. 1.
Gore, *Customer Preferred Ordering System: Vehicle Ordering and Order Processing Systems*, Pubisher: unknown; Sep. 28, 1989; pp. 1-2.
Hayes, *Expert System for Development of Request for Proposal Packages and Evaluation of Proposals*, IEEE, 1989, pp. 1364-1369.
Herniter, *Schematic Capture with MicroSim PSpice*, Prentice-Hall, Inc., 2ed., 1996; pp. 1-10.
Hill, *Proposals of the Future*, IEEE, 1988, pp. 175-177.
Hollander Computer Systems, Inc., Hollander Computer Systems User Reference Manual, 1989, *Reports & Features*, Hollander Computer Systems, Inc., 1989; pp. 1-3.
Hollander Computer Systems, Inc., *Hollander Yard Management System Procedures Manual*, Hollander Computer Systems, Inc., Apr. 1, 1987; pp. 1-806.
Hollander Computer Systems, Inc., *Pre-Install Manual*, Hollander Computer Systems Inc., Revised May 31, 1988; pp. 1-36.
Hollander Computer Systems, Inc., The *Hollander Electronic Interchange*, sales brochure, Hollander Computer Systems, Inc., at least as early as 1980, pp. 1-8.
Hollie, Elizabeth Arden's Elizabeth Beauty Makeover Computer (a/k/a "Miss Elizabeth" or "Elizabeth"), *The New York Times*, on or before Aug. 1984, pp. 1-2.
Hollie, Face by Arden . . . and I.B.M.?, *The New York Times*, Oct. 21, 1984, pp. A.15.
IBM, *IBM Info Window PILOT System*, sales brochure, IBM, Date: unknown; pp. 1-6.
Interactive Training Systems, Inc. (ITS), *Electronic Shopping System by ITS*, sales brochure, Interactive Training Systems,Inc., Date: unknown; pp. 1-8.
Interactive Training Systems, Inc. (ITS), *ITS Self-Service Banking System*, sales brochure, Interactive Training Systems, Inc., Date: unknown; pp. 1-8.
*Interactive Video Information System (IVIS) Computer Training System*, sales brochure, Author: unknown; Publisher: unknown; Date: unknown; pp. 1-12.
Irving, Imagedisks Combine Digital Data & Optical Images on One Medium, *Computer Technology Review*, 1982, pp. 1-7 (2 copies).
Jonah, High-Tech, High-Touch, *Adweek*, Feb. 21, 1985; pp. 1-6.
Kar Technologies, Kar Technologies' Karmate Catalogue System, *Counterman*, Dec. 1988, v.6, n. 12, pp. 1-16 (2copies).
Kowalski, *Requirements of Parts Electronic Catalog System*, Publisher: unknown; Apr. 1988; pp. 1-8.
Kubota, *Questions on the Managing of Electronic Parts Catalog (EPC)*, Publisher: unknown; Jul. 12, 1990; p. 1.
Lazarus, Florsheim, Video Make Perfect Fit, *Chicago Tribune*, Nov. 5, 1986, p. 4, Zone C (2 copies).

Lazzareschi, Soup to Sushi, *Los Angeles Times*, Dec. 3, 1985; pp. 1-24.
Lexus, *Lexus Data System Parts*, Lexus, Date: unknown; pp. 1-2.
Lexus, *Lexus Electronic Parts Catalog*, Lexus, Date: unknown; pp. 1-17.
Lexus, *Lexus Parts Systems*, Lexus, Jun. 1989; pp. 1-68.
Lexus, *Parts Operations Update*, Lexus, Jul. 9, 1990; p. 1.
Lexus, *Parts Specialist Job Guide*, Lexus, Apr. 4, 1989; pp. 1-32.
Lincoln, *Lincoln Mercury Selection Center Screen Captures*, Lincoln, circa 1986, pp. 1-47.
Logay, *Kitchens: Computerized Kitchen Design*, Remodeling Contractor: the Industry Business Magazine, 1986; pp. 1-6.
Long, *'Magic Mirror' casts fashionable reflections*, Houston Chronicle, Jan. 31, 1989, p. 1.
Marv's Auto Sales, *Auto Dismanting Chevrolet Parts*, photo, Publisher: unknown; Date: unknown; p. 1.
Matheny Etal., *Ordering Parts via Videodisc and Computer*, E- ITV, Jun. 1984; pp. 33-35 (2 copies).
Mayer, Electronic Shopping Lures, *The Washington Post*, Jun. 8, 1986; pp. 1-8.
Merit et al., *Triad Electronic Catalog*, manual, Triad Systems Corporation, 1987-89; pp. 1-63.
Mitsubishi Motors, *Mitsubishi Build Your Own System*, screenshots, Mitsubishi Motors, as early as 1989; pp. 1-20.
Mitsubishi Motors, *Mitsubishi Computerized Automatic Part Searching (CAPS) System*, Mitsubishi Motors, as early as Nov. 13, 1988; pp. 1-10.
Mitsubishi Motors, *Mitubishi Build Your Own System, printout of Build & Buy page*, Mitsubishi Motors, available at http://www.mitsubishicars.com/MMSA/Model?ModelID=12&1019499259664, on Apr. 22, 2002; pp. 1-2.
Miyaoka et al., *Image Processing in Presentation Systems*, Journal of the Institute of Electronics, Information, and Communication Engineers, Apr. 1991, vol.74, no.4; pp. 392-397.
MKS Compu-Group, Inc., *20-20 Computerized Kitchen Design, Operations Guide*, MKS Compu-Group, Inc., 1989, pp. 1-355 (3 copies).
MKS Compu-Group, Inc., *20-20 Computerized Kitchen Design*, screenshots, MKS Compu-Group, Inc., pp. 1-72.
Mnemos Inc., *Chrysler/Mnemos Parts Information System*, Mnemos, Inc., Date: unknown; pp. 1-25.
Mnemos Inc., *Mnemos, Inc. Presentation to Chrysler Corporation Service & Parts Operations*, Mnemos, Inc., Nov. 15, 1985; pp. 1-9.
Motro, *Baroque, a Browser for Relational Databases*, ACM on Transaction on Office Information Systems, Apr. 1986; pp. 164-181 (2 copies).
Mumford, *XSEL's Progress: The Continuing Journey of an Expert System*, John Wiley & Sons©, 1989; pp. 1-49.
Naisbitt, A 'Magic Mirror' for Shoppers, *San Francisco Chronicle*, Jan. 3, 1986, p. 2.
NCR Corporation, *NCR 5682 Interactive Self-Service Terminal Combines Touch-Screen Technology with Transaction Processing*, Consultant's Communique, v.20, n.6, Nov./Dec. 1988.; pp. 1-15.
Negel, Big Plans for Shopping Machine, *Anaheim Bulletin*, Nov. 19, 1984; p. 1.
Nikkei BP Corporation, *High technology merchandizing techniques in the U.S.*, Nikkei BP Corporation, 1988, pp. 1-2.
Nissan Motor Co., Ltd., *Parts Searching and Ordering System is Permeating into the Automobile Industry*, Publisher: unknown; Date: unknown; pp. 1-10.
Olsen, Wiping Away the Years With Video Imaging, *San Diego Business Journal*, v.6, i.49, s.1, Jul. 7, 1986, p. 5.
Omron Financial Systems, Inc., *Omron Interactive Transaction Manager*, Omron, Date: unknown; pp. 1-9.
*PAIS—Electronic Parts Pricing Supersedence Catalog System*, Author: unknown; Publisher: unknown; Date: unknown; pp. 1-2.
Patnode, Fear of Change Creates Niche for Global Imaging, *Sand Diego Business Journal*, Aug. 10, 1987, v.8, i.2, s.1, pp. 1-3.
Paxton, Clairol Computerizes Hair Color Analysis, *Discount Store News*, Jun. 9, 1986, at 2 and 77.
Peterson, Electronic Cataloging: Tomorrow's Technology Aids Today's Counterman, *Counterman*, Jan. 1987, pp. 34-41 (3 copies).

Plaintiff Hyundai Motor America, Inc.'s Invalidity Contentions of *Hyundai Motor America, Inc. v. Clear With Computers, LLC*, civil action No. 6:08-cv-302, pending in the U.S. District Court for the Eastern District of Texas, Tyler Division, dated Feb. 5, 2009; pp. 1-64 (and Appendix A-H, and Exhibit 1-75).

Plaintiff Hyundai Motor America, Inc.'s Invalidity Contentions of *Hyundai Motor America, Inc. v. Clear With Computers, LLC*, civil action No. 6:08-cv-302, pending in the U.S. District Court for the Eastern District of Texas, Tyler Division, dated Mar. 5, 2010; pp. 1-100 (and Exhibits A-D, and references (4)).

Plaintiff Hyundai Motor America, Inc.'s Second Supplemental Invalidity Contentions of *Hyundai Motor America, Inc. v. Clear With Computers, LLC*, civil action No. 6:08-cv-302, pending in the U.S. District Court for the Eastern District of Texas, Tyler Division, dated Feb. 17, 2011; pp. 1-27 (and Exhibits & amended charts).

Poulsen, ICAS Computer Systems Electronic Cataloging System, Counterman, Apr. 1987, v.5, n. 7; pp. 1-3.

Poulsen, ICAS EC2000 Laser Disk Cataloging System, *Counterman*, Nov. 1987, v.5, n.11, pp. 1-10 (2copies).

Poulsen, NAPA electronic cataloging systems, *Counterman*, vol.4, No.4, Apr. 1987; pp. 1-3.

*Prodigy Now Credible as DM Medium*, Author: unknown; Target Marketing, v.15,i.3, p. 18.

Reed Travel Group, *Jaguar Electronic Hotel Directory*, sales brochure, Reed Travel Group, Date: unknown; pp. 1-6.

Reynolds and Reynolds Manufacturer Services Group, *Visions News and Ideas From Reynolds and Reynolds Manufacturer Services Group*, Reynolds and Reynolds Manufacturer, v.2, n.2, Mar.-Apr. 1987; pp. 1-3.

*Reynolds Introduces EPC to Speed Manufactures Information Retrieval*, Visions, Mar./Apr. 1987; pp. 1-6.

Rosenwein, Whir, Click, Thanks: Merchandisers Turn to Electronic Salesman in 24-Hour Kiosks, *The Wall Street Journal*, Jun. 23, 1986; p. 1 (copies).

Roseville, *PAIS: Parts Access Information System, Case Study*, Bell & Howell Co., 1988, pp. 1-2.

Sabre, *SABREvision Hotel Booking System*, sales brochure, Sabre, 1990; pp. 1-7.

Sakuma, *Automobile Parts—Image Retrieval System Using a Personal Computer and a CD ROM—The Case of Nissan Motor Company, Ltd.*, Nissan Motor Company, Ltd., Apr. 1989; pp. 1-6.

Schuman et al., *A Daylight Design Tool Using a Hypertext Format*, XI International Congress (CIB 89), Paris, France, Jun. 1989; pp. 1-13.

Schuman et al., *A Daylight Design Tool Using HYPERCARD on the Macintosh*, Third National Conference on Microcomputer Applications in Energy, Tucson, AZ, Nov. 1988; pp. 1-7.

Sears, *Sears Repair Parts Display System*, Sears, commercially available as of Jun. 21, 1988; pp. 1-313.

Selkowitz et al., *A Concept for an Advanced Computer-Based Building Envelope Design Tool*, Lawrence Berkeley Laboratory Report LBL-20545, Nov. 1986; pp. 1-8.

Sesto et al., *The Videodisc in Electronic Selling: Applications, Strategies, and Forecast*, 1984.; pp. 1-149.

*Setting a flair for hair*, Author: unknown; Chemist & Druggist, Sep. 22, 1990, at 506.

Shappro, *By Video Rides Growth in Electronic Shopping*, Business Journal—San Jose, Nov. 24, 1986, p. 10 (2 copies).

Shimbun, *Easy Lookup of Supply Parts, an Electronic Catalog for Toyota Setting Up at 1400 Stores*, Toyota Motor Company, Jul. 9, 1988; pp. 1-8.

Shimbun, *Ordering Parts With a PC: Toyota Develops an Electronic Catalog*, Toyota Motor Company, Jul. 8, 1988; 1 page.

Shimbun, *Supply Parts Lookup Software*, Toyota Motor Company, Jul. 8, 1988; 1 page.

Shimbun, *Supply Parts Lookups With Pictures, Electronic Catalog System Developed, Test Introduction for Suppliers*, Toyota Motor Company, Jul. 8, 1988; 1 page.

Shimbun, *Toyota, Speeding Up Parts Supplies, Electronic Catalog System Developed*, Toyota Motor Company, Jul. 8, 1988; pp. 1-2.

Shinbum, Perfect Supply Part Lookups, Toyota Motor, Jul. 8, 1988; p. 6.

Shinbun, *Electronic Catalog Developed for Toyota Supply*, Toyota Motor Company, Jul. 8, 1988; pp. 1-74.

Sit, Facing Up to the Computer Imaging Big Business Seen in Makeover Market, *Boston Globe*, May 16, 1990, p. 37.

Softad Group, Inc., *SoftAd—1987 Buick Dimension (Macintosh Version 1)*, sales brochure, 1986; pp.1-7.

Softad Group, Inc., *SoftAd BMW system software*, sales brochure, SoftAd Group, Inc., Date: unknown; pp. 1-11.

Sony Corporation of America, *Sony Sinergy*, sales brochure, Sony Corporation of America, 1984; pp. 1-14.

Sullivan et al., *An Interactive Microcomputer-Based Kiosk Providing Energy Efficent Building Design Information*, Presented at the Fourth National Conference on Microcomputer Application in Energy, Apr. 25-27, 1990, Tucson, Arizona; pp. 1-12.

Telaction, Telaction Interactive TV Service Brings Shopping Mall into Homes, *Telaction News*, Nov. 29, 1988; pp. 1-20.

The Howard/Marlboro Group, *The New Smart Boxes*, The Howard/Marlboro Group, 1986; pp 1-10.

The Thompson Corporation, *Automated Parts-Handling System*, The Thompson Corporation, Jun. 1985, pp. 1-3.

Tompkins, *History of ChannelNet*, sales brochure, ChannelNet, 2004, pp. 1-2.

Toyota Motor Company, *Accounts Payable System*, printout, Toyota Motor Company, Mar. 16, 1989; p. 1.

Toyota Motor Company, *Receiver System*, printout, Toyota Motor Company, Mar. 16, 1989; p. 1.

Toyota Motor Corporation, *Electronic Parts Catalog, Electronic Parts Information, Technical Assistance System, Toyota Dealer Network*, printouts, Toyota Motor Corporation, Date: unknown; pp. 1-7.

Toyota Motor Corporation, *Toyota UOE Implementation*, Toyota Motor Corporation, Date: unknown; pp. 1-16.

Training, A Light in the Darkness, Author: unknown; *Counterman*, Jul. 1988; pp. 50-51.

*Triad Systems*, Author: unknown; Business Press Release Announces new computerized parts application catalog system, Business Wire, Inc., Mar. 5, 1984; pp. 1-2.

Triad Systems, Inc. *Laser-Cat Electronic Catalog Video*, Triad Systems, Inc., 1988; pp. 1-4.

Triad Systems, *LaserCat 5 Electronic Catalog, marketing video*, brochure, Triad Systems Corporation, Date: unknown; pp. 1-8.

Triad Systems, *Series 12*, Warehouse Distributor News, Mar./Apr. 1984; pp. 1-10.

Triad Systems, *Triad Series 11 System*, sales brochure, Triad Systems Corporation, 1989; pp. 1-3.

Uchiyama et al., The New FM Series, *Fujitsu Journal*, vol. 15, No. 4, Special Ed., 1989; pp. 1-14 (2 copies).

Ullah, *Computerization of Spare Parts Inventory in Broadcasting*, Publisher: unknown; 1985; pp. 11-19.

Video Listing Service, *LASERFILM*, sales brochure, Video Listing Service (VLS), Date: unknown; pp. 1-8.

Warehouse Distributor, *A Computer Guide for WDs & Jobbers*, Babcox Publications, Inc., Mar./Apr. 1984, pp. 14-23.

Webber, Storage Systems to Link Host, *InfoWorld*, Nov. 30, 1987; pp. 1-2.

Weir, Beauty; High-Tech Faces, *The New York Times*, Jul. 29, 1984, pp. A.37.

Wells, Trying Out the Blond Look, *The New York Times*, Oct. 18, 1986, at L 34.

Westinghouse, *The "Help" Button; a Human Interference*, Publisher: unknown; at least as early as 1983-1984, pp. 1-5.

Weildrich, An Aircraft Parts bazaar is big success Ryder unit links buyers, seller, *Chicago Tribune*, Jan. 2, 1989; pp. 1-3.

Williams, *Car Parts by Satellite Salvage Yard Network Links Buyers, Sellers*, The Omaha World-Herald Company, 1988; pp. 1-3.

Zuckerman, *The Pantry tests state-of-the-art electronic shopping*, Convenience Store NEWS, before Dec. 1985, p. 1.

\* cited by examiner

STATIC DATABASE — 105

- ENVIRONMENT PICTURES — 122
- ENVIRONMENT TEXT — 124
- PRODUCT PICTURES — 126
- PRODUCT TEXT — 128
- PRODUCT SPECIFICATIONS — 121
- PERFORMANCE SPECIFICATIONS — 123
- PRICE SPECIFICATIONS — 125
- TRADEMARK PICTURES — 127
- LIFE CYCLE SPECIFICATIONS — 129
- PRODUCT DESCRIPTIONS — 131

PROCESSES AND GENERATES A CUSTOMIZED PRINTED PROPOSAL — 262

- QUERIES ACTIVE DATABASE — 264
- QUERIES STATIC DATABASE — 266
- READS PAGE DESCRIPTION RECORDS — 268
- READS PAGE LAYOUT IDENTIFIERS — 270
- LOCATES AND RETRIEVES ACTIVE DATA — 272
- LOCATES AND RETRIEVES STATIC DATA — 274
- PLACES DATA IN FIELDS ON PAGES — 276
- PRINTS IN PLURALITY OF COLORS — 278
- DEALER PERSONALIZATION — 280
- CUSTOMER PERSONALIZATION — 282
- LINKS PAGE IDENTIFIERS WITH DATA — 285
- QUERIES REPORT DATABASE — 265
- QUERIES DIFFERENCE DATABASE — 267

CONTENTS — 174

TABLE OF CONTENTS — 196

CURRENT PUBLICATION — 260

INTRODUCTION — 236
COVER PAGE — 250
TABLE OF CONTENTS — 252
LETTER — 254
PRODUCT INFORMATION — 238
FEATURES & BENEFITS — 256
SPECIFICATIONS — 258
PERFORMANCE — 240
TRADE — 242
QUOTATION & SIGNATURE — 244
PAYMENT SCHED. & TERMS — 246
ECONOMICS — 248

FIG. 13

DIFFERENCE DATABASE — 107

- ENVIRONMENT PICTURES — 122
- ENVIRONMENT TEXT — 124
- PRODUCT PICTURES — 126
- PRODUCT TEXT — 128
- PRODUCT SPECIFICATIONS — 121
- PERFORMANCE SPECIFICATIONS — 123
- PRICE SPECIFICATIONS — 125
- TRADEMARK PICTURES — 127
- LIFE CYCLE SPECIFICATIONS — 129
- PRODUCT DESCRIPTIONS — 131

FIG. 14

ELECTRONIC PROPOSAL PREPARATION SYSTEM

CROSS-REFERENCE TO RELATED APPLICATIONS

This application is a continuation of U.S. application Ser. No. 09/566,029 filed May 8, 2000 (patented as U.S. Pat. No. 7,606,739), which is a continuation of U.S. application Ser. No. 08/823,534 filed Mar. 24, 1997 (abandoned), which is a continuation of U.S. application Ser. No. 08/596,575 filed Feb. 5, 1996 (patented as U.S. Pat. No. 5,615,342), which is a continuation of U.S. application Ser. No. 07/878,602 filed May 5, 1992 (patented as U.S. Pat. No. 5,493,490). The disclosure of all of these applications is expressly incorporated herein by specific reference thereto.

FIELD OF THE INVENTION

The present invention relates to a system for creating a customized proposal by linking together product pictures, environment pictures showing environments in which the product may be used, and text related to the product. The system includes means for linking together predetermined product pictures, environment pictures, and text based upon a potential customer's answers to predetermined queries.

BACKGROUND AND SUMMARY OF THE INVENTION

Many products, such as cars, are illustrated to customers by preprinted brochures. Car dealerships, for example, have glossy brochures that show pictures of cars and generic textual descriptions of the cars. A customer may test drive and actually inspect a particular car of interest. The dealership will also furnish the customer with one of the preprinted brochures of the car. The brochure documents and contains information about the car. The customer may refer to the brochure and potentially be quite influenced by it in making a decision regarding whether to purchase the car.

The generic nature of these preprinted brochures, however, may have a negative impact on the customer's ultimate decision of whether to purchase and thus are often not persuasive. Traditionally, only one brochure is available for each car, for example, and every potential purchaser of that car receives the same brochure. These brochures contain glossy photographs of the car in a variety of settings, which may include, for example, a country setting, city environment, golf course, and marina. Next to the photographs, the brochures usually contain generic textual descriptions of the car or potential uses of the car. Finally, the brochures typically contain standard lists of options for the car along with complex pricing charts from which one may calculate a price based on a matrix of options and prices.

The preprinted brochures contain all of these different settings for the car and generic information in an attempt to appeal to any potential purchaser. For example, one customer may enjoy golfing, and the brochure contains a photograph of the car at a golf course to appeal to that customer and influence that customer in his or her decision to purchase the car. Another customer may want to use the car to take long trips which pass through the country, and the photograph in the brochure of the car in a country setting is designed to appeal to that customer.

The brochures also contain standard pricing charts. Since every brochure is generic to any customer, however, it must contain complex pricing charts that include a matrix of options and prices. Furthermore, since prices of the car or options often change, the information in the brochure can easily be out of date. Also, much of the pricing information is not of interest to a particular customer, since the customer will typically be interested in the price for a single, or relatively few, combinations of options for the car.

In containing all of this varied and generic information in an attempt to be "all things to every customer," the preprinted brochures actually are of limited value to any particular customer. The brochures are not customer specific and, therefore, are not particularly appealing or persuasive for any customer. The typical brochure contains much information that is of no value or interest to a particular customer due to the varied and generic nature of the product pictures and textual descriptions. Furthermore, these preprinted brochures are expensive to produce because of the glossy photographs and may be quickly out of date, meaning that either a dealership must discard the brochures or provide customers with "old" brochures.

The present invention solves these problems by utilizing a computer-based system to dynamically create customized, printed proposals for potential purchasers of a product. The system queries a customer to determine his or her interests and desired options. The interests may include a "use" desired by the customer, such as a marina or golf course. The interests may also include the type of information, such as technical, that the customer would like in the proposal. The desired options may include the various features of interest to the customer, such as the type of engine desired.

Based upon the customer's answers to the queries, the system links product pictures, environment pictures, and textual descriptions together in a customized proposal. The system also has the capability to link together other aspects in the proposal, which may include environment text describing the product in a particular setting or environment. The customized proposal, therefore, contains pictures, textual descriptions, and pricing information that is all of interest to and relevant to a specific customer, since all of the pictures and text were linked together based upon the customer's answers.

Since each proposal is customized for a particular customer, each proposal will have a much more persuasive effect in selling the product. Also, if any information about the product changes, such as prices of options, the system information stored in a data base may be simply changed in order to accommodate the new information. Additional textual descriptions or pictures may also be added to the system data base to be used in linking together information for a proposal.

The quality of the pictures produced in these customized, printed proposals can be made comparable in quality to the glossy photographs in prior art proposals due to recent advances in computer printers. Printers such as the Canon CLC-300 produce color computer print-outs that resemble color photographs. These customized proposals, therefore, need not be inferior to prior art proposals in terms of the quality of available pictures for the proposals.

This system for producing customized, high-quality proposals has many potential applications, such as in the car industry. A customized proposal generated by the present invention will have a great appeal to each individual customer and will be an asset in selling the product.

BRIEF DESCRIPTION OF THE DRAWINGS

FIG. 9 is a block diagram showing the contents of a static database.

FIG. 10 is a block diagram showing a detailed depiction of the elements in a preferred report generator.

FIG. 13 is a detailed depiction of the elements within the "Contents" selection of the preferred main menu.

FIG. 14 is a block diagram showing the contents of a difference database.

DETAILED DESCRIPTION OF THE PREFERRED EMBODIMENT

The present computer system is preferably implemented using Object Oriented Design (OOD). Because OOD is a fairly new programming method, a brief explanation of OOD design concepts will be offered here in order to ensure a better understanding.

The resource used for preparing this explanation is: Grady Booch, "Object Oriented Design with Applications," 1991, published by The Benjamin/Cummings Publishing Company, Inc.

According to Booch, the Object Oriented Design methodology views the "world" as a set of autonomous agents that collaborate to perform higher level behavior. The OOD agents are called objects. Objects can have a state, behavior and identity. A set of objects that share a common structure and common behavior are called a class. A set of objects working together to provide, a behavior that satisfies some requirement of a problem is called a mechanism.

The design described herein is an object-oriented design. This design is described using object diagrams which show the interaction of the objects that make up the application. In addition, class diagrams are used to present the architecture of the system.

Unless otherwise stated, all classes making up the architecture of the system preferably are derived from a common base class named CWCObject. Where this is not the case, class diagrams are used.

INTRODUCTION

Figure 1A:
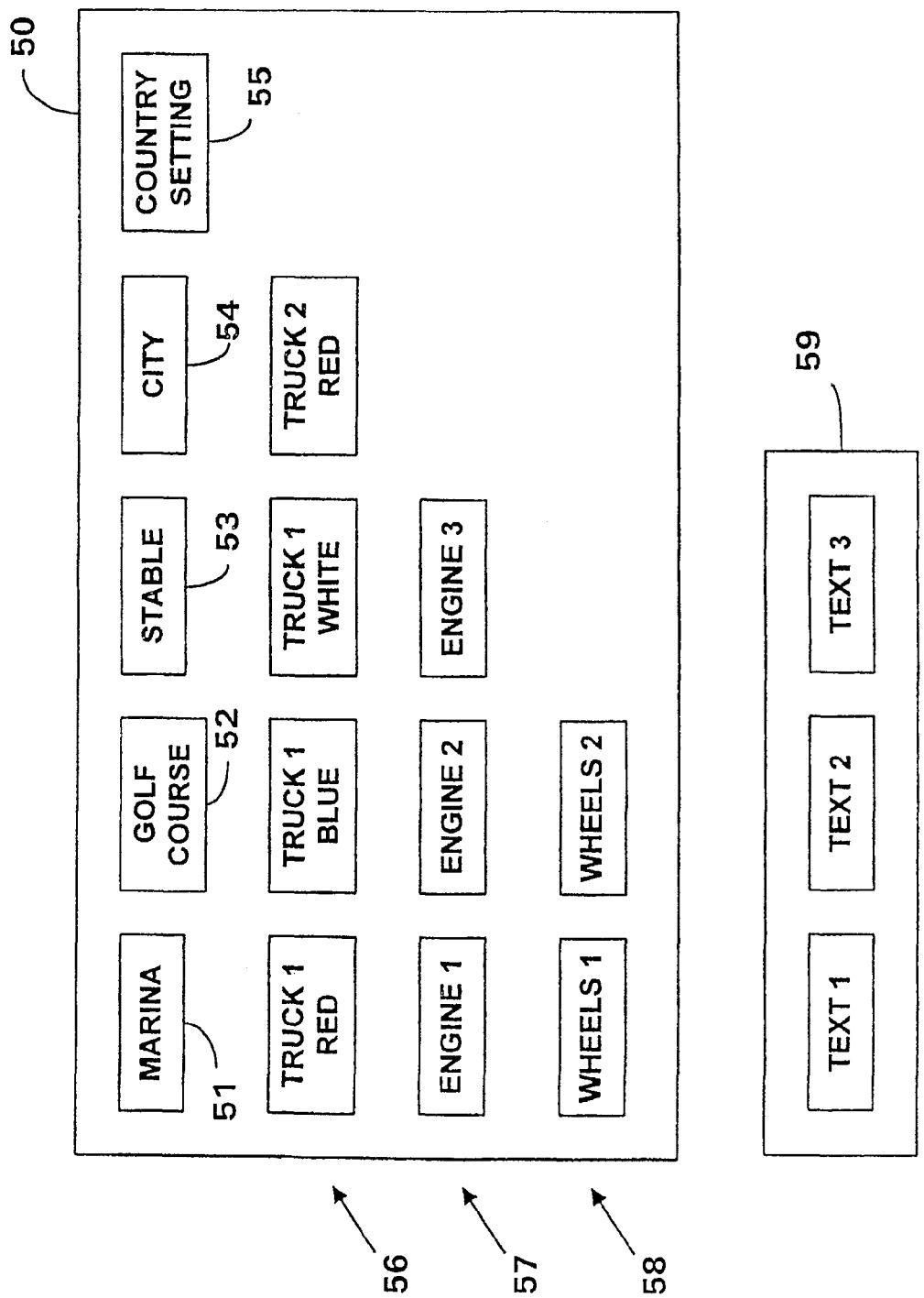
FIG. 1A is a block diagram illustrating conceptually picture and text databases of the computerized proposal system.
Figure 1B:
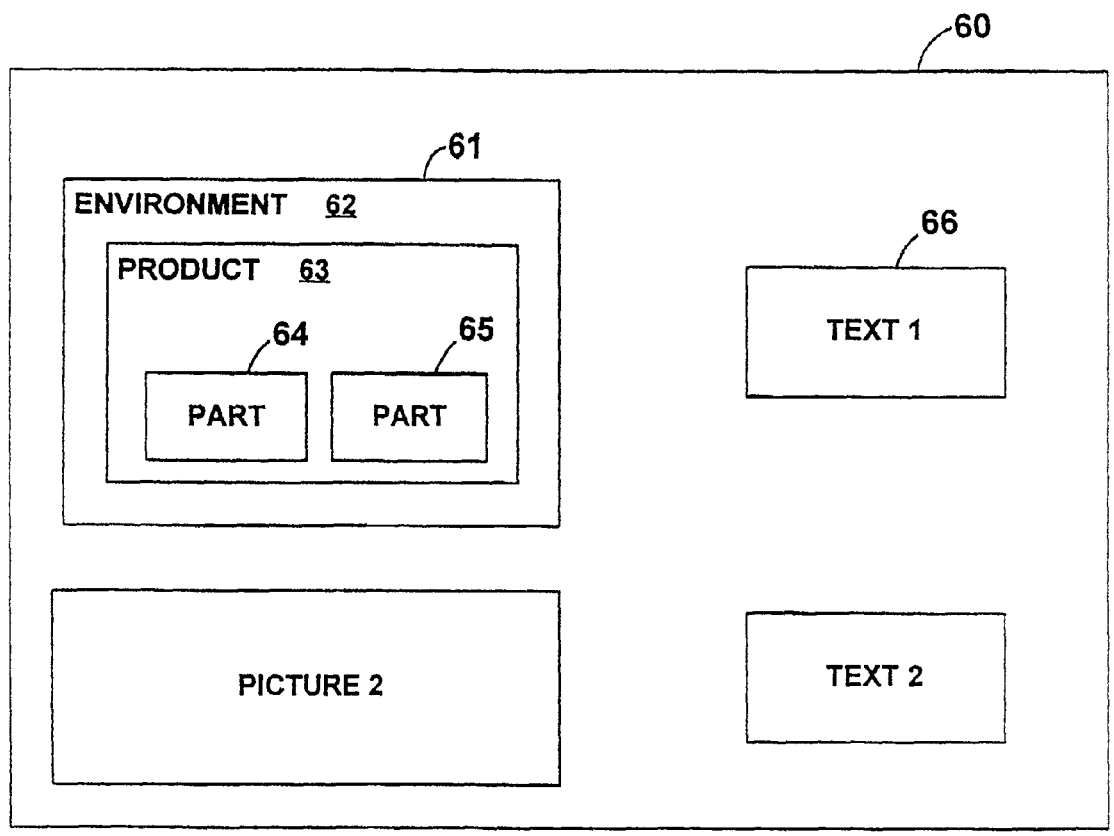
FIG. 1B is a diagram illustrating conceptually an electronic proposal template of the computerized proposal system.

FIGS. 1A and 1B illustrate conceptually a primary feature of the computerized proposal system. The system allows a user to dynamically customize and create a proposal for individual customers. The customized proposal may contain specific items for a particular customer, depending upon the customer's needs and desires.

FIG. 1A shows conceptually a database 50 that electronically stores a plurality of pictures. The pictures may include environment pictures 51-55, product pictures 56, and pictures for various parts 57 and 58. A textual descriptions database 59 may store a plurality of text segments that correspond to various pictures in the picture database 50.

FIG. 1B illustrates conceptually an electronic template for creating a page in a customized proposal. The system may query a user to determine a particular customer's needs and interests. Based upon the answers to the queries, the system may "fill in" the template 60 to customize a proposal for the customer. For example, if the customer has an interest in sailing or boating, the system may choose a picture of a marina environment 51 to use as the background or environment 62 in picture 61 of template 60. Likewise, if the customer has an interest in golfing, the system may choose a golf course environment 52. Within the environment 62, the system places a product 63 by selecting one of the plurality of product picture 56 based upon the customer's answers.

Each product 63 typically has several options available to the customer, such as the type of engine and wheels. Based upon the customers answers, which indicate the customer's desired options, the system may select parts from the picture database 50 for parts 64 and 65 on product 63 in the template. The system may also select one of the plurality of text segments 59 to fill in text frame 66. The text in the text frame 66 would typically correspond to picture 61 and, for example, provide a description of the product or its performance specifications.

Accordingly, the system uses the stored pictures in the picture database 50 as building blocks for filling in the template. The system establishes a customer profile based on the customer's answers to queries. The system then uses the profile to "build" the empty frames, such as picture 61, in template 60.

The approach of using picture building blocks provides for much versatility and the capability to customize a proposal. Products may be shown in anyone of a variety of environments by simply selecting the appropriate picture building blocks. Likewise, any combination of options may be shown on a particular product by selecting the appropriate part picture building blocks. Each combination of pictures for a finished template need not be pre-stored, since the system dynamically builds a template. Also, the system provides further advantages by allowing easy change of options. For example, if a particular type of wheel is no longer available on a truck, a user may simply change the stored picture for that wheel. Options may easily be changed by loading and storing new part pictures in the picture database. The system, therefore, provides for customized proposals that are up-to-date and may accommodate changes in available options. For simplicity, the system has been conceptually shown with a product in an environment. One skilled in the art will recognize that the system is capable of creating different types of templates or proposals based on different picture building blocks or different combinations of the building blocks.

Overview

Figure 2:
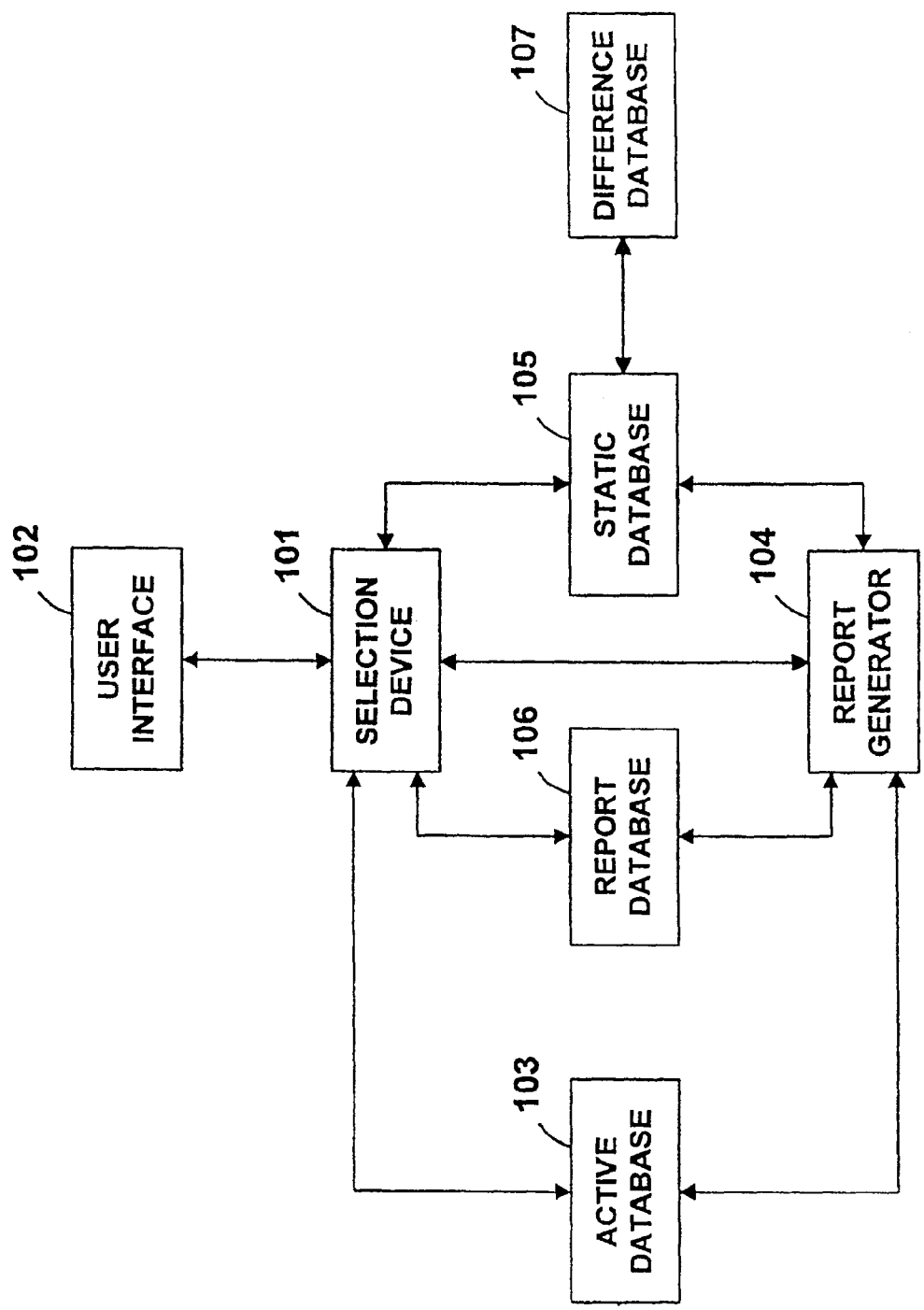
FIG. 2 is a block diagram showing the preferred system.

Referring now to FIG. 2, a computer system 100 is shown. Preferred computer system 100 incorporates an active database 103, a static database 105, a report database 106, a user interface 102, a selection device 101, and a report generator 104. The computer system 100 may also incorporate a difference database 107. The selection device 101 is operatively interconnected to the active database 103, to the report database 106, to the report generator 104, and to the user interface 102. The active database 103, the report database 106, the static database 105, and the difference database 107 are operatively interconnected to the report generator 104. Referring now to FIG. 2 in combination with FIG. 3 and FIG. 4, the active database 103 may electronically store proposal related customer information in the proposal object 110. A proposal object 110 is an instance of the proposal class which is itself derived from the CWCObject class. The active database 103 may contain a plurality of proposal objects 110. Each proposal object 110 may contain a plurality of ProposalData objects 112. The ProposalData objects 112 may store customer-related information collected by the user. ProposalData objects 112 are instances of the ProposalData class 320 which is derived from the CWCObject class.

Figure 7:
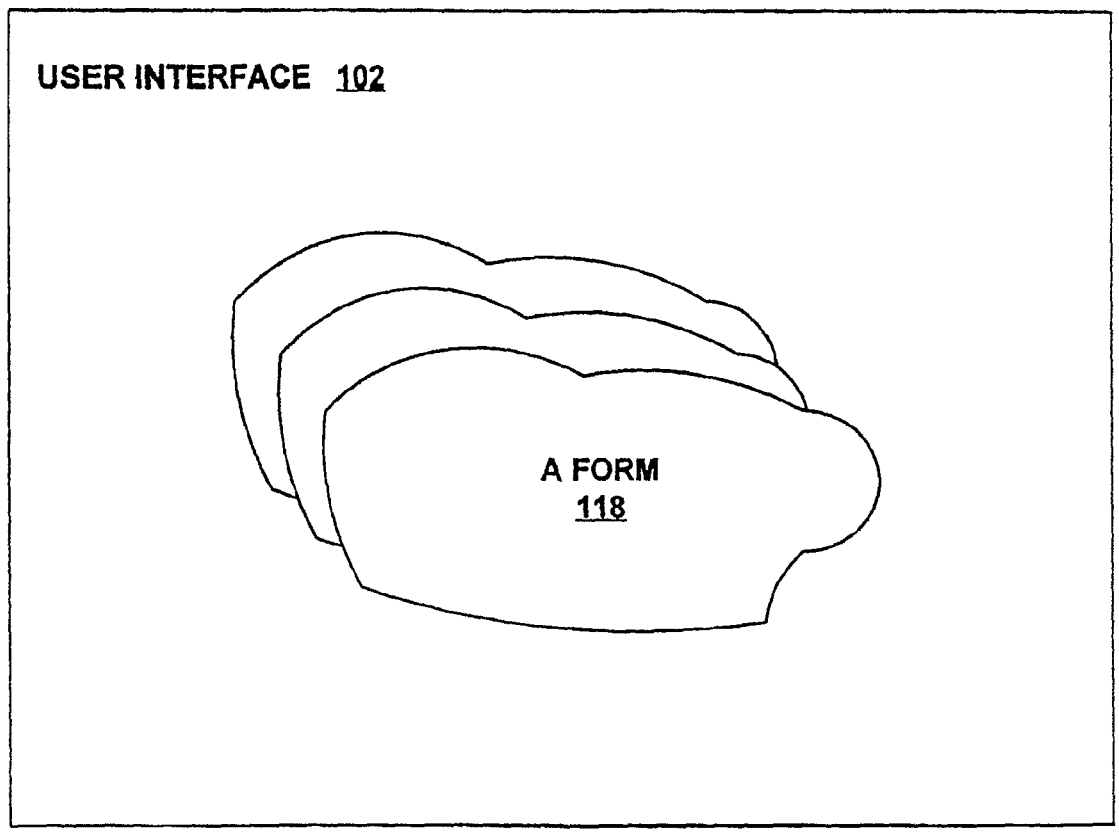
FIG. 7 is an object diagram showing a user interface.

Customer-related information may be entered interactively via the user interface 102 typically beginning at the time the program is first started, and may continue to be entered intermittently throughout the time the program is running. Referring now to FIG. 7, in combination with FIG. 3, FIG. 16, and FIG. 17, the user-entered information may be gathered on one or more of the various Form objects 118, and then stored in one or more of the various ProposalData objects 112 in the proposal 110 in the active database 103.

Table 1 shows how information is stored in a preferred embodiment: the first column indicates the type of information stored; the second column indicates the corresponding object by which a user may enter the information; the third column indicates the corresponding class of which the object is an instance; and the fourth column indicates the corresponding form class from which the class in the third column is derived. The classes are identified in the table by reference numerals and preferably have the same identifying label as the objects to which they correspond. For example, reference numeral 361 in table 1 refers to the TradeForm class 361.

TABLE 1

| Type of Information | Object | Class | Form Class |
|---|---|---|---|
| trade-in product | TradeForm Object 292 | 361 | 340 |
| product price quotation | QuotationForm object 294 | 362 | 340 |
| financing a product | FinanceForm object 296 | 364 | 340 |
| product life cycle cost | LifeCycleForm object 298 | 366 | 340 |
| personalized letter | LetterForm object 288 | 358 | 340 |
| product | ProductForm object 290 | 360 | 340 |
| customer | CustomerForm object 286 | 356 | 340 |
| table of contents | TableOfContentsForm object 284 | 354 | 340 |
| salesperson | ListOfSalesPersonsForm object 310 | 352 | 340 |
| to save a proposal | SaveProposalForm object 308 | 350 | 340 |
| to recall a stored proposal | RecallProposalForm object 306 | 348 | 340 |
| language | LanguageForm object 304 | 346 | 340 |
| dealer | DealerForm object 302 | 344 | 340 |
| password | PasswordForm object 300 | 342 | 340 |

Objects of classes derived from a common base class can be referred to as if they were objects of the common base class due to the principle of polymorphism. The TradeForm object 292 can therefore be treated generically as a Form object 118. The user interface 102 typically comprises a collection of such Form objects 118, each of which can be made to load itself into a window on the computer screen.

Table 2 shows how information gathered by the various objects described above may be stored as data objects in a preferred embodiment: the first column indicates the type of information stored; the second column indicates the corresponding data object in which the information may be stored; the third column indicates the corresponding data class of which the data object is an instance; and the fourth column indicates the corresponding class from which the data class in the third column is derived. The data classes are identified in the table by reference numerals and preferably have the same identifying label as the data objects to which they correspond. For example, reference numeral 380 in Table 2 refers to the TradeData class 380. Each of the listed data objects in Table 2 may preferably be treated generically as a ProposalData object 112 and stored as one of the various ProposalData objects 112 in the proposal object 110.

TABLE 2

| Type of Information | Data Object | Data Class | Class |
| --- | --- | --- | --- |
| trade-in product | TradeData Object 142 | 380 | 320 |
| product price quotation | QuotationData object 144 | 382 | 320 |
| financing a product | FinanceData object 146 | 384 | 320 |
| product life cycle cost | LifeCycleData object 148 | 386 | 320 |
| personalized letter | LetterData object 138 | 376 | 320 |
| product | ProductData object 140 | 378 | 320 |
| customer | CustomerData object 136 | 374 | 320 |
| cover sheet | CoverSheetData object 132 | 372 | 320 |
| table of contents | TableOfContentsData object 130 | 368 | 320 |
| salesperson | SalesPersonData object 134 | 370 | 320 |

Referring now to FIG. 2 in combination with FIG. 3, FIG. 6, FIG. 16, and FIG. 17, the active database 103 may electronically store dealer, salesperson, and language information in the customized database 114. A customized database 114 is an instance of the CustomizeDataBase class which is itself derived from the CWCObject class. The active database 103 may contain a plurality of customized database 114. Each customized database 114 may contain a plurality of CustomizeData objects 116. The CustomizeData objects 116 typically store dealer, salesperson, and language information.

Table 3 shows how information gathered by the various objects described above may be stored as data objects in a preferred embodiment: the first column indicates the type of information stored; the second column indicates the corresponding data object in which the information may be stored; the third column indicates the corresponding data class of which the data object is an instance; and the fourth column indicates the corresponding class from which the data class in the third column is derived. The data classes are identified in the table by reference numerals and preferably have the same identifying label as the data objects to which they correspond, For example, reference numeral 390 in Table 3 refers to the DealerData class 390.

Each of the listed data objects in Table 3 may preferably be treated generically as a CustomizeData object 116 and stored as one of the various CustomizeData objects 116 in the customized database 114.

TABLE 3

| Type of Information | Data Object | Data Class | Class |
| --- | --- | --- | --- |
| dealer | DealerData object 156 | 390 | 330 |
| salesperson | ListOfSalesPersonsData object 158 | 392 | 330 |
| language | LanguageData object 160 | 394 | 330 |
| password | PasswordData object 164 | 396 | 330 |

The dealer, salesperson and language information may be restricted using a password entry system.

Referring now to FIG. 2 in combination with FIG. 9, the static database 105 may electronically store the following: a plurality of environment pictures 122, and a plurality of environment text 124, both of which are related to the environment in which the product may be used; a plurality of product pictures 126, and a plurality of product text 128, both of which are related to features and benefits of the product; a plurality of product specifications 121 which relate to the technical details of the product; a plurality of price specifications 125 which determine the price of the product; a plurality of performance specifications 123 which represent the performance of the product; a plurality of trademark pictures 127 which identify the product; a plurality of product descriptions 131 which describe the various products; and a plurality of life cycle specifications 129 which determine the projected cost involved in owning the product. The static database 105 may be stored on optical media. The contents of the static database 105 preferably cannot be altered by the user of this application. Changes to the static database 105 may be distributed to some or all of the users of this application on either optical or magnetic media.

Referring now to FIG. 2, in combination with FIG. 14, the difference database 107 may electronically store the updates to the static database 105. If the static database 105 is stored on optical media, a difference database 107, stored on magnetic media, may be used to store information that reflects net changes to the contents of the static database 105. In the event that updates are required for the computer system, these updates are typically stored on magnetic media and sent to all the various owners of the system who will want to update the contents of the static database 105. The difference database 107 may be used to store the updates to the following: the plurality of environment pictures 122; the plurality of environment text 124: the plurality of product pictures 126; the plurality of product text 128: the plurality of product specifications 121; the plurality of price specifications 125: the plurality of performance specifications 123; the plurality of trademark pictures 127; the plurality of product descriptions 131; and the plurality of life cycle specifications 129.

Figure 15:
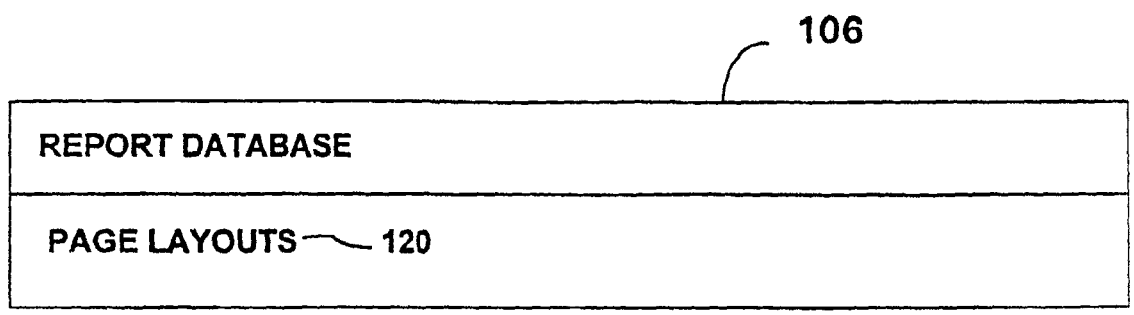
FIG. 15 is a block diagram showing the contents of a report database.

Referring now to FIG. 2, in combination with FIG. 15, the report database 106 may electronically store a plurality of page layouts 120 which are used to format and produce the various pages of information available for inclusion in the printed proposal.

Referring now to FIG. 2, when the user begins a deal with a customer, the user will typically want to gather specific customer and product information regarding this individual customer and the product this customer is interested in purchasing. The user interface 102 is the means by which the user may interactively input predetermined answers to predetermined queries, the predetermined answers corresponding to the individual customer who is to receive the proposal.

Figure 16:
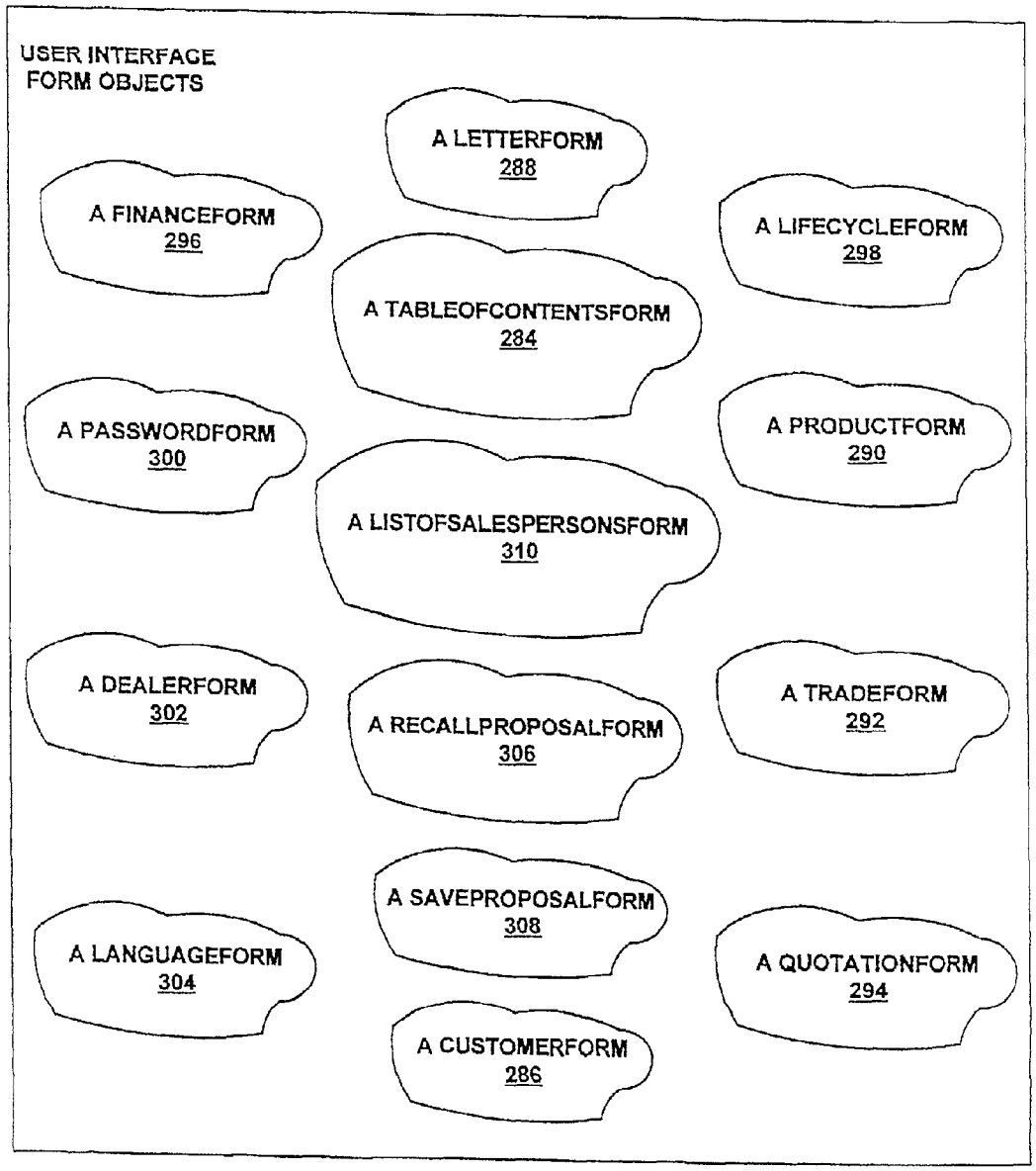
FIG. 16 is an object diagram showing a detailed depiction of the elements in a preferred user interface.

Referring now to FIG. 2 in combination with FIG. 7 and FIG. 16, the user interface 102 typically comprises a collection of Form objects 118 which present a series of predetermined queries related to the varying interests of the different potential customers. The proposal-related information entered interactively by the user on the various Form objects 118 preferably can be altered at any time by the user.

Figure 8:
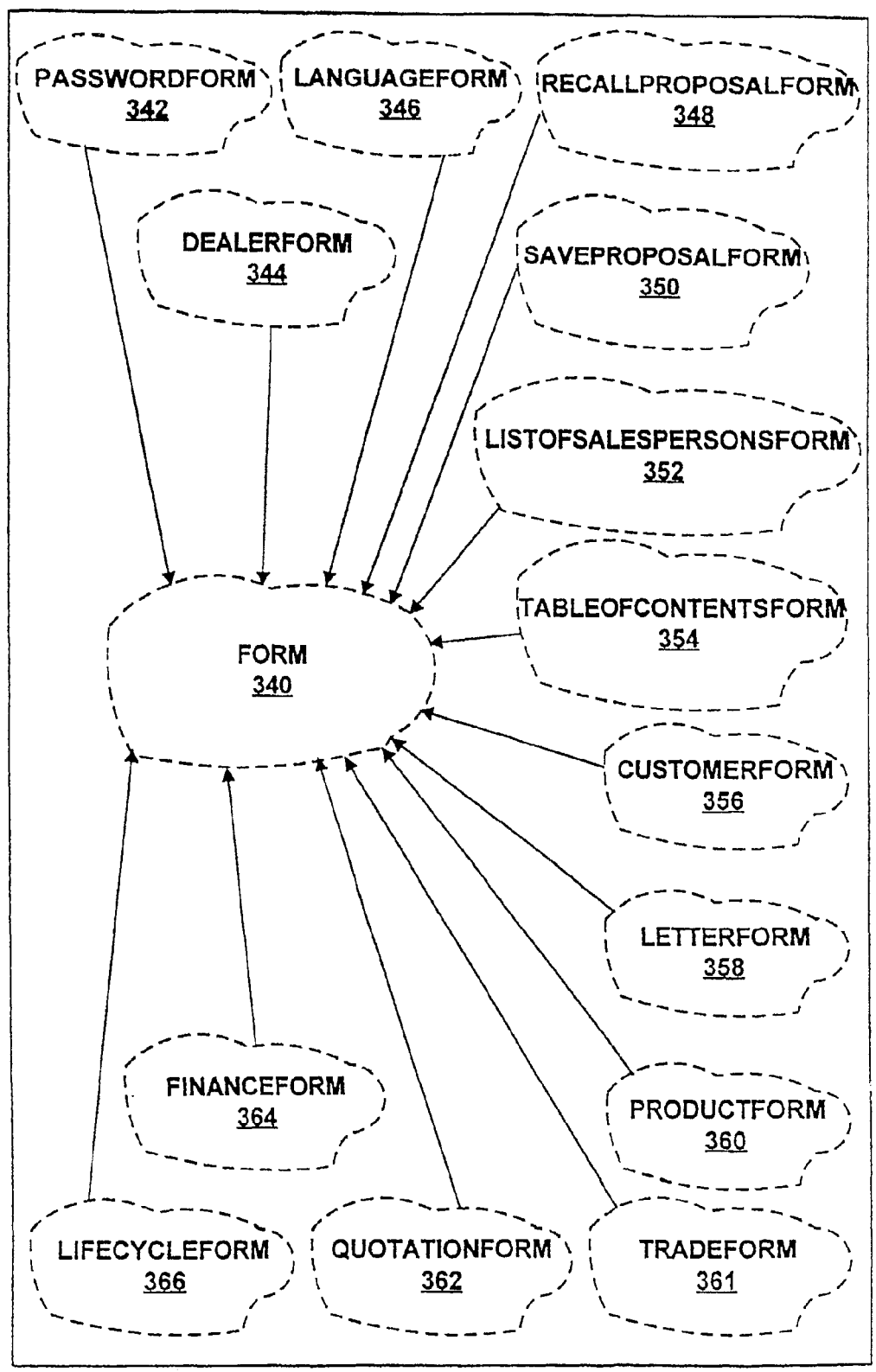
FIG. 8 is a class diagram showing a detailed depiction of the classes in a preferred form class.
Figure 11:
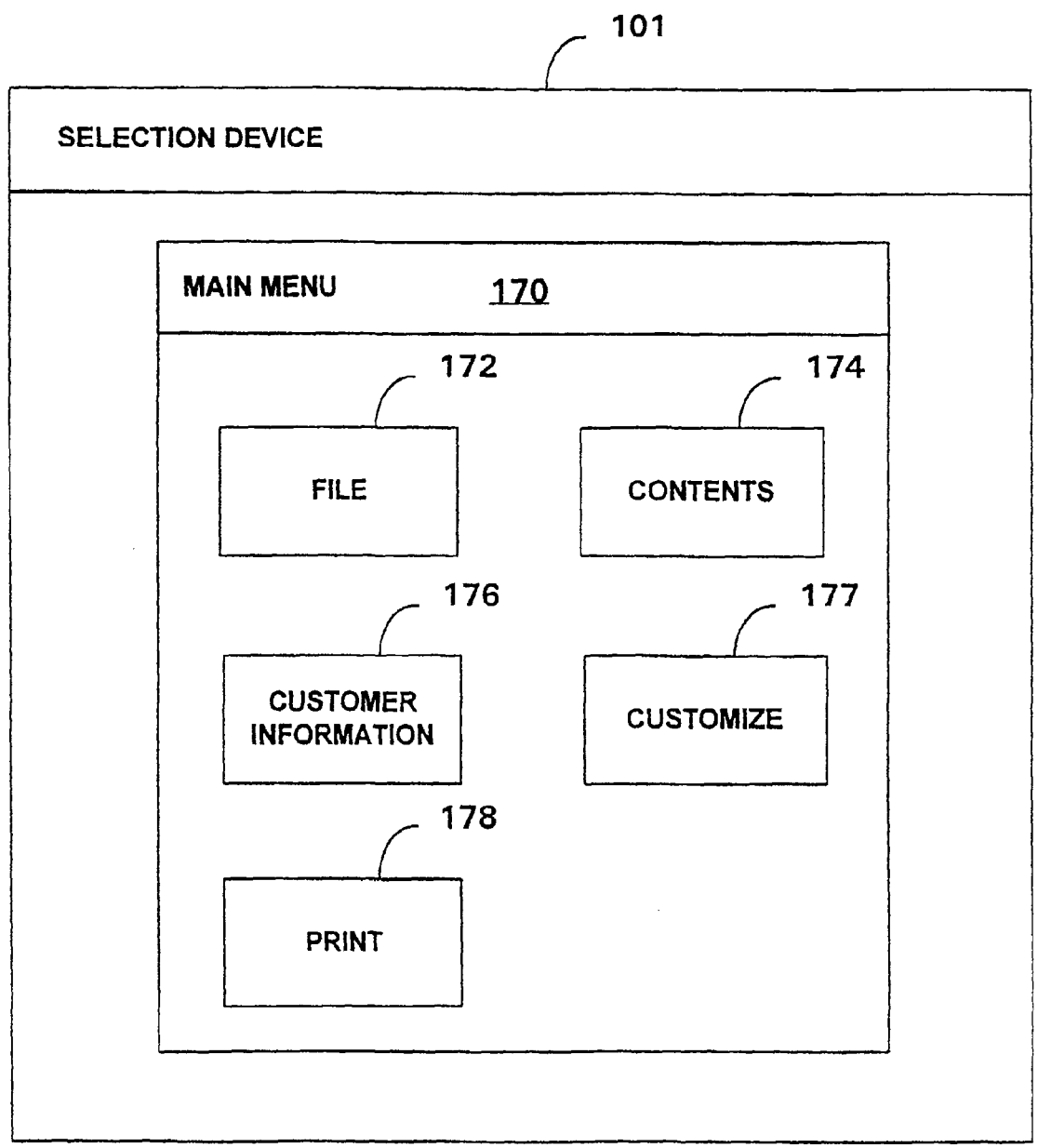
FIG. 11 is a block diagram showing a detailed depiction of the elements in a preferred selection device.

Referring now to FIG. 2, in combination with FIG. 7, FIG. 8, and FIG. 11, the user interface 102 may also control operation of the selection device 101 via the main menu 170 of the selection device. The main menu 170 would typically include choices that prompt the selection device 101 to send a message to a particular Form object 118 requesting that it display itself.

Figure 12:
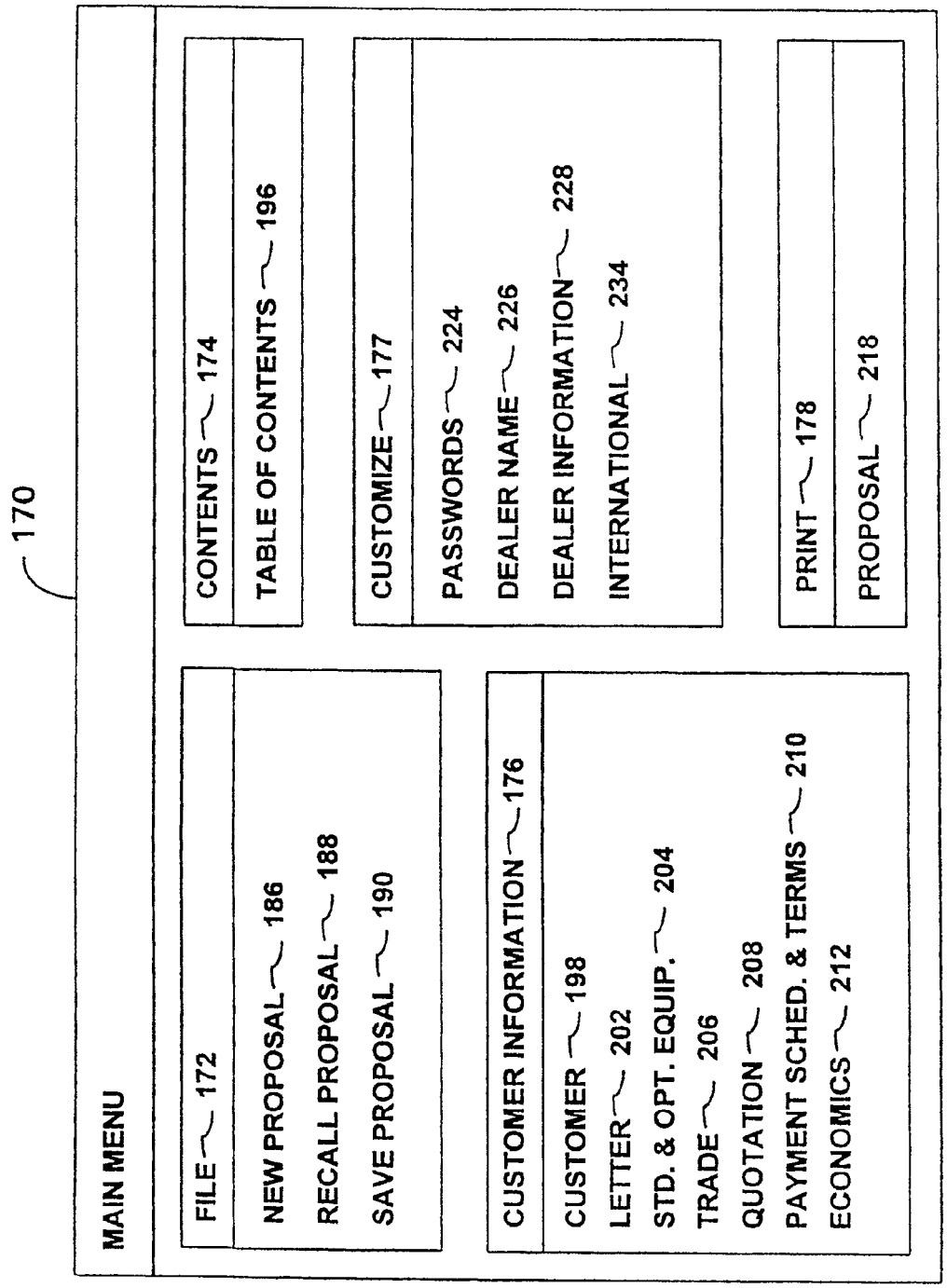
FIG. 12 is a detailed depiction of the elements in a preferred main menu.

Referring now to FIG. 12, when the user is first beginning to deal with a customer, the user will typically need to start a new proposal. The user may select "File" 172 from the main menu 170. Note that labels identifying menu choices may be altered in customized versions of this application designed for different users. The "File" menu 172 contains the option "New Proposal" 186, which the user selects when beginning to deal with a new customer. After the user has begun a new proposal, the information for this new proposal may be stored by selecting "Save Proposal . . . " 190 from the "File" menu 172. After a proposal has been stored, the user can modify the stored proposal by selecting the option "Recall proposal . . . " 188 from the "File" menu 172.

Referring now to FIG. 11 in combination with FIG. 8 and FIG. 12, the user may select "Customer Information" 176 from the main menu 170, which opens a window with choices pertinent to customer and product information. These pertinent choices correspond to the various Form objects 118, upon which the user enters information pertaining to this particular customer and the product the customer is interested in purchasing.

Referring now to FIG. 12 in combination with FIG. 3, FIG. 4, FIG. 7, and FIG. 8, the user may select "Customer Information" 176 from main menu 170, then further select "Customer . . . " 198, which opens the CustomerForm object 286. The user may enter customer information via the CustomerForm object 286, which is then preferably stored in the CustomerData object 136 which is one of the ProposalData objects 112 in the proposal object 110 in the active database 103. The user may select "Letter . . . " 202 from "Customer Information" 176 and then enter information via the LetterForm object 288, which is then preferably stored in a LetterData object 138 as one of the ProposalData objects 112 in the proposal object 110. In this same fashion, the user may select "Standard and Optional Equipment . . . " 204 from "Customer Information" 176, and then enter information via the ProductForm object 290, which is then preferably stored in a ProductData object 140 as one of the ProposalData objects 112 in the proposal object 110. The user may select "Trade . . . " 206 from "Customer Information" 176, and then enter information via the TradeForm object 292, which is then preferably stored in a TradeData object 142 as one of the various ProposalData objects 112 in the proposal object 110. In a similar fashion, the user may select "Quotation . . . " 208 from "Customer Information" 176, and then enter information via the QuotationForm object 294, which is then preferably stored in a QuotationData object 144 as one of the various ProposalData objects 112 in the proposal object 110. The user may select "Payment Schedule & Terms . . . " 210 from "Customer Information" 176, and then enter information via the FinanceForm object 296, which is then preferably stored in a FinanceData object 146 as one of the ProposalDatas objects 112 in the proposal object 110. The user may select "Economics . . . " 212 from "Customer Information" 176, and then enter information via the LifeCycleForm object 298, which is then preferably stored in a LifeCycleData object 148 as one of the various ProposalData objects 112 in the proposal object 110.

Referring now to FIG. 12 in combination with FIG. 3, FIG. 6, FIG. 7, and FIG. 8, the owner of the dealership, for example, may select the "Customize" menu 177 from main menu 170, then further select "Passwords . . . " 224, which opens the PasswordForm object 300. The owner enters dealer and salesperson password information via the PasswordForm object 300, which is then stored in a PassWordData object 164 as one of the various CustomizeData objects 116 in the customized database 114 in the active database 103. The owner may select "Dealer Name . . . " 226 from the customized menu selection 177 and then enter information via the DealerForm object 302, which is then preferably stored in a DealerData object 156 which is one of the CustomizeData objects 116 in the CustomizeDataBase 114. The user may select "Dealer Information . . . " 228 from the customized menu selection 177 and then enter salesperson information via the ListOfSalesPersonsForm object 310, which is then preferably stored in a ListOfSalesPersonsData object 158 which is one of the CustomizeData objects 116 in the CustomizeDataBase 114. In this same fashion, the user may select "International" 234 from the customized menu selection 177, and then choose a language on the LanguageForm object 304, which is then preferably stored in a LanguageData object 160 which is one of the CustomizeData objects 116 in the customized database 114.

Computer system 100 may further be enhanced by the addition of a report generator 104.

Referring now to FIG. 2, in combination with FIG. 10, the report generator 104 includes mechanism 262 which comprises means for processing and generating the customized, printed proposal. The report generator 104 may be operatively interconnected to the active database 103, to the static database 105, to the report database 106, to the selection device 101, and to the user interface mechanism 102.

The user may decide to generate a customized, printed proposal to an individual customer relating to the individual customer's interest in a product, the product being characterized by a variety of distinctive features. The customized, printed proposal may include one or more pages comprising the information collected during the process of dealing on the purchase of the product.

Referring now to FIG. 2, in combination with FIG. 10, and FIG. 11, the user may want to generate a printed proposal. In order to do so, the user will typically first need to design a table of contents for the proposal, which entails selecting the individual pages that will be included. Using selection device 101, the user may select "Contents . . . " 174 from the main menu 170. In response, the selection device 101 preferably sends a load message to the TableOfContentsForm object 284, as shown in FIG. 7, in combination with FIG. 16. On receipt of the load message, the TableOfContentsForm object 284 displays itself within the main window of the selection device 101, as shown in FIG. 13.

Figure 3:
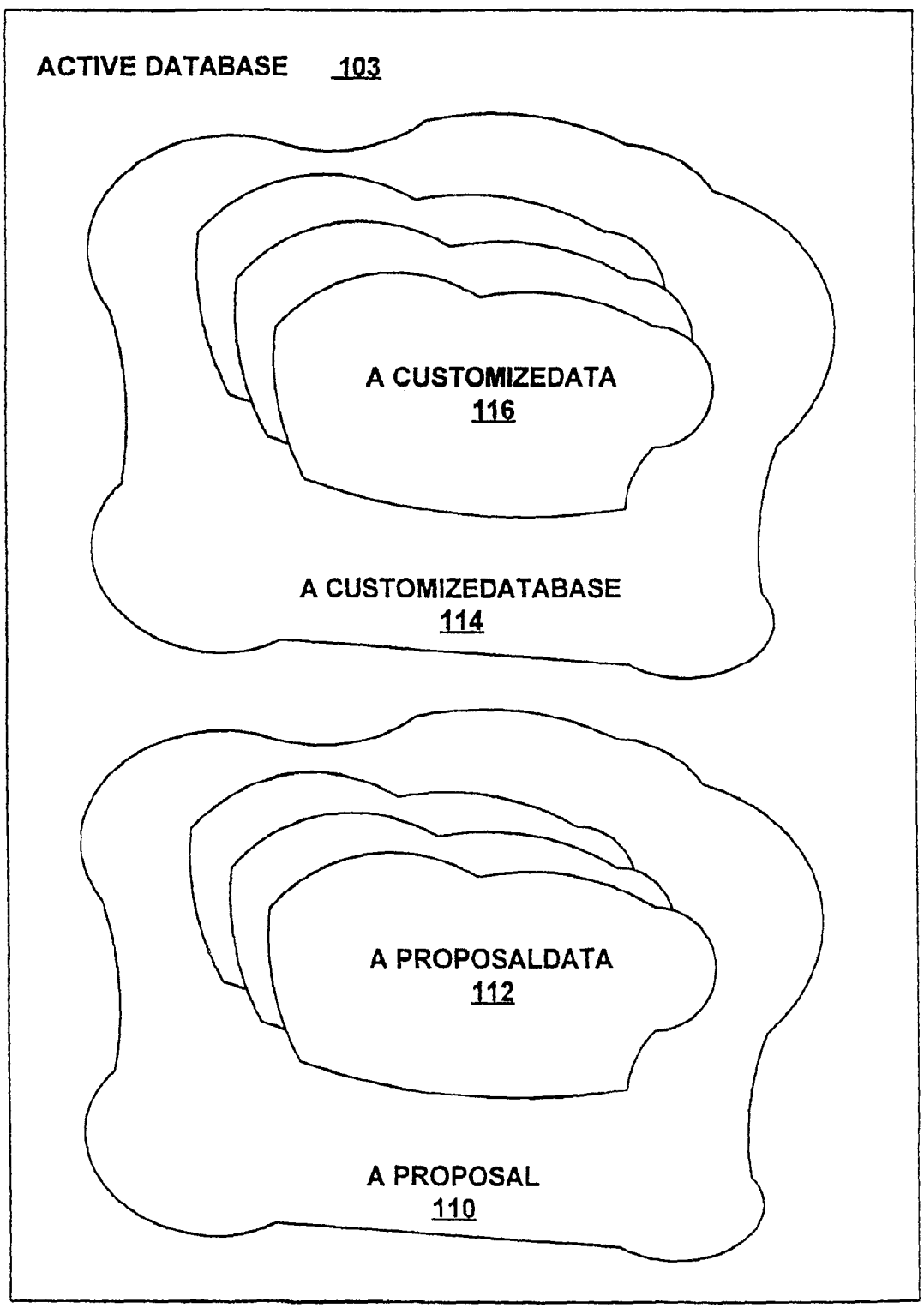
FIG. 3 is an object diagram showing an active database.
Figure 4:
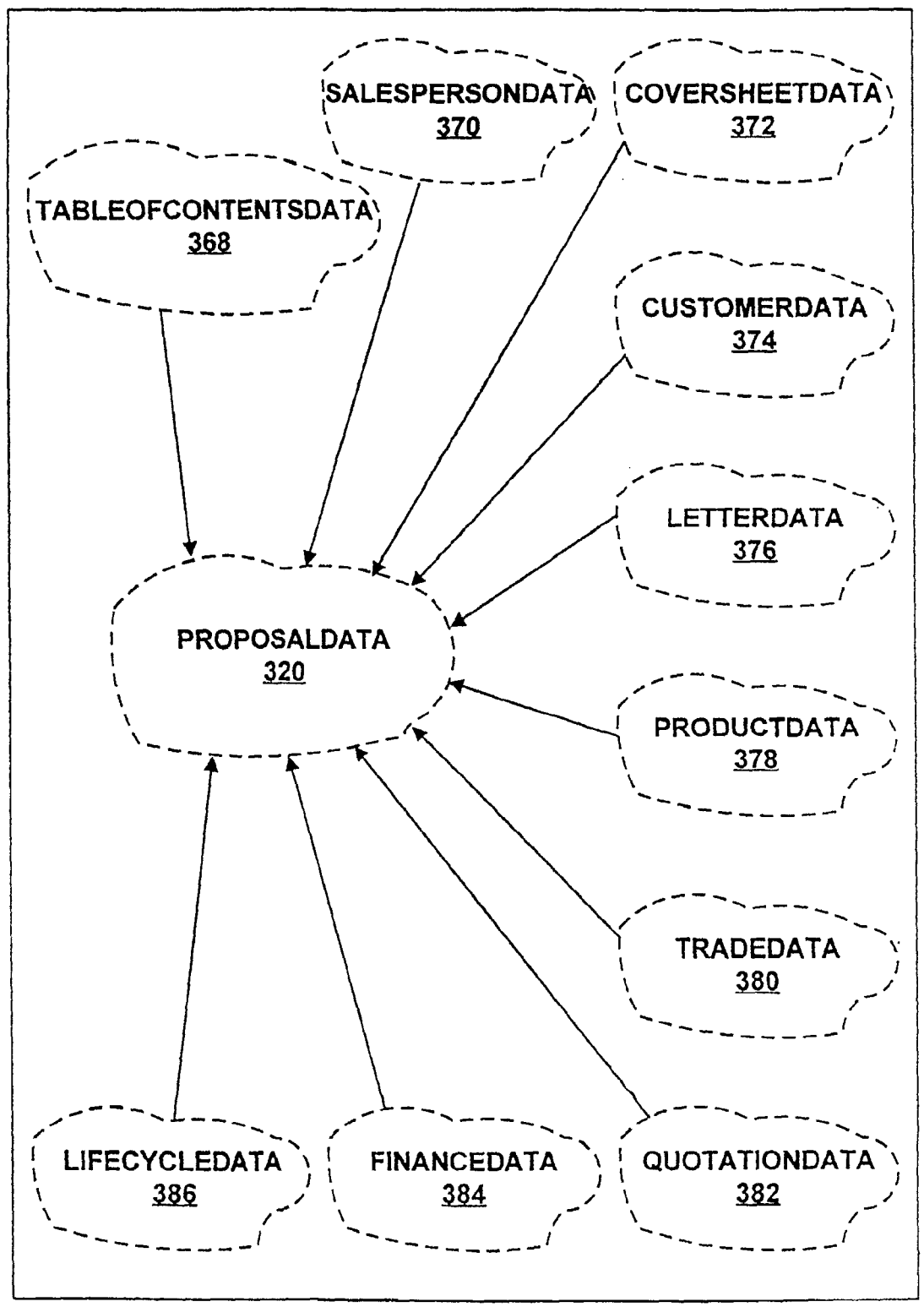
FIG. 4 is a class diagram showing a detailed depiction of the classes in a preferred proposal data class.
Figure 17:
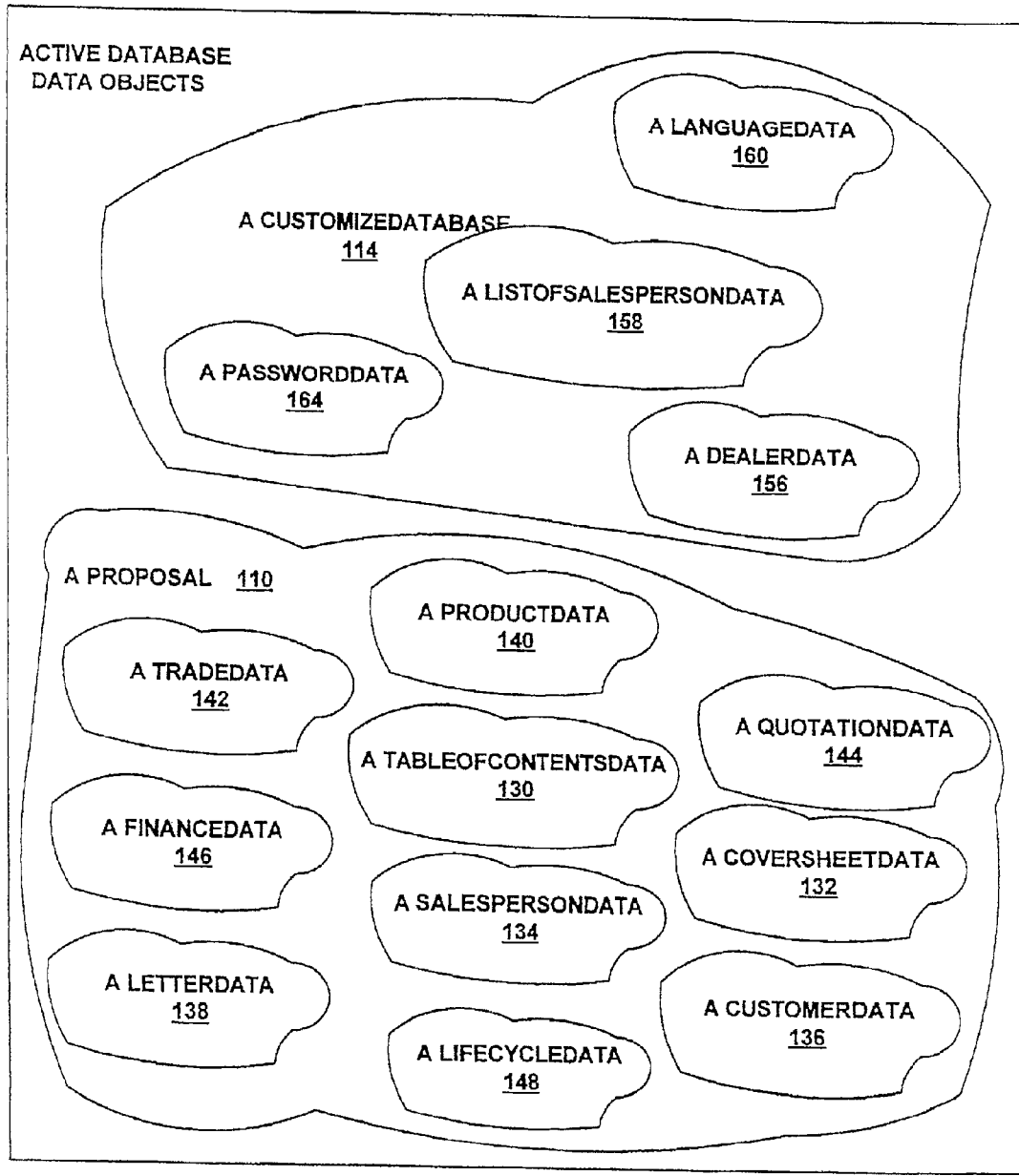
FIG. 17 is an object diagram showing a detailed depiction of the elements in an active database.
Figure 18:
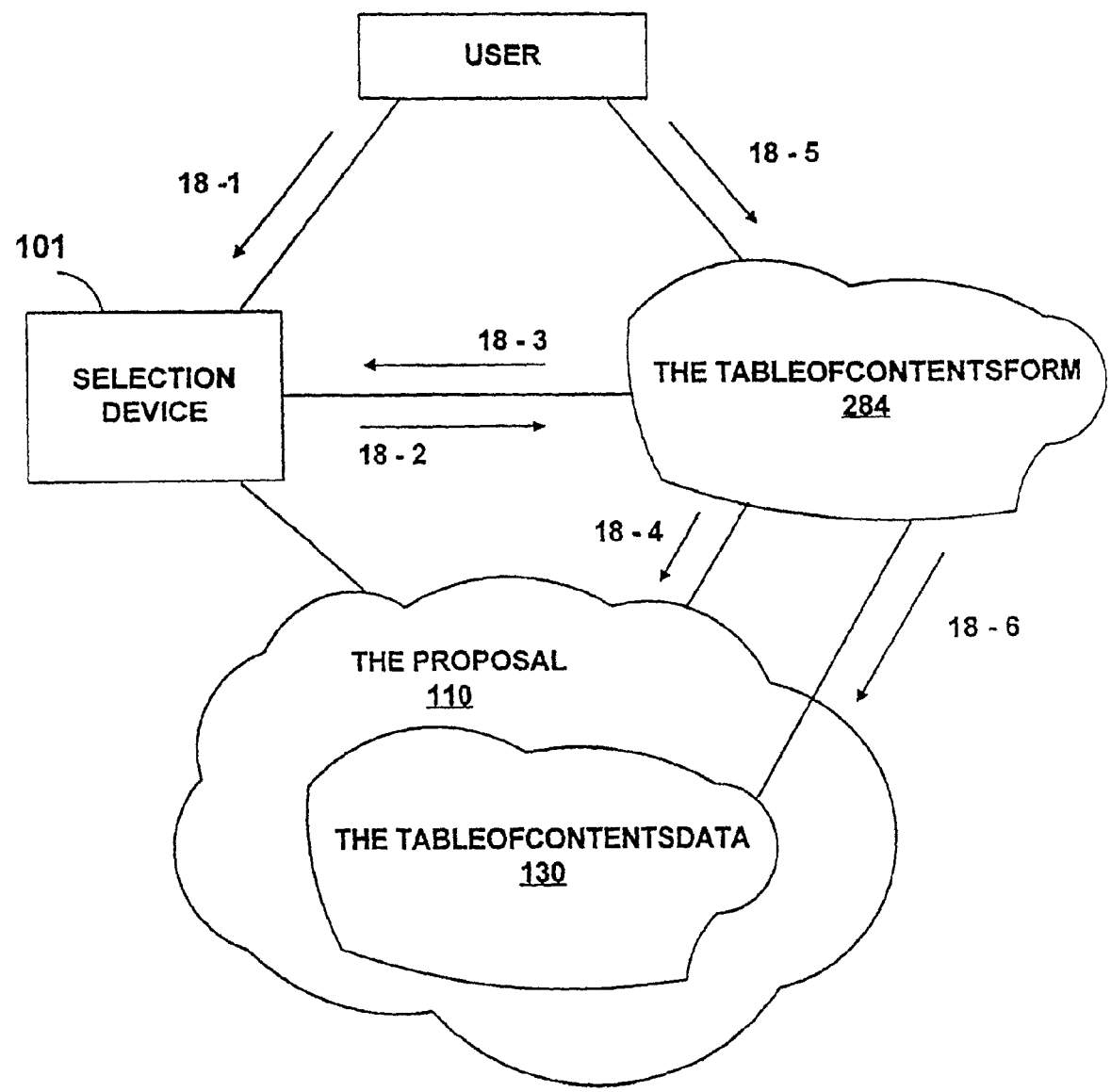
FIG. 18 is an object diagram illustrating a preferred flow of control involved when selecting pages to print.

Referring now to FIG. 16, in combination with FIG. 7, FIG. 3, and FIG. 17, upon loading itself, the TableOfContentsForm object 284 may obtain a pointer to the proposal object 110, from which the TableOfContentsForm object 284 then obtains a pointer to the TableOfContentsData object 130.

Figure 5:
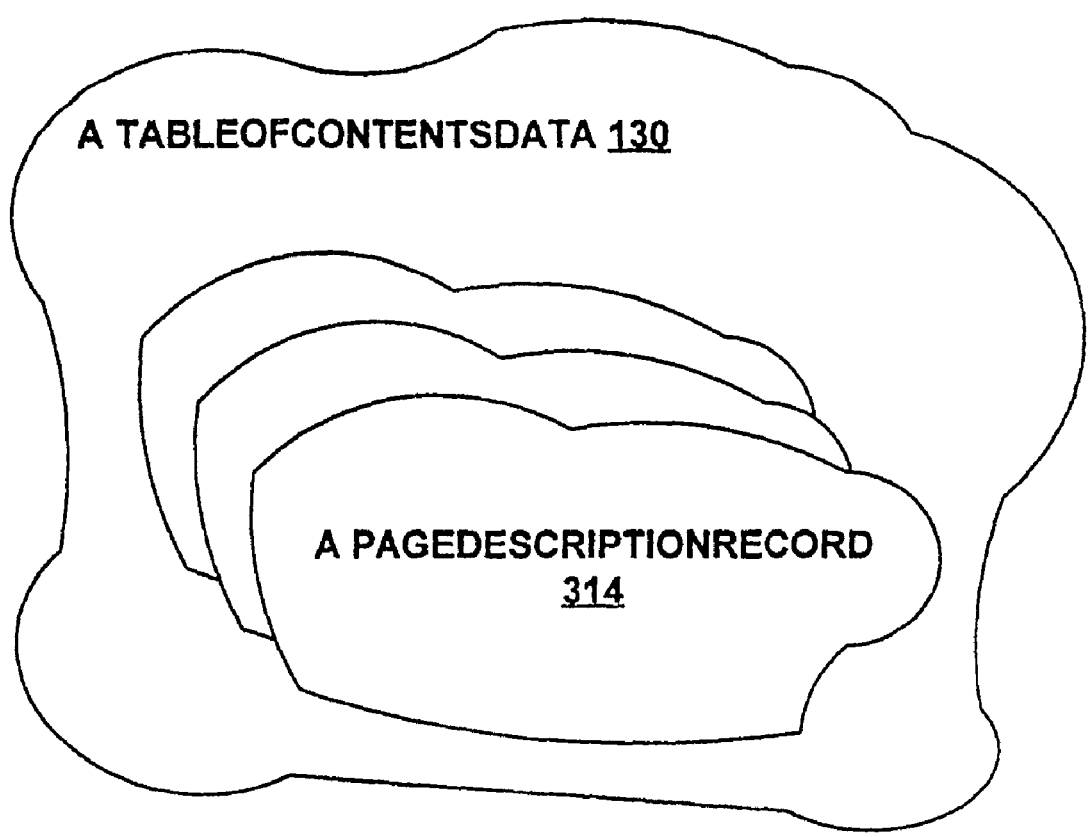
FIG. 5 is an object diagram showing a detailed depiction of a preferred table of contents object.
Figure 6:
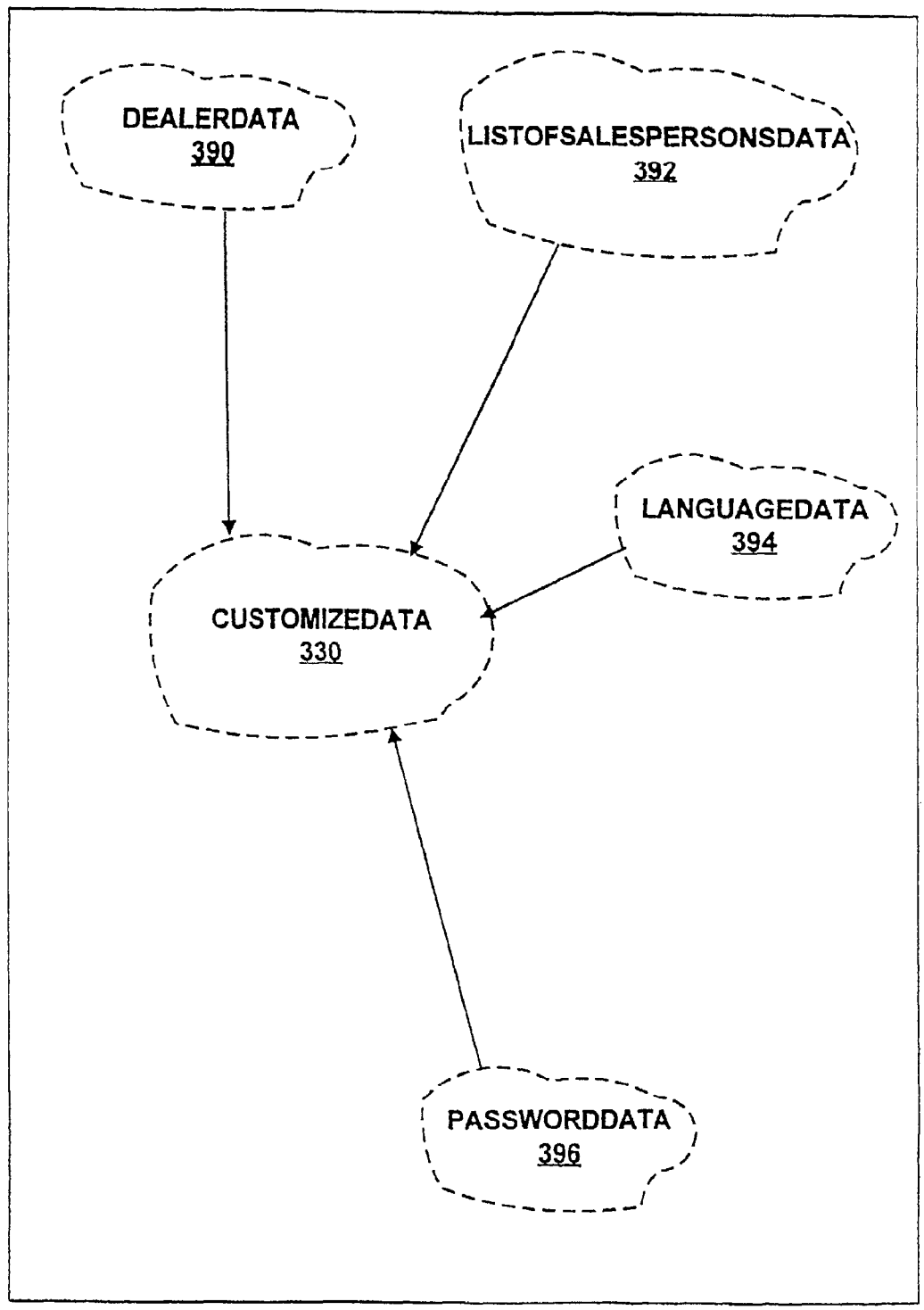
FIG. 6 is a class diagram showing a detailed depiction of the classes in a preferred customized data class.

Referring now to FIG. 13, the user selects the desired proposal pages, referred to as the current publication 260, from a list of pages, referred to on screen as "Table of Contents" 196, that are available for inclusion in the printed proposal. As the user selects the desired pages from "Table of Contents" 196, these pages then preferably list themselves on-screen under the heading "Current Publication." The selected pages, "Current Publication" 260, may be stored as PageDescription records 314 in the TableOfContentsData object 130, as shown in FIG. 5. (The contents of the pages to be printed are typically not stored; only the page description records describing the pages to be printed are stored.)

Referring now to FIG. 13, in combination with FIG. 15, and FIG. 5, the PageDescription records 314 may each include a field that contains an identifier that indicates which page layout 120 may be used to format each page in the current publication 260. The page layout 120 determines the content and appearance of the final printed page.

Referring now to FIG. 10, in combination with FIG. 15, and FIG. 5, the report generator 104 includes a mechanism 268 for reading the page description records 314. The report generator 104 typically includes a mechanism 270 for reading the page layout identifiers. The page layout identifiers may indicate which page layouts 120 are to be used to format the particular pages. The page layout identifiers may specify which particular data is required, and also specify where that particular data will appear on the printed page. The report generator 104 provides a mechanism 285 for linking the page layout identifiers with the particular data that is to appear on the printed page. The report generator 104 typically includes a mechanism 276 for placing the retrieved data in the appropriate locations on the page as described in the page layout.

Referring now to FIG. 2, in combination with FIG. 12, the user may decide to print the customized proposal for an individual customer. The user preferably selects "Print" 178 from the "File" menu 172, and further selects "Proposal" 218. The selection device 101 then sends a print request to the report generator 104.

Referring now to FIG. 10, in combination with FIG. 2, FIG. 3, and FIG. 9, the report generator 104 may include a mechanism 264, which queries the active database 103. The report generator 104 may include a mechanism 272 for locating and retrieving data from the active database 103. This active data typically includes the customer and product information entered by the user via the user interface 102, the information which comprises the predetermined answers to predetermined questions, the predetermined answers corresponding to the individual customer who is to receive the proposal. The report generator 104 preferably provides a mechanism 285 for linking these predetermined answers (active data) with the predetermined product pictures and text (static data) related to the individual features, benefits and environments that are of particular interest to the individual customer. These predetermined pictures and text may be obtained from the static database 105. The report generator 104 preferably includes the following mechanisms: mechanism 266, which queries the static database 105; mechanism 274 for locating and retrieving data from the static database 105; a dealer personalization mechanism 280 for generating a printed proposal automatically customized for a particular dealer; a customer personalization mechanism 282 for generating a printed proposal automatically personalized for a particular customer; and mechanism 278 for generating a printed proposal in a plurality of colors. For example, a generated printed proposal includes high-resolution graphics printed in real-life, photographic-quality colors, producing a printed picture of a superior nature that enhances the readability as well as the overall appearance of the printed proposal.

The following is a description of a preferred embodiment of the computerized system for generating a customized, printed proposal for an individual customer's purchase of a product. The system as generally described in FIG. 2 through FIG. 17 will further be detailed in the following discussion and FIG. 18 through FIG. 42. In the preferred embodiment discussion that follows, the user may select from several generic types of pages to include in the printed proposal. The types of pages typically include cover sheets, personalized letters, product description pages, product specification pages, performance specification pages, trade-in specification pages, product Price Quotation pages, Finance plan pages, Life Cycle evaluation pages, Table of Contents pages, and a Signature page. In the preferred embodiment, a Trademark may be printed on any of the pages of the proposal, and the proposal may be printed in anyone of a plurality of languages.

Proposal: Cover Sheet

The user may decide to generate a customized, printed proposal that includes a cover sheet 250. To include this cover sheet 250, the user may select "Contents" 174 from the main menu 170 of the selection device 101, as shown by step 18-1 of FIG. 18. In response, the selection device 101 preferably sends a load message to the TableOfContentsForm object, as shown by step 18-2 of FIG. 18. On receipt of the load message, the TableOfContentsForm object displays itself within the main window of the selection device 101. Upon loading itself, the TableOfContentsForm object may obtain a pointer to the proposal object 110, as shown by step 18-3 of FIG. 18. The TableOfContentsForm object then obtains a pointer from the proposal object 110 to the TableOfContentsData object 1-30, as shown by step 18-4 of FIG. 18. The user may then select the desired "Cover Page" 250 from a list of pages that are available for inclusion in the printed proposal, as shown by step 18-5 of FIG. 18. The selected page may be stored as a PageDescription record in the TableOfContentsData object 130, as shown by step 18-6 of FIG. 18. This PageDescription record may include a field that contains an identifier that indicates which page layout 120 may be used to format the cover sheet 250. The page layout 120 determines the content and appearance of the final printed page. The page layouts 120 may be stored in the report database 106.

Figure 19:
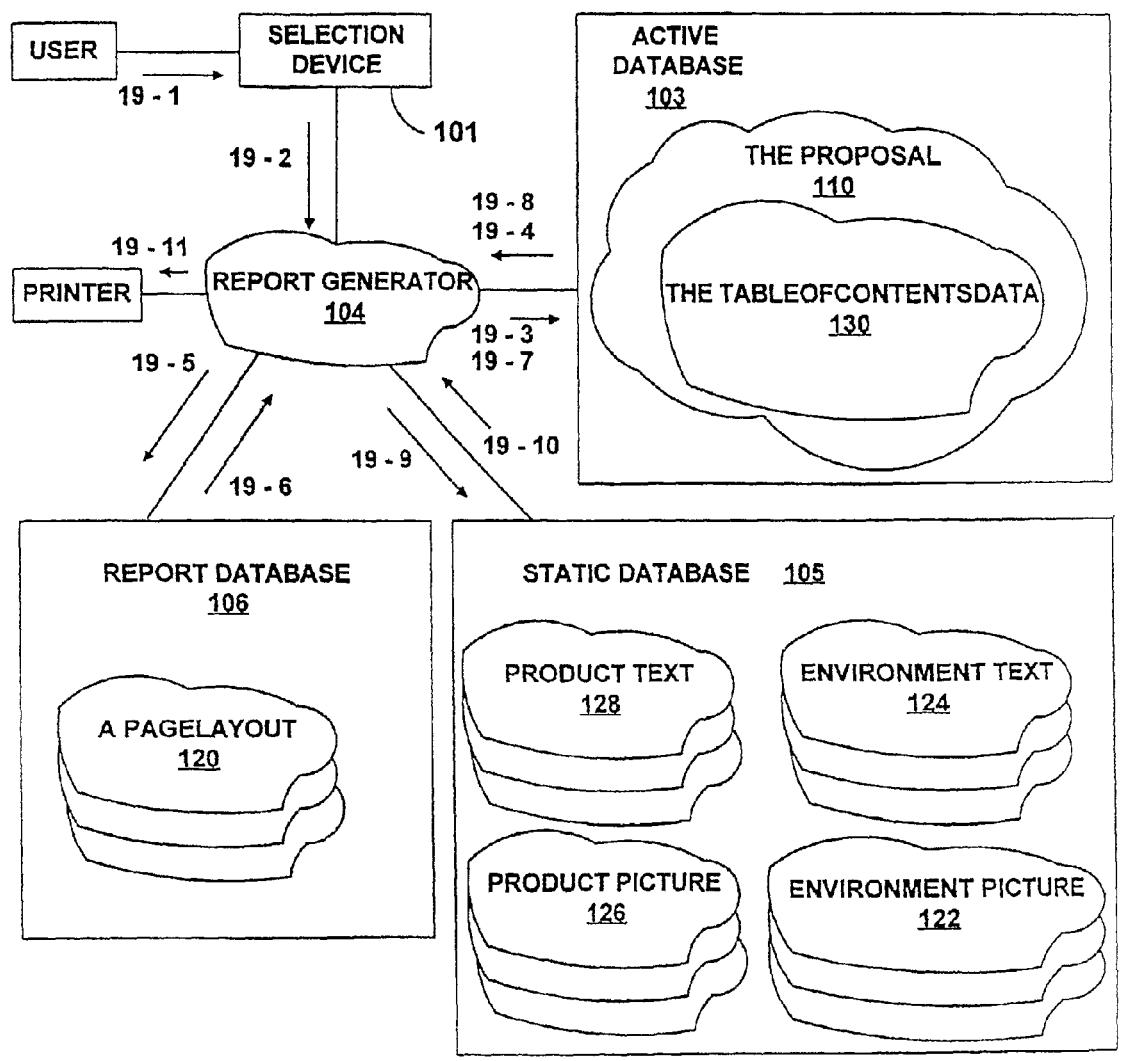
FIG. 19 is an object diagram illustrating a preferred flow of control involved when generating a cover sheet.
Figure 20:
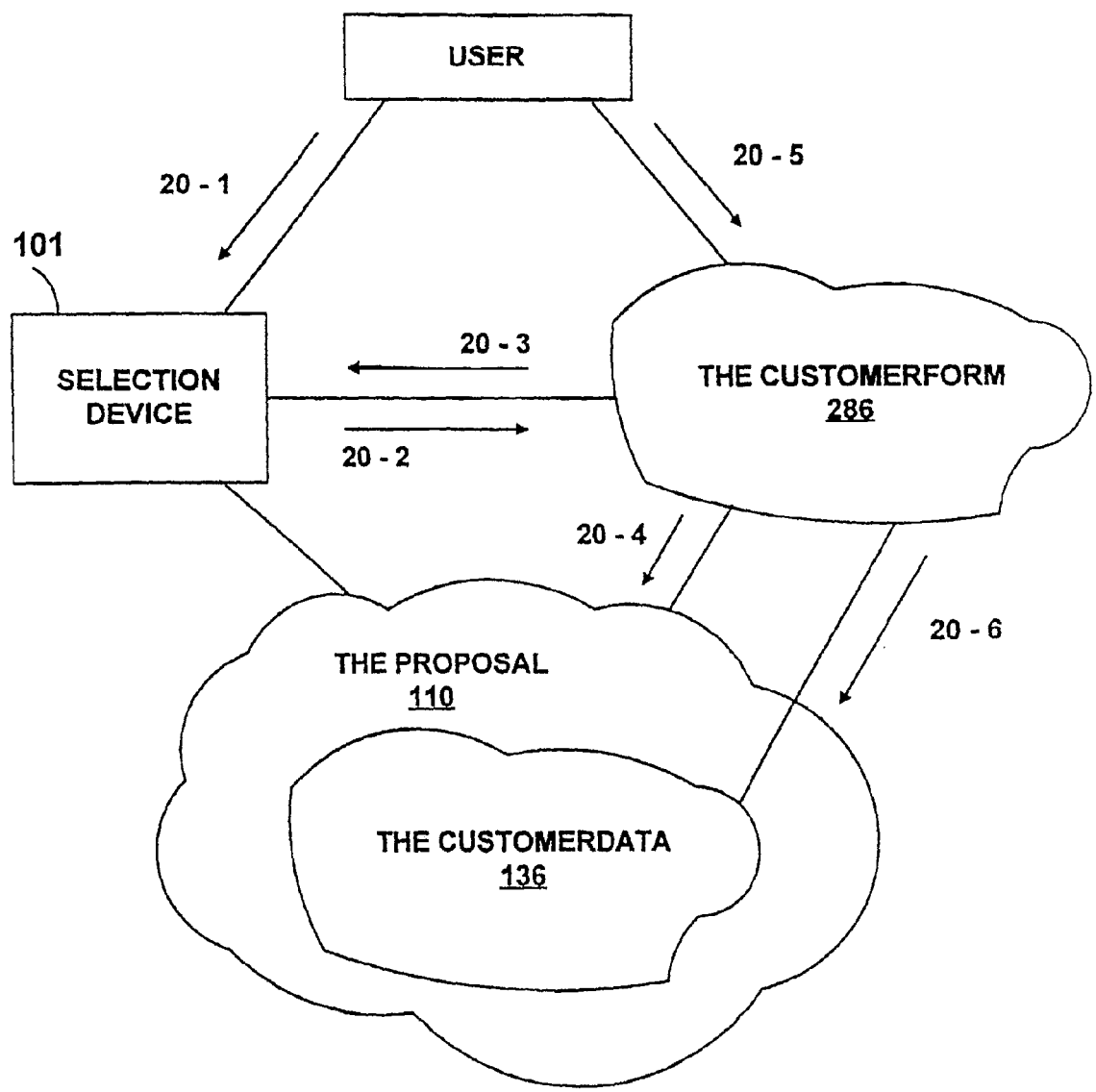
FIG. 20 is an object diagram illustrating a preferred flow of control involved when entering customer identification data.

To initiate the printing of the pages of the cover sheet 250, the user may select "Print" 178 from the main menu 170 of the selection device 101, as shown by step 19-1 of FIG. 19. In response, the selection device 101 preferably sends a print request to the report generator 104, as shown by step 19-2 of FIG. 19. The report generator 104 typically queries the active database 103 for successive page description records that describe the pages of the printed proposal, as shown by step 19-3 of FIG. 19. The active database 103 processes the request by searching the TableOfContentsData object 130 located in the current proposal. If the proposal is to include one or more cover sheet 250 pages comprising predetermined pictures and text related to features, benefits and environments of interest to the customer, the active database 103 preferably queries the TableOfContentsData object 13Q for the applicable PageDescriptionRecord 314. The TableOfContentsData object 130 returns the relevant PageDescription Record 314 to the active database 103. The active database 103 may then send the relevant PageDescriptionRecord 314 to the report generator 104, as shown by step 19-4 in FIG. 19. These PageDescriptionRecord 314 may include a field that contains an identifier that indicates which page layouts 120 may be used to format these particular cover sheet 250 pages. The report generator 104 preferably queries the report database 106 for the applicable page layouts 120, as shown by step 19-5 in FIG. 19. The report database 106 may return the relevant page layouts 120 to the report generator 104, as shown by step 19-6 in FIG. 19.

Each page layout 120 typically contains formatting specifications that indicate where specific cover sheet 250 information may appear on the printed page. The report generator 104 reads each format specification to determine the data required at that location on the page.

The report generator 104 retrieves the text and pictures relating to features, benefits and environments of particular interest to the customer from the static database 105 object, as shown by step 19-9 in FIG. 19. The static database 105 will preferably return this information to the report generator 104, as shown by step 19-10 in FIG. 19. The report generator 104 typically repeats this process for each format specification on the page layout 120, which builds a cover sheet 250 page that may then be sent to the printer, as shown by step 19-11 in FIG. 19. In this fashion, the Report Generator 104 may print one or more customized and individualized cover sheet 250 pages.

The user interface 102 provides means for inputting the customer identification data of the individual customer who is to receive the proposal. The user may select "Customer Information" 176 from the main menu 170 of the selection device 1001, as shown by step 20-1 in FIG. 20. In response, the selection device 1001 preferably sends a load message to the CustomerForm object 286, as shown by step 20-2 in FIG. 20. On receipt of the load message, the CustomerForm object 286 displays itself in a window within the main window of the selection device 101. The CustomerForm object 286 may request a pointer to the current proposal, as shown by step 20-3 in FIG. 20. The CustomerForm object 286 typically requests from the current proposal pointer to the Customer-Data object 136 for this proposal, as shown by step 20-4 in FIG. 20.

The CustomerForm object 286 presents a user interface 102 typically comprising text entry fields and predetermined questions for the user. The text entry fields allow the user to input the name, address, telephone number and other identification data of the individual customer who is to receive the proposal, as shown by step 20-5 in FIG. 20. The predetermined questions allow the user to select one of a list of predetermined answers that correspond to the individual customer who is to receive the proposal. The customer information gathered by the CustomerForm object 286 may be stored in a CustomerData object 136 within the current proposal, as shown by step 20-6 in FIG. 20.

The cover sheet 250 page layout 120 may specify that the name, address and telephone number or other identification data of the customer appear on the cover sheet 250. The customer information may be stored in the CustomerData object 136 attached to the proposal.

Figure 21:
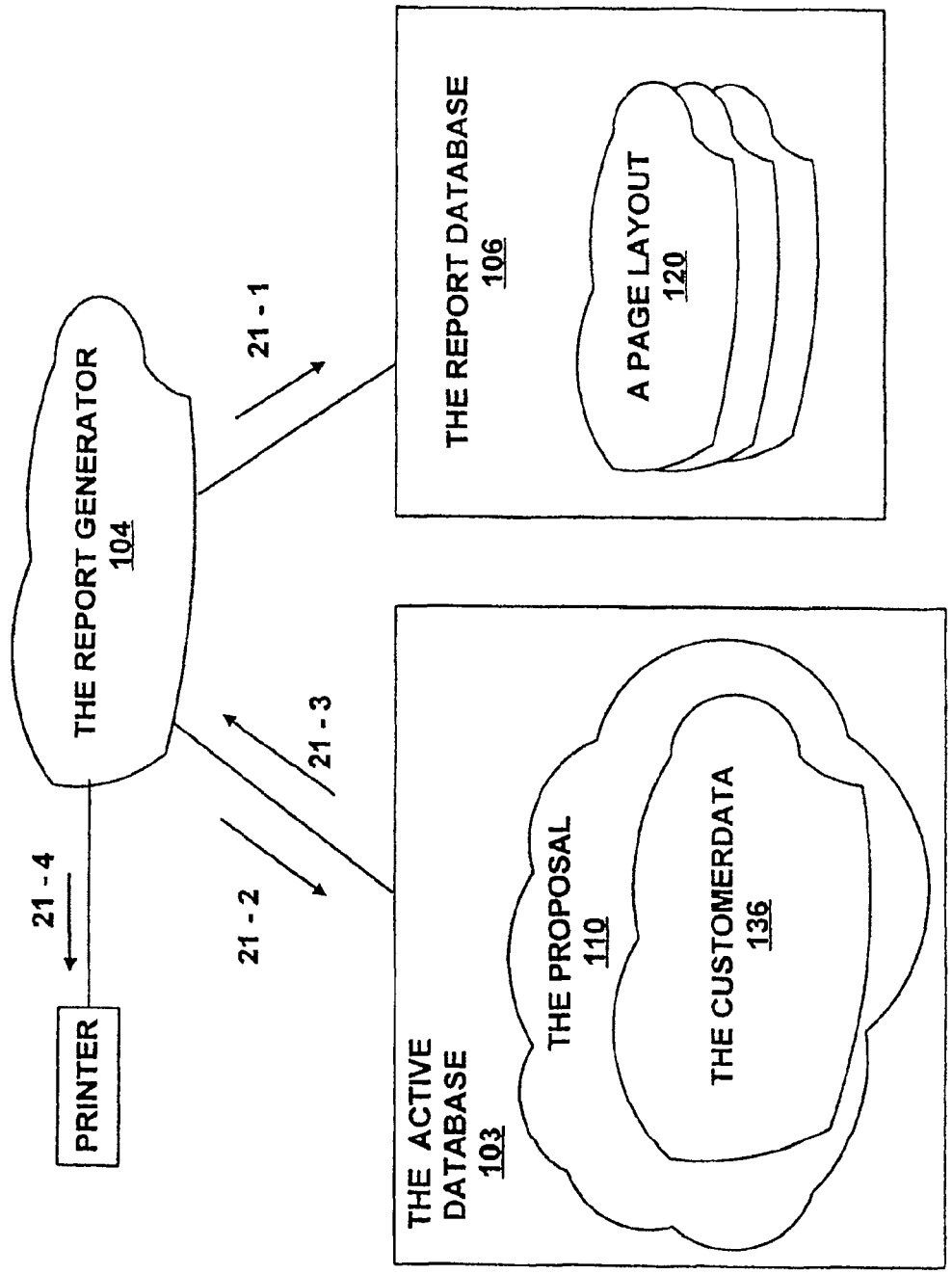
FIG. 21 is an object diagram illustrating a preferred flow of control involved when generating customer identification data.

The report generator 104 preferably reads format specifications from the page layout 120 via the report database 106, as shown by step 21-1 in FIG. 21. When the particular formatting specification in the page layout 120 requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object 110. The active database 103 then returns this information to the report generator 104, as shown by step 21-3 in FIG. 21. The report generator 104 preferably builds the page using this information and sends it to the printer, as shown by step 21-4 in FIG. 21.

The user interface 102 may also provide means for inputting the salesperson identification data of the salesperson who is dealing with the individual customer. When a salesperson first accesses the selection device 101 to begin a proposal for a customer, a PasswordForm object is preferably displayed automatically. The salesperson may enter his/her name and password using the PasswordForm object 300, as shown by step 22-1 in FIG. 22. The PasswordForm object 300 typically requests from the selection device 101 a pointer to the ListOfSalesPersonsData object 158 in the customized database 114, as shown by step 22-2 in FIG. 22. The PasswordForm object 300, using this salesperson's password may locate the name, address, and telephone number of the salesperson, which is stored in the customized database 114, in a ListOfSalesPersons object, as shown by step 22-3 in FIG. 22.

Figure 22:
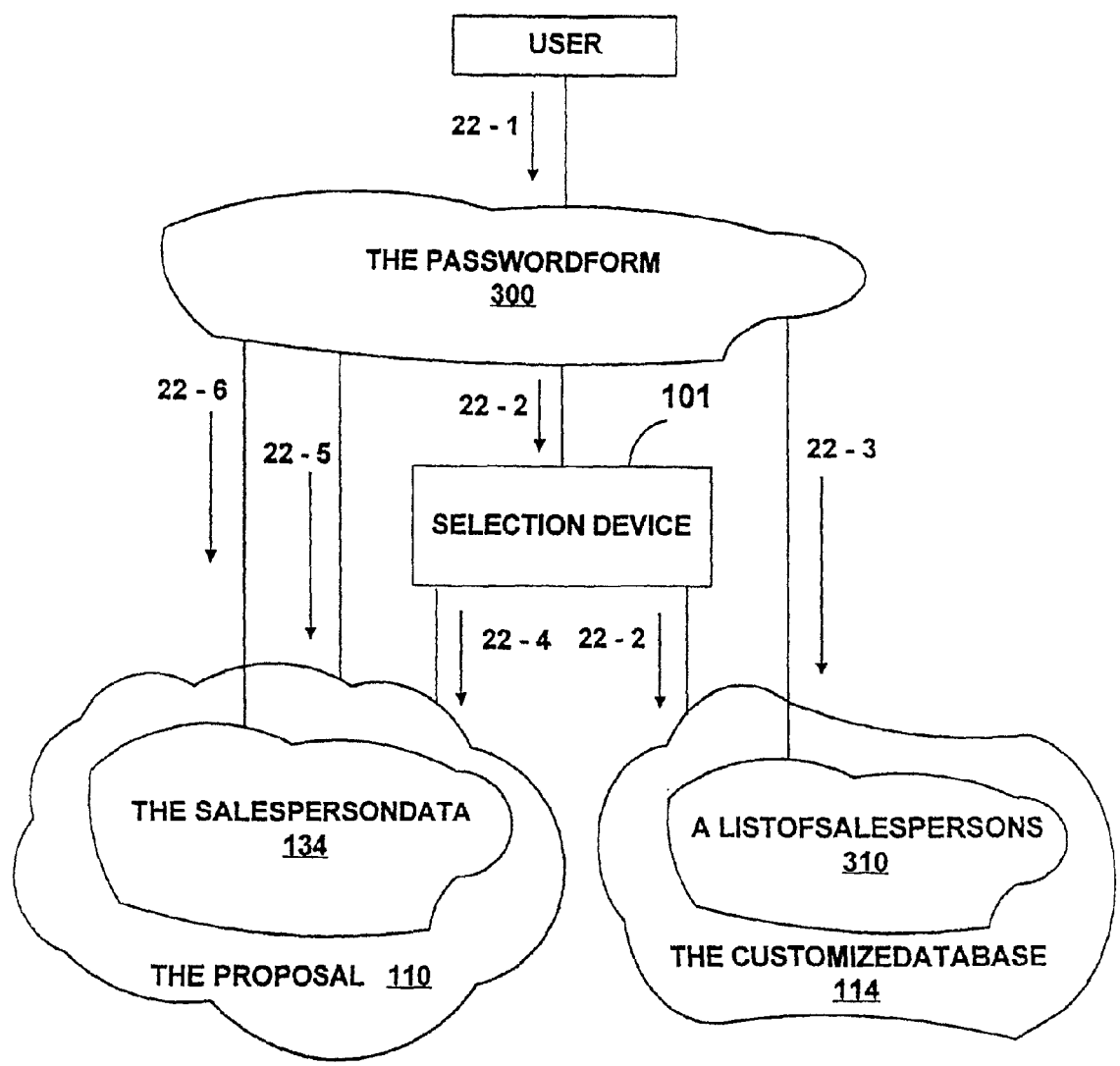
FIG. 22 is an object diagram illustrating a preferred flow of control involved when entering salesperson identification data.

If the salesperson exists in the ListOfSalesPersons object, the selection device 101 will preferably create a new proposal, which will be the current proposal, as shown by step 22-4 in FIG. 22. The PasswordForm object 300 may then obtain a pointer to the SalesPersonData object 134 in the proposal, as shown by step 22-5 in FIG. 22. The salesperson information may be stored in the SalesPersonData object 134 as a part of the current proposal, as shown by step 22-6 in FIG. 22.

Salesperson information for all the employees is preferably stored in the customized database 114 in a ListOfSalesPersons object. The employer may create an individual SalesPerson object for each employee. The ListOfSalesPersons object is a data structure containing a list of SalesPerson objects.

Dealership information may also be stored in the customized database 114 in the DealerName object. The SalesPerson object and DealerName object can be created by the employer when the system is first purchased. The employer may choose to secure these two databases so that only the employer's master password will allow access. These data structures may be modified by the employer via the customized menu selection 177 in the selection device 101.

The user may choose to modify the name, address, and telephone number of the salesperson who is dealing with the individual customer, if the salesperson information is not as it should appear in the printed proposal. To modify the salesperson information, the user may select the appropriate customized menu selection 177 in the main menu 170 of the selection device 101. However, access to the customized menu selection 177 that allows modification of salesperson information and passwords may be restricted. If the employer has secured this data base, only the employer's master password should allow access to the salesperson information.

The cover sheet 250 page layouts 120 may specify that the name, address and telephone number of the salesperson appear on the cover sheet 250. The salesperson information is typically initially entered by the employer in the ListOfSalesPersonsData object 158 and is stored in the individual salesperson's SalesPersonData object 134 attached to the proposal. (See FIG. 22).

Figure 23:
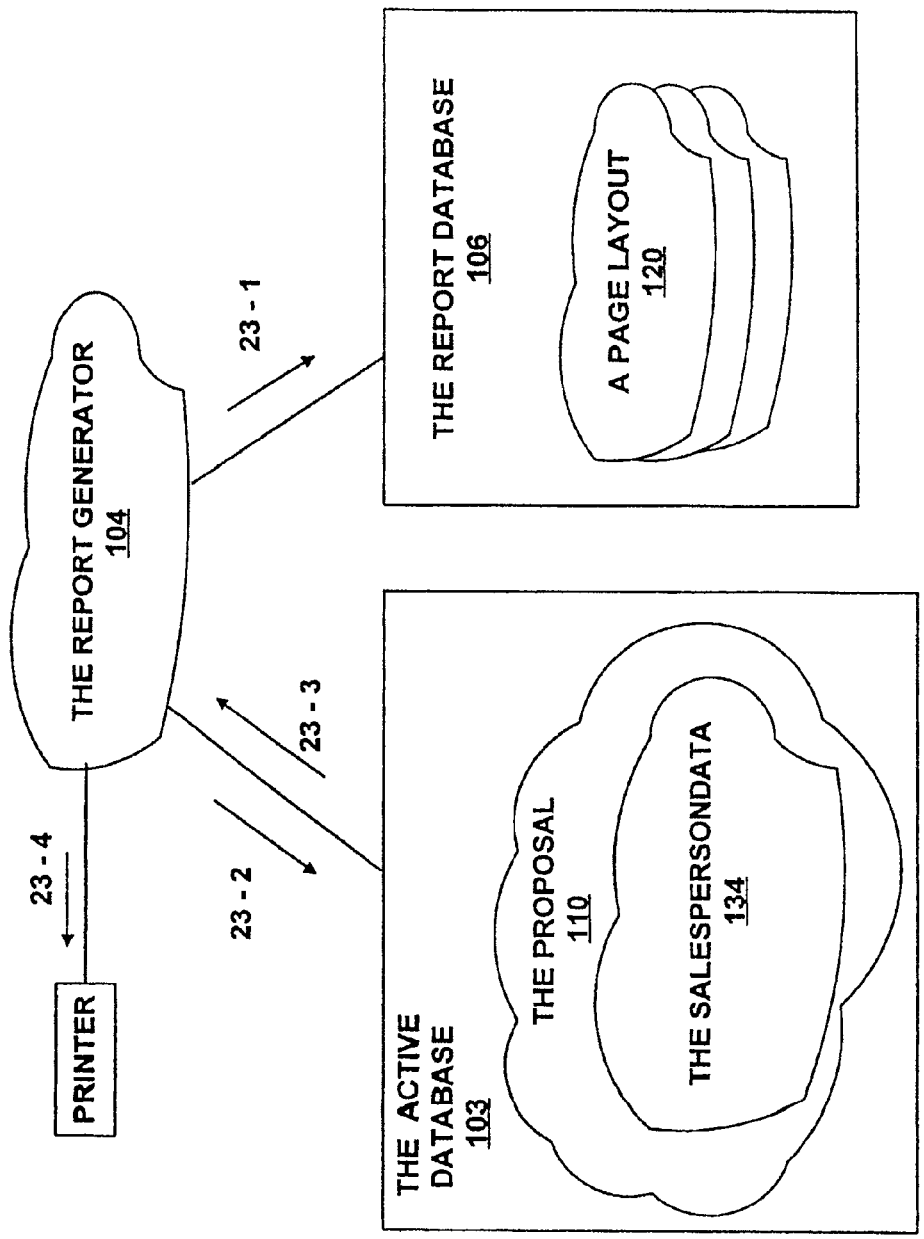
FIG. 23 is an object diagram illustrating a preferred flow of control involved when generating salesperson identification data.

The report generator 104 reads format specifications from the page layout 120 via the report database 106, as shown by step 1-23 in FIG. 23. When the particular format specifiers require the salesperson's name, address and telephone number to be included on a page format, the report generator 104 preferably sends a request to the active database 103 for the specified salesperson information, as shown by step 2-23 in FIG. 23. The active database 103 may obtain this salesperson information from the SalesPersonData object 134 in the proposal and returns this salesperson information to the report generator 104, as shown by step 3-23 in FIG. 23. The report generator 104 preferably builds the page using this salesperson information and sends the page to the printer, as shown by step 4-23 in FIG. 23.

Proposal: Personalized Letter

When the user begins a deal with a customer, the user may want to include a personalized letter 254 in the customized, printed proposal that will be prepared for the customer.

The user interface 102 provides means for presenting a series of predetermined queries related to writing a letter 254 of interest to different potential customers who may purchase a product. The user interface 102 also provides means for inputting individualized answers to the predetermined queries, the individualized answers comprising a personalized letter 254 relating to product configurations that are of particular interest to the individual customer who is to receive the proposal.

Figure 24:
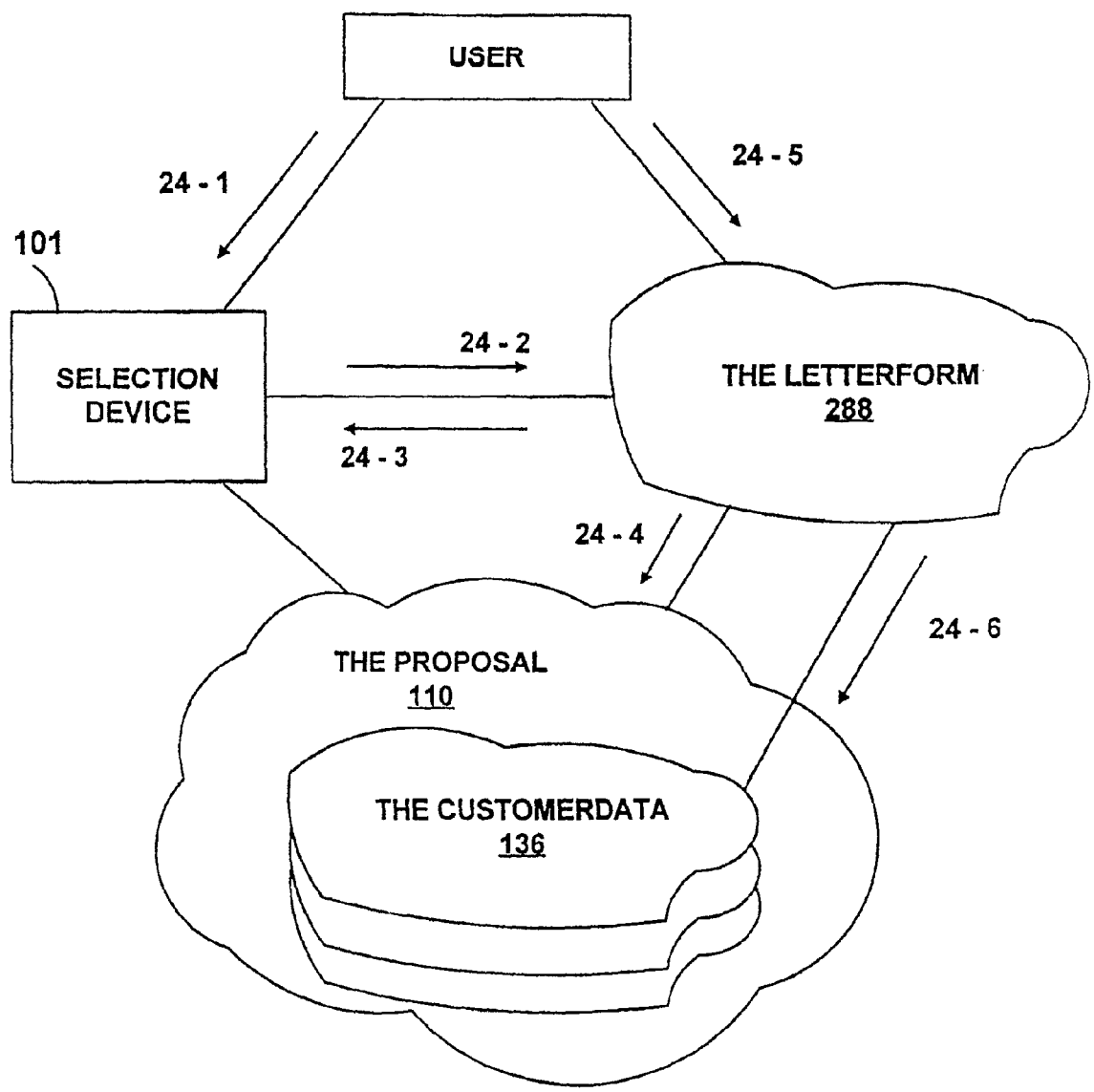
FIG. 24 is an object diagram illustrating a preferred flow of control involved when entering letter information.

The user may select "Customer Information" 176 from the main menu 170 of the selection device 101, as shown by step 24-1 in FIG. 24. The user further selects "Letter" 202 from the "Customer Information" menu 176. In response, the selection device 101 preferably sends a load message to the LetterForm object 288, as shown by step 24-2 in FIG. 24. On receipt of the load message, the LetterForm object 288 displays itself in a window within the main window of the selection device 101. Upon loading itself, the LetterForm object 288 may obtain a pointer to a proposal object 110, as shown by step 24-3 in FIG. 24. The LetterForm object 288 then obtains a pointer from the proposal object 110 to a LetterData object 138, as shown by step 24-4 in FIG. 24.

The LetterForm object 288 preferably presents a user interface 102 to the user comprising text entry fields and predetermined questions for the user, as shown by step 24-5 in FIG. 24. This user interface 102 is a means for inputting individualized answers to the predetermined queries, the individualized answers relating to writing a personalized letter 254 regarding a product configuration that is of particular interest to the individual customer who is to receive the proposal. The predetermined questions allow the user to fill in the text entry fields with predetermined answers that correspond to the customer who is to receive the proposal. The personalized letter 254 information gathered by the LetterForm object 288 may then be stored in the LetterData object 138 which is attached to the current proposal object 110, as shown by step 24-6 in FIG. 24.

The user may decide to generate a customized, printed proposal that includes one or more pages comprising the personalized letter 254. To include these personalized letter 254 pages, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the desired Personalized letter 254 page from a list of pages that are available for inclusion in the printed proposal, as shown by step 18-5 of FIG. 18. The selected pages may be stored as PageDescriptionRecord 314 in a TableOfContentsData object 130, as shown by step 18-6 of FIG. 18. These PageDescriptionRecord 314 include a field that contains an identifier that indicates which page layout 120 may be used to format each personalized letter 254 page. The page layout 120 typically determines the content and appearance of the final printed page. The page layouts 120 may be stored in the report database 106.

Figure 25:
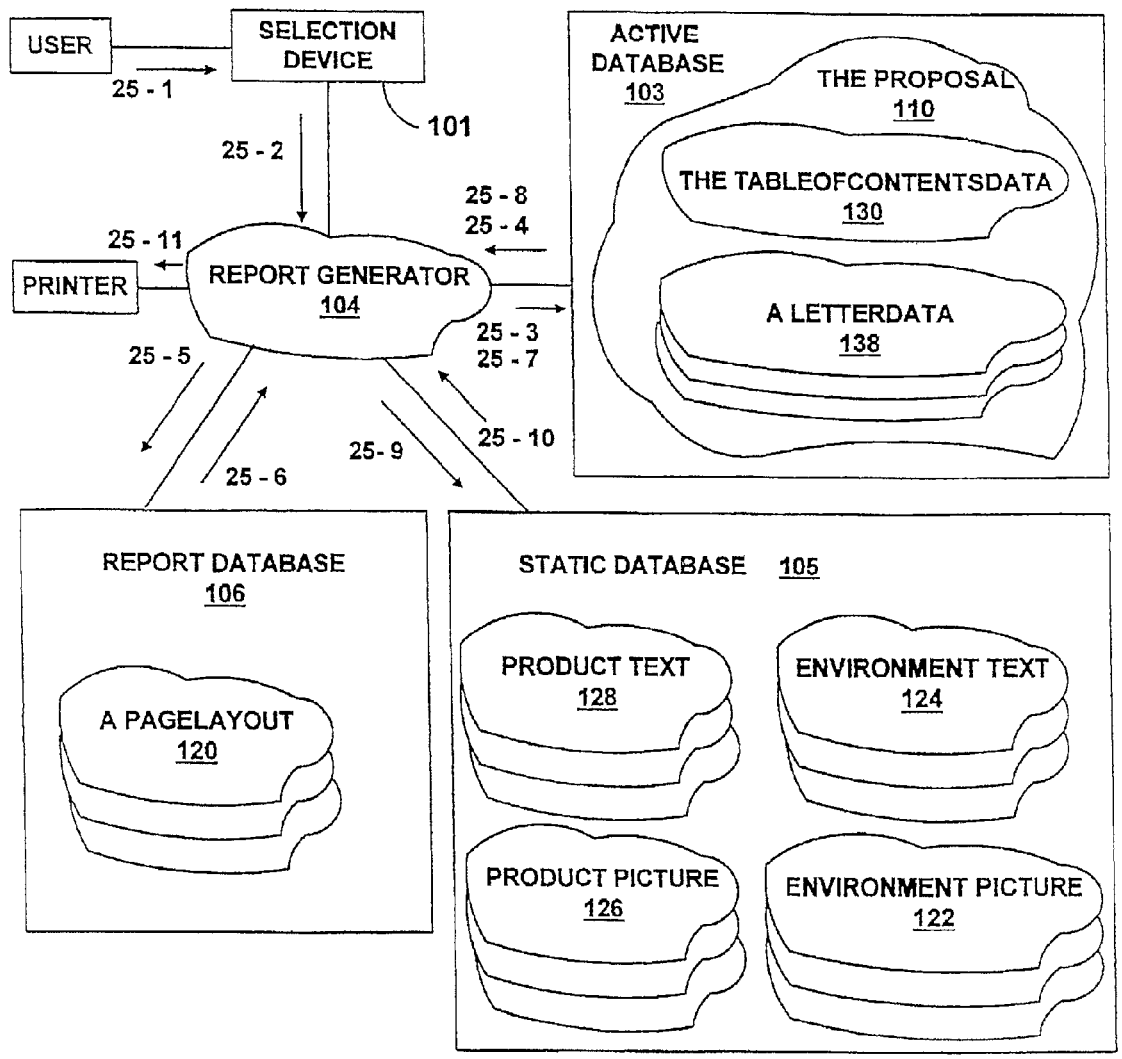
FIG. 25 is an object diagram illustrating a preferred flow of control involved when generating a personalized letter.

To initiate the printing of the personalized letter, the user may select "Print" 178 from the main menu 170 of the selection device 101, as shown by step 25-1 of FIG. 25. In response, the selection device 101 preferably sends a print request to the report generator 104, as shown by step 25-2 of FIG. 25. The report generator 104 queries the active database 103 for successive page description records that describe the pages of the printed proposal, as shown by step 25-3 of FIG. 25. The active database 103 typically processes the request by searching the TableOfContentsData object 130 located in the current proposal. If the proposal is to include one or more pages comprising the personalized letter 254, the active database 103 typically queries the TableOfContentsData object 130 for the applicable PageDescriptionRecord 314. The TableOfContentsData object 130 returns the relevant PageDescriptionRecord 314 to the active database 103. The Active Database 103 may then send the relevant PageDescriptionRecord 314 to the report generator 104, as shown by step 25-4 in FIG. 25. These PageDescriptionRecord 314 may include a field that contains an identifier that indicates which page layouts 120 may be used to format these particular letter 254 pages. The report generator 104 queries the report database 106 for the applicable page layouts 120, as shown by step 25-5 in FIG. 25. The report database 106 returns the relevant page layouts 120 to the report generator 104, as shown by step 25-6 in FIG. 25.

Each page layout 120 contains formatting specifications that indicate where specific Personalized letter 254 information may appear on the printed page. The report generator 104 typically reads each format specification to determine the data required at that location on the page.

If the format specifications require data relating to the personalized letter 254, the report generator 104 preferably queries the active database 103, as shown by step 25-7 in FIG. 25. The active database 103 queries the LetterData object 138, locates and retrieves the applicable personalized letter 254 information from the LetterData object 138, and returns this personalized letter 254 information to the report generator 104, as shown by step 25-8 in FIG. 25.

If the format specifications require static pictures or text segments, then the report generator 104 preferably retrieves the applicable information from the static database 105 object, as shown by step 25-9 in FIG. 25. The static database 105 returns this information to the report generator 104 as shown in step 25-10 in FIG. 25. The report generator 104 typically repeats this process for each format specification on the page layout 120, which builds a personalized letter 254 page that is then sent to the printer, as shown by step 25-11 in FIG. 25. In this fashion, the report generator 104 may print one or more customized and individualized letter 254 pages, along with the predetermined text segments and pictures that correspond with the personalized letter 254 information related to a particular product configuration.

The personalized letter 254 page layouts 120 may specify that the name, address and telephone number or other identification data of the customer appear on the letter 254 pages. The customer information may be initially entered via the CustomerForm object 286. (See FIG. 20). The customer information may be stored in the CustomerData object 136 attached to the proposal.

The report generator 104 preferably reads format specifications from the page layout 120 via the report database 106, as shown by step 21-1 in FIG. 21. When the particular formatting specification in the page layout 120 requires the customer's name, address, or telephone number or other identification data to be included on a printed page, the report generator 104 preferably sends a request to the active database 103 for the specified customer information, as shown by step 21-2 in FIG. 21. The active database 103 may obtain the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The letter 254 page layouts 120 may specify that the name, address and telephone number of the salesperson appear on the letter 254 pages. The salesperson information may be initially entered by the employer in the ListOfSalesPersonsData object 158 and is stored in the individual salesperson's SalesPersonData object 134 attached to the proposal. (See FIG. 22). The report generator 104 may read format specifications from the page layout 120 via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 preferably builds the page using this salesperson information and sends the page to the printer, as shown by step 23-4 in FIG. 23.

Proposal: Product Description Pages

When the user begins a deal with a customer, the user may want to include in the customized, printed proposal one or more product description pages each comprising predetermined pictures and text relating to features, benefits and environments of interest to the customer.

The user interface 102 provides a means for presenting a series of predetermined queries related to features, benefits and environments of particular items of standard and optional equipment that may be included in the product. This product description information may be of interest to different potential customers who may purchase the product. The user interface 102 is also a means for selecting particular items of standard and optional equipment about which product description information should appear in the printed proposal.

Figure 26:
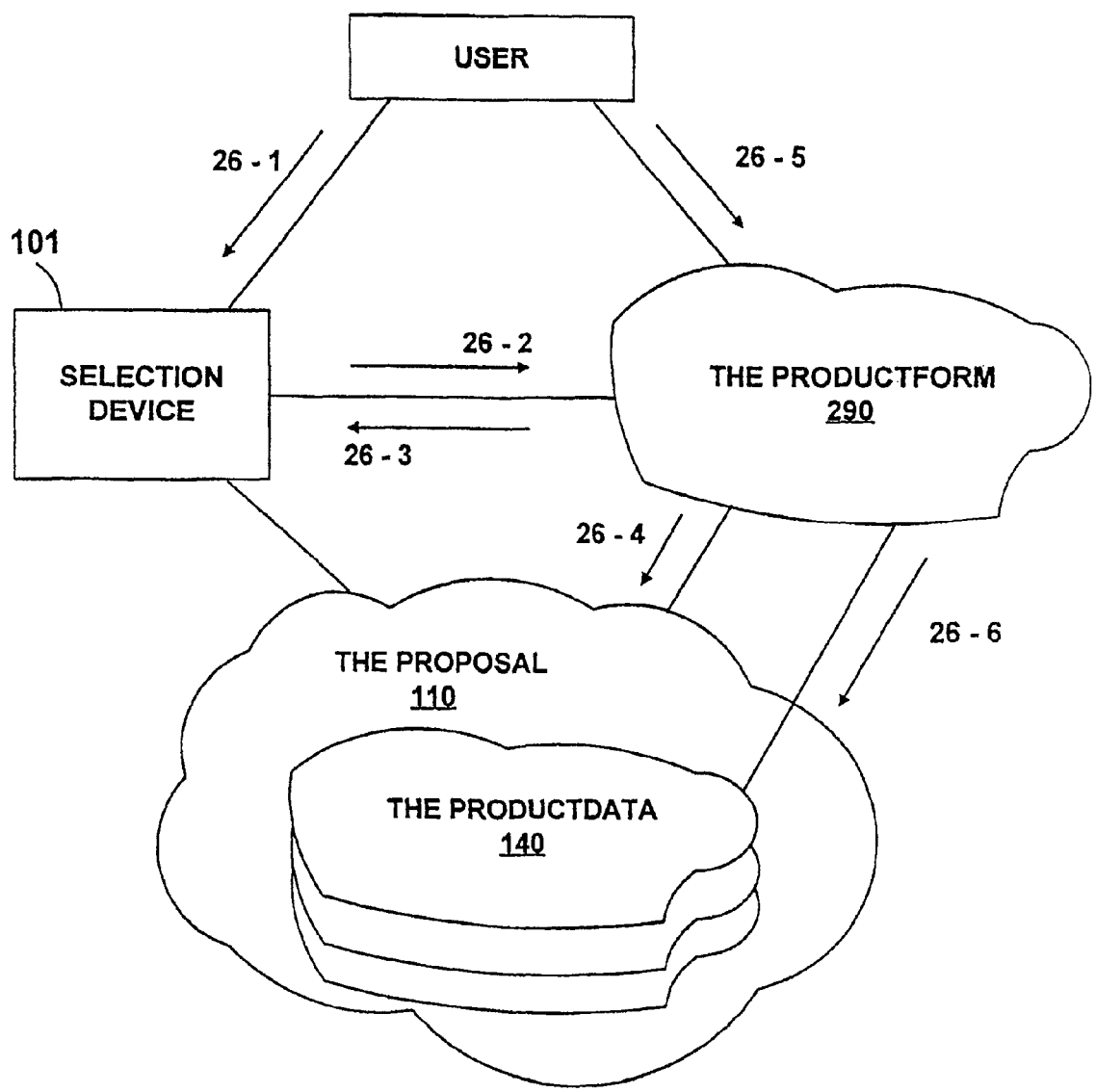
FIG. 26 is an object diagram illustrating a preferred flow of control involved when selecting product descriptions.

The user may select "Customer Information" 176 from the main menu 170 of the selection device 101, as shown by step 26-1 in FIG. 26. The user further selects "Standard and Optional Equipment" from the "Customer Information" 176 menu. In response, the selection device 101 preferably sends a load message to the ProductForm object 290, as shown by step 26-2 in FIG. 26. On receipt of the load message, the ProductForm object 290 may display itself in a window within the main window of the selection device 101. Upon loading itself, the ProductForm object 290 obtains a pointer to a proposal object 110, as shown by step 26-3 in FIG. 26. The ProductForm object 290 may then obtain a pointer from the proposal object 110 to a ProductData object 140, as shown by step 26-4 in FIG. 26.

The ProductForm object 290 presents a user interface 102 to the user typically comprising text entry fields and predetermined questions for the user, as shown by step 26-5 in FIG. 26. The predetermined questions allow the user to specify those items of standard and optional equipment about which features and benefits information is of particular interest to the customer who is to receive the proposal. The product description information gathered by the ProductForm object 290 may then be stored in the ProductData object 140 which is attached to the current proposal object 110, as shown by step 26-6 in FIG. 26.

The user may decide to generate a customized, printed proposal that includes one or more product description pages. To include these product description pages, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 123, as shown by step 18-4 of FIG. 18. The user may then select the desired product description pages from a list of pages that are available for inclusion in the printed proposal, as shown by step 18-5 of FIG. 18. The selected pages may be stored as PageDescriptionRecord 314 in a TableOfContentsData object 123, as shown by step 18-6 of FIG. 18. These PageDescriptionRecord 314 typically include a field that contains an identifier that indicates which page layout 120 may be used to format each product description page. The page layout 120 preferably determines the content and appearance of the final printed page. The page layouts 120 are stored in the report database 106.

Figure 27:
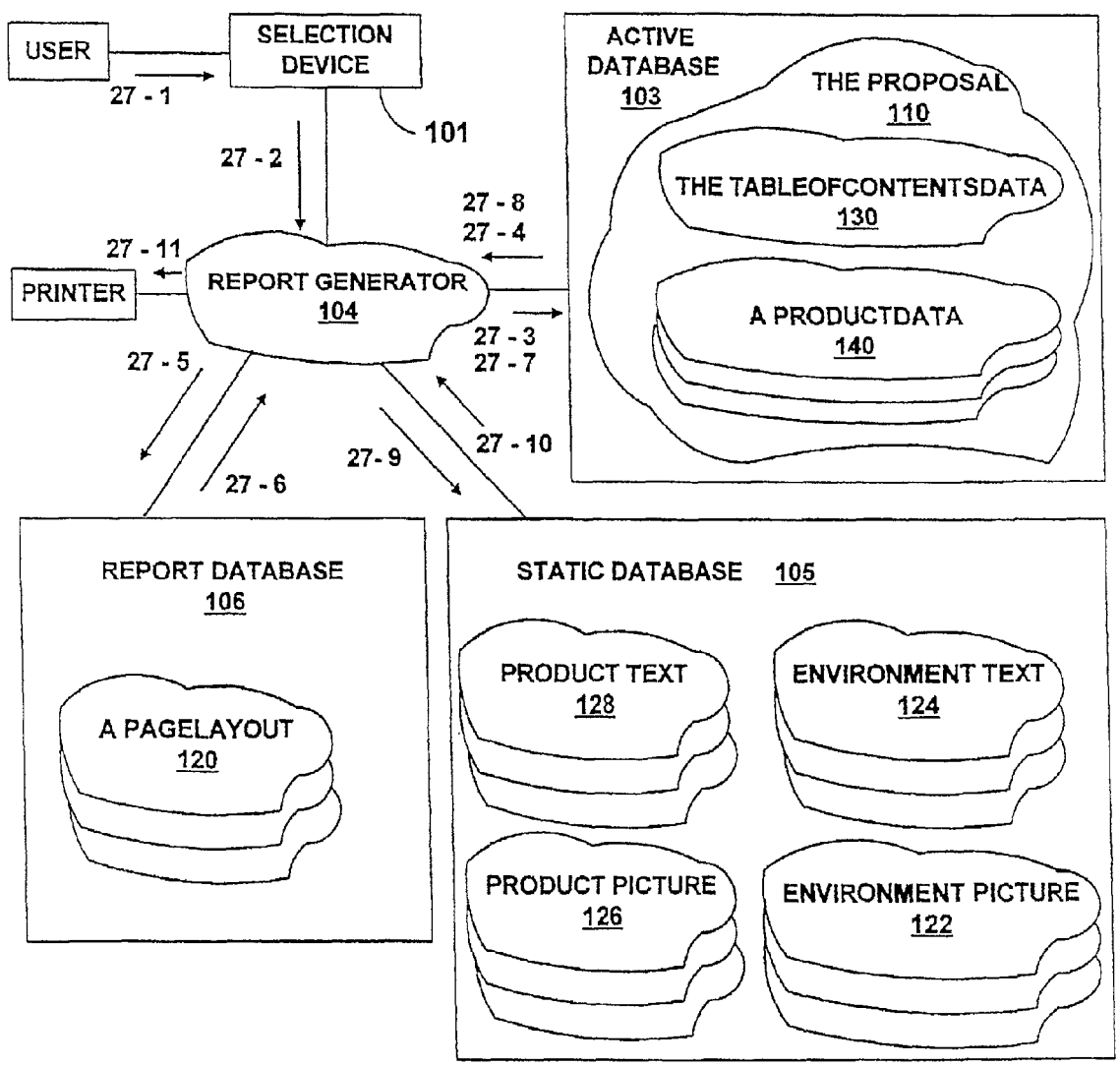
FIG. 27 is an object diagram illustrating a preferred flow of control involved when generating product description pages.

To initiate the printing of the product description pages, the user may select "Print" 178 from the main menu 170 of the selection device 101, as shown by step 27-1 of FIG. 27. In response, the selection device 101 preferably sends a print request to the report generator 104, as shown by step 27-2 of FIG. 27. The report generator 104 may query the active database 103 for successive page description records that describe the pages of the printed proposal, as shown by step 27-3 of FIG. 27. The active database 103 typically processes the request by searching the TableOfContentsData object 130 located in the current proposal. If the proposal is to include one or more product description pages comprising predetermined pictures and text related to features, benefits and environments of interest to the customer, the active database 103 preferably queries the TableOfContentsData object 130 for the applicable PageDescriptionRecord 314. The TableOfContentsData object 130 returns the relevant PageDescriptionRecord 314 to the active database 103. The active database 103 may then send the relevant PageDescriptionRecord 314 to the report generator 104, as shown by step 27-4 in FIG. 27. These PageDescriptionRecord 314 may include a field that contains an identifier that indicates which page layouts 120 may be used to format these particular product description pages. The report generator 104 queries the report database 106 for the applicable page layouts 120, as shown by step 27-5 in FIG. 27. The report database 106 returns the relevant page layouts 120 to the report generator 104, as shown by step 27-6 in FIG. 27.

Each page layout 120 preferably contains formatting specifications that indicate where specific product description information may appear on the printed page. The report generator 104 reads each format specification to determine the data required at that location on the page.

If the format specifications require data relating to the features, benefits and environments of interest to a customer, the report generator 104 preferably queries the active database 103 for the standard and optional equipment product description information, as shown by step 27-7 in FIG. 27. The active database 103 queries the ProductData object 140, locates and retrieves the selected items of standard and optional equipment from the ProductData object 140, and returns this information to the report generator 104, as shown by step 27-8 in FIG. 27.

The report generator 104 typically retrieves the text and pictures relating to features, benefits and environments for items of standard and optional equipment selected for inclusion in the printed proposal from the static database 105 object, as shown by step 27-9 in FIG. 27. The static database 105 may return this information to the report generator 104, as shown by step 27-10 in FIG. 27. The report generator 104 preferably repeats this process for each format specification on the page layout 120, which builds a product description page that is then sent to the printer, as shown by step 27-11 in FIG. 27. In this fashion, the Report Generator 104 may print one or more customized and individualized product description pages. The product description page layout 120 may specify that the name, address and telephone number or other identification data of the customer appear on the product description pages. The customer information may be initially entered via the CustomerForm object 286. (See FIG. 20). The customer information may be stored in the CustomerData object 136 attached to the proposal.

The report generator 104 reads format specifications from the page layout 120 via the report database 106, as shown by step 21-1 in FIG. 21. When the particular formatting specification in the page layout 120 requires the customer's name, address, or telephone number or other identification data to be included on a printed page, the report generator 104 preferably sends a request to the active database 103 for the specified customer information, as shown by step 21-2 in FIG. 21. The active database 103 may obtain the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The product description page layout 120 may specify that the name, address and telephone number of the salesperson appear on the product description pages. The salesperson information may be initially entered by the employer, for example, in the ListOfSalesPersonsData object 158 and may be stored in the individual salesperson's SalesPersonData object 134 attached to the proposal. (See FIG. 22). The report generator 104 reads format specifications from the page layout 120 via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Product Specification Pages

When the user begins a deal with a customer, the user may want to include in the customized, printed proposal one or more individualized pages comprising the product specification which is of particular interest to the customer who is to receive the proposal. The user interface 102 provides a means for presenting a series of predetermined queries related to the particular items of standard and optional equipment that may be included in the product specification of particular interest to a customer. The user interface 102 also provides a means for selecting particular items of standard and optional equipment to be included in the product specification of a particular product.

Figure 28:
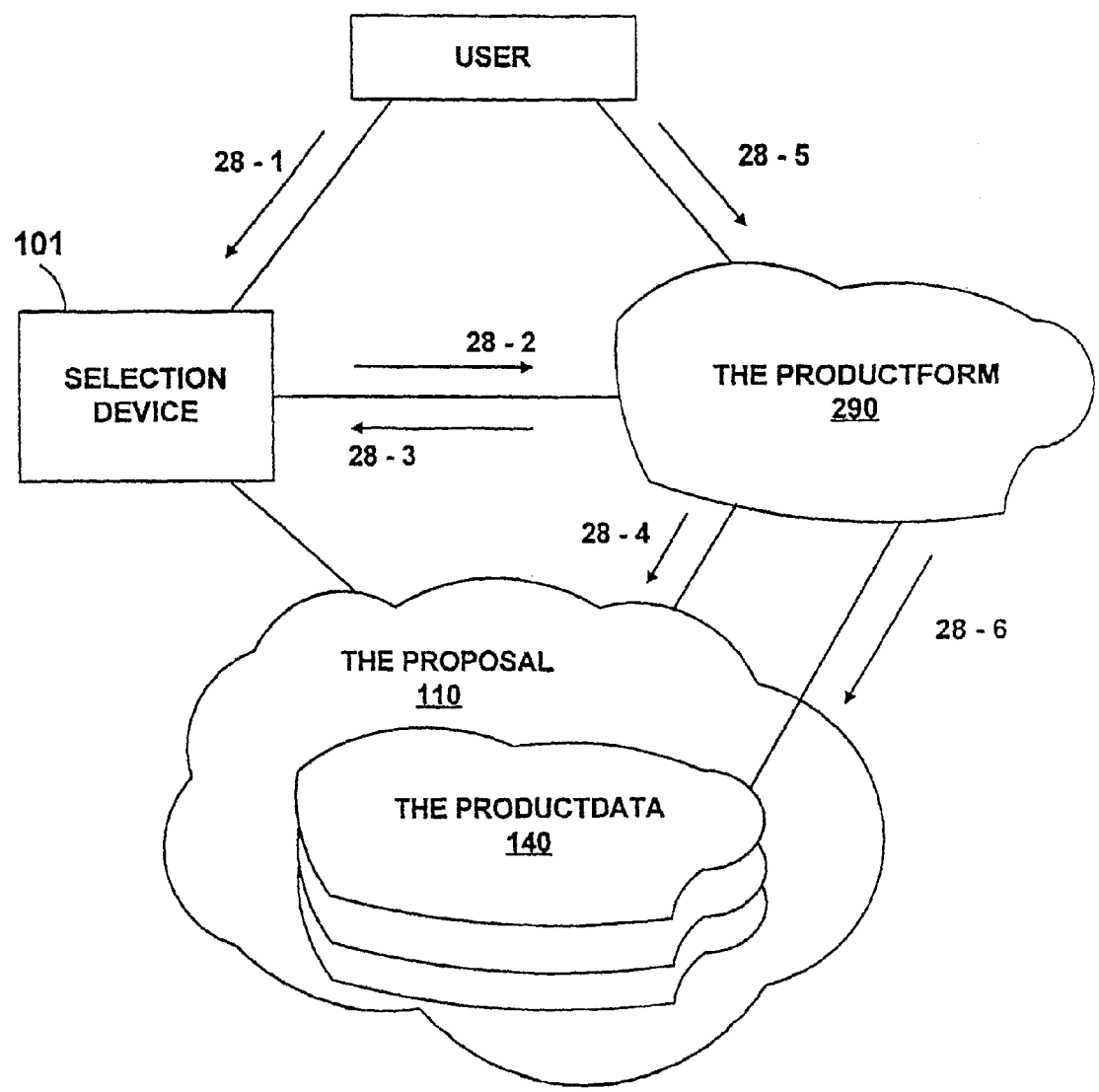
FIG. 28 is an object diagram illustrating a preferred flow of control involved when entering product specification information.

The user may select "Customer Information" 176 from the main menu 170 of the selection device 101, as shown by step 28-1 in FIG. 28. The user may further select "Standard and Optional Equipment" from the "Customer Information" 176 menu. In response, the selection device 101 preferably sends a load message to the ProductForm object 290, as shown by step 28-2 in FIG. 28. On receipt of the load message, the ProductForm object 290 may display itself in a window within the main window of the selection device 101. Upon loading, itself, the ProductForm object 290 obtains a pointer to a proposal object 110, as shown by step 28-3 in FIG. 28. The ProductForm object 290 then obtains a pointer from the proposal object 110 to a ProductData object 140, as shown by step 28-4 in FIG. 28.

The ProductForm object 290 presents a user interface 102 to the user typically comprising text entry fields and predetermined questions for the user, as shown by step 28-5 in FIG. 28, The predetermined questions allow the user to specify those items of standard and optional equipment to be included in the product specification of particular interest to the customer who is to receive the proposal. The product specification gathered by the ProductForm object 290 may then be stored in the ProductData object 140 which is attached to the current proposal object 110, as shown by step 28-6 in FIG. 28.

The user may decide to generate a customized, printed proposal that includes one or more product specification pages. To include these product specification pages, the user may select "Contents" 174 from the main menu 170 of the selection device 101, as shown by step 18-1 of FIG. 18. In response, the selection device 1001 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the desired product specification pages from a list of pages that are available for inclusion in the printed proposal, as shown by step 18-5 of FIG. 18. The selected pages may be stored as PageDescriptionRecord 314 in a TableOfContentsData object 130, as shown by step 18-6 of FIG. 18. These PageDescriptionRecord 314 typically include a field that contains an identifier that indicates which page layout 120 may be used to format each product specification page. The page layout 120 preferably determines the content and appearance of the final printed page. The page layout 120 may be stored in the report database 106.

Figure 29:
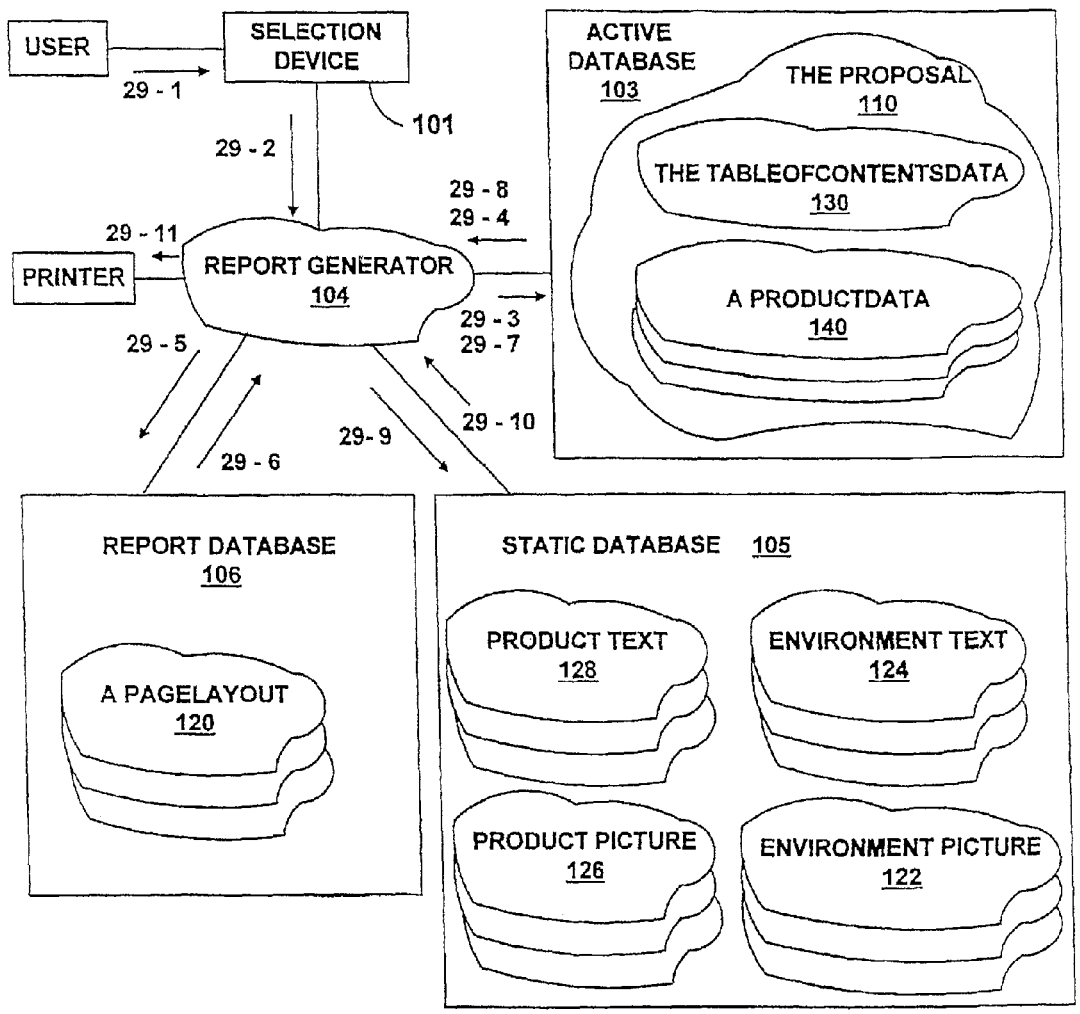
FIG. 29 is an object diagram illustrating a preferred flow of control involved when generating product specification pages.

To initiate the printing of the product specification pages, the user may select "Print" 178 from the main menu 170 of the selection device 101, as shown by step 29-1 of FIG. 29. In response, the selection device 101 preferably sends a print request to the report generator 104, as shown by step 29-2 of FIG. 29. The report generator 104 may query the Active Database 103 for successive page description records that describe the pages of the printed proposal, as shown by step 29-3 of FIG. 29. The active database 103 preferably processes the request by searching the TableOfContentsData object 130 located in the current proposal. If the proposal is to include one or more product specification pages, the active database 103 queries the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 29-4 in FIG. 29. These PageDescriptionRecord 314 may include a field that contains an identifier that indicates which page layout 120 may be used to format these particular product specification pages. The report generator 104 queries the report database 106 for the applicable page layout 120, as shown by step 29-5 in FIG. 29. The report database 106 returns the relevant page layout 120 to the report generator 104, as shown by step 29-6 in FIG. 29.

Each page layout 120 preferably contains formatting specifications that indicate where specific product specification information may appear on the printed page. The report generator 104 reads each format specification to determine the data required at that location on the page.

If the format specifications require data relating to the product specification of interest to a customer, the report generator 104 queries the active database 103 for the product specification information, as shown by step 29-7 in FIG. 29. The active database 103 queries the ProductData object 140, locates and retrieves the product specification information from the ProductData object 140, and returns this information to the report generator 104, as shown by step 29-8 in FIG. 29.

The product specification information stored in the active database 103 may be linked to additional product specification information stored in the static database 105.

The additional product specification information may include weights and prices of the individual items of standard and optional equipment included in the product of interest to the customer.

The report generator 104 retrieves the additional product specification information for items of standard and optional equipment selected for inclusion in the printed proposal from the static database 105, as shown by step 29-9 in FIG. 29. The static database 105 may return this information to the report generator 104, as shown by step 29-10 in FIG. 29. The report generator 104 preferably repeats this process for each format specification on the page layout 120, which builds a product specification page that is then sent to the printer, as shown by step 29-11 in FIG. 29. In this fashion, the report generator 104 may print one or more customized and individualized product specification pages.

The product specification page layout 120 may specify that the name, address and telephone number or other identification data of the customer appear on the product specification pages. The customer information may be initially entered via the CustomerForm object 286. (See FIG. 20). The Customer information may be stored in the CustomerData object 136 attached to the proposal.

The report generator 104 may read format specifications from the page layout 120 via the report database 106, as shown by step 21-1 in FIG. 21. When the particular formatting specification in the page layout 120 requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object. The active database 103 then returns this information to the report generator 104, as shown by step 21-3 in FIG. 21. The report generator 104 typically builds the page using this information and sends it to the printer, as shown by step 21-4 in FIG. 21.

The product specification page layout 120 may specify that the name, address and telephone number of the salesperson appear on the product specification pages. The salesperson information may be initially entered by the employer, for example, in the ListOfSalesPersonsData object 158 and may be stored in the individual salesperson's SalesPersonData object 134 attached to the proposal. (See FIG. 22). The report generator 104 reads format specifications from the page layout 120 via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Performance Specification Pages

When the user begins a deal with a customer, the user may want to include in the customized, printed proposal one or more individualized pages comprising the performance specifications that are of particular interest to the customer who is to receive the proposal.

The user may decide to generate a customized, printed proposal that includes one or more performance specification pages 240. To include these performance specification pages 240, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user then selects the desired performance specification pages 240 from a list of pages that are available for inclusion in the printed proposal, as shown by step 18-5 of FIG. 18. The selected pages are stored as PageDescriptionRecord 314 in a TableOfContentsData object 130, as shown by step 18-6 of FIG. 18. These PageDescriptionRecord 314 include a field that contains an identifier that indicates which page layout 120 may be used to format each performance specification page 240. The page layout 120 preferably determines the content and appearance of the final printed page. The page layout 120 may be stored in the report database 106.

Figure 30:
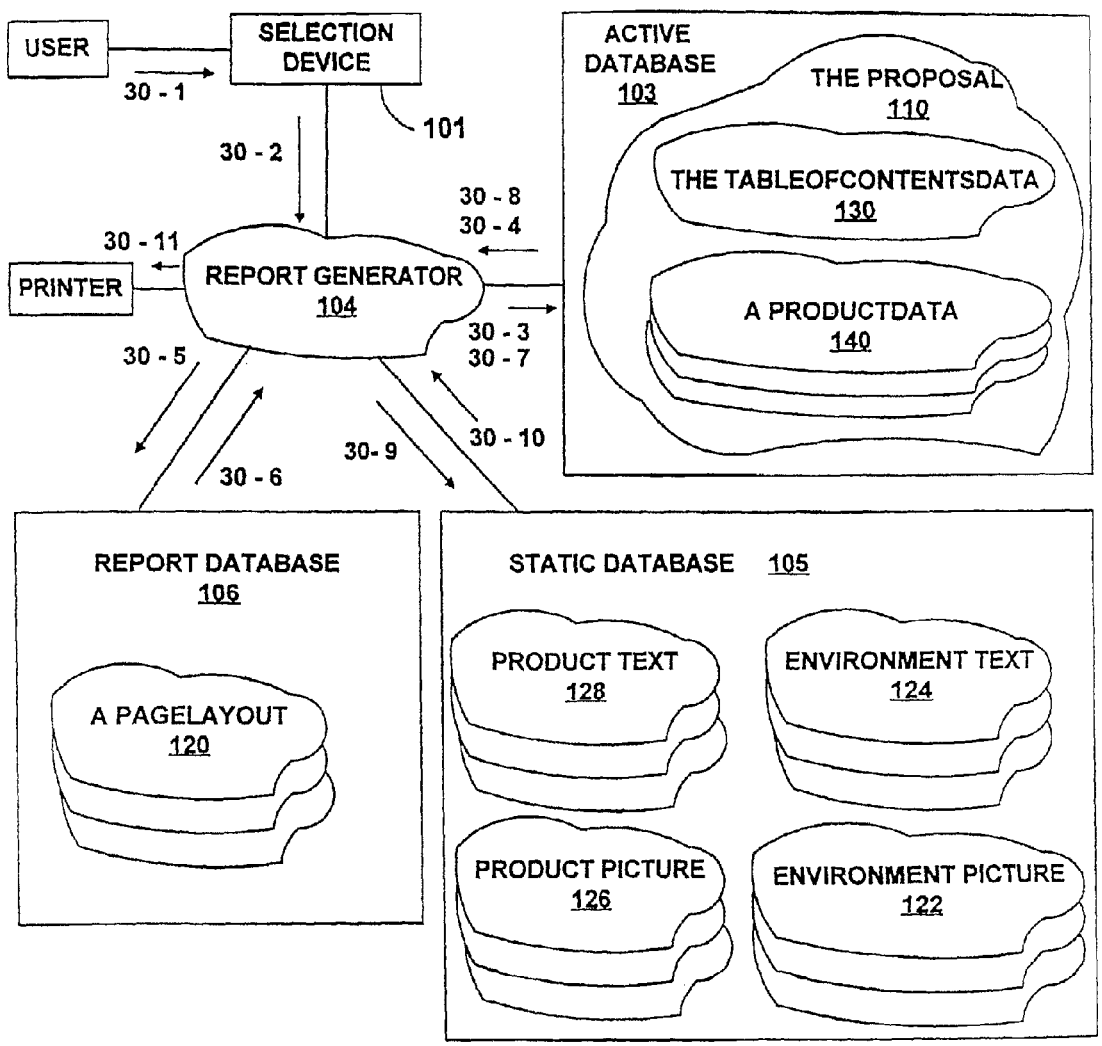
FIG. 30 is an object diagram illustrating a preferred flow of control involved when generating performance specification pages.

To initiate the printing of the performance specification pages 240, the user may select "Print" 178 from the main menu 170 of the selection device 101, as shown by step 30-1 of FIG. 30. In response, the selection device 101 preferably sends a print request to the report generator 104, as shown by step 30-2 of FIG. 30. The report generator 104 queries the active database 103, for successive page description records that describe the pages of the printed proposal, as shown by step 30-3 of FIG. 30. The active database 103 processes the request by searching the TableOfContentsData object 130 located in the current proposal. If the proposal is to include one or more performance specification pages Z40, the active database 103 queries the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 30-4 in FIG. 30. These PageDescriptionRecord 314 may include a field that contains an identifier that indicates which page layout 120 may be used to format these particular performance specification pages 240. The report generator 104 queries the report database 106 for the applicable page layout 120, as shown by step 30-5 in FIG. 30. The report database 106 returns the relevant page layout 120 to the report generator 104, as shown by step 30-6 in FIG. 30.

Each page layout 120 typically contains formatting specifications that indicate where specific performance specification information may appear on the printed page. The report generator 104 may read each format specification to determine the data required at that location on the page.

If the format specifications require data relating to the performance specification of interest to a customer, the report generator 104 queries the active database 103 for the performance specification information, as shown by step 30-7 in FIG. 30. The active database 103 will preferably handle the process of calculating the desired performance specification information based on the product specification stored within itself and additional performance information linked to this product information 238 and stored in the static database 105. The active database 103 may return this information to the report generator 104, as shown by step 30-8 in FIG. 30.

If the format specifications require static pictures or text segments, then the report generator 104 typically retrieves the applicable information from the static database 105 object, as shown by step 30-9 in FIG. 30. The report generator 104 may repeat this process for each format specification on the page layout, which builds a performance specification page 240 that is then sent to the printer, as shown by step 30-11 in FIG. 30. In this fashion, the report generator 104 may print one or more customized and individualized performance specification pages 240.

The performance specification page layout 120 may specify that the name, address and telephone number or other identification data of the customer appear on the performance specification pages 24. The customer information may be initially entered via the CustomerForm object 286. (See FIG. 20). The customer information may be stored in the CustomerData object 136 attached to the proposal.

The report generator 104 typically reads format specifications from the page layout 120 via the report data base 106, as shown by step 21-1 in FIG. 21. When the particular formatting specification in the page layout 120 requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the customer data object 136 stored within the current proposal object 110. The active database 103 then returns this information to the report generator 104, as shown by step 21-3 in FIG. 21. The report generator 104 may then build the page using this information and sends it to the printer, as shown by step 21-4 in FIG. 21.

The performance specification page layout 120 may specify that the name, address and telephone number of the salesperson appear on the performance specification pages 240. The salesperson information may be initially entered by the employer in the ListOfSalesPersonsData object 158 and is stored in the individual salesperson's SalesPersonData object 134 attached to the proposal. (See FIG. 22). The report generator 104 reads format specifications from the page layout via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Trade-in Pages

When the user begins a deal with a customer, the customer may want to trade in a product, in which case, the user will typically want to include individualized trade-in product information pages 242 in the customized, printed proposal that will be prepared for the customer.

The user interface 102 provides means for presenting a series of predetermined queries related to the description and appraised value of a trade-in product to be traded in by the individual customer who is to receive the proposal. The user interface 102 also provides means for inputting individualized answers to the predetermined queries, the individualized answers relating to the description and appraised value of a trade-in product to be traded in by the individual customer who is to receive the proposal.

Figure 31:
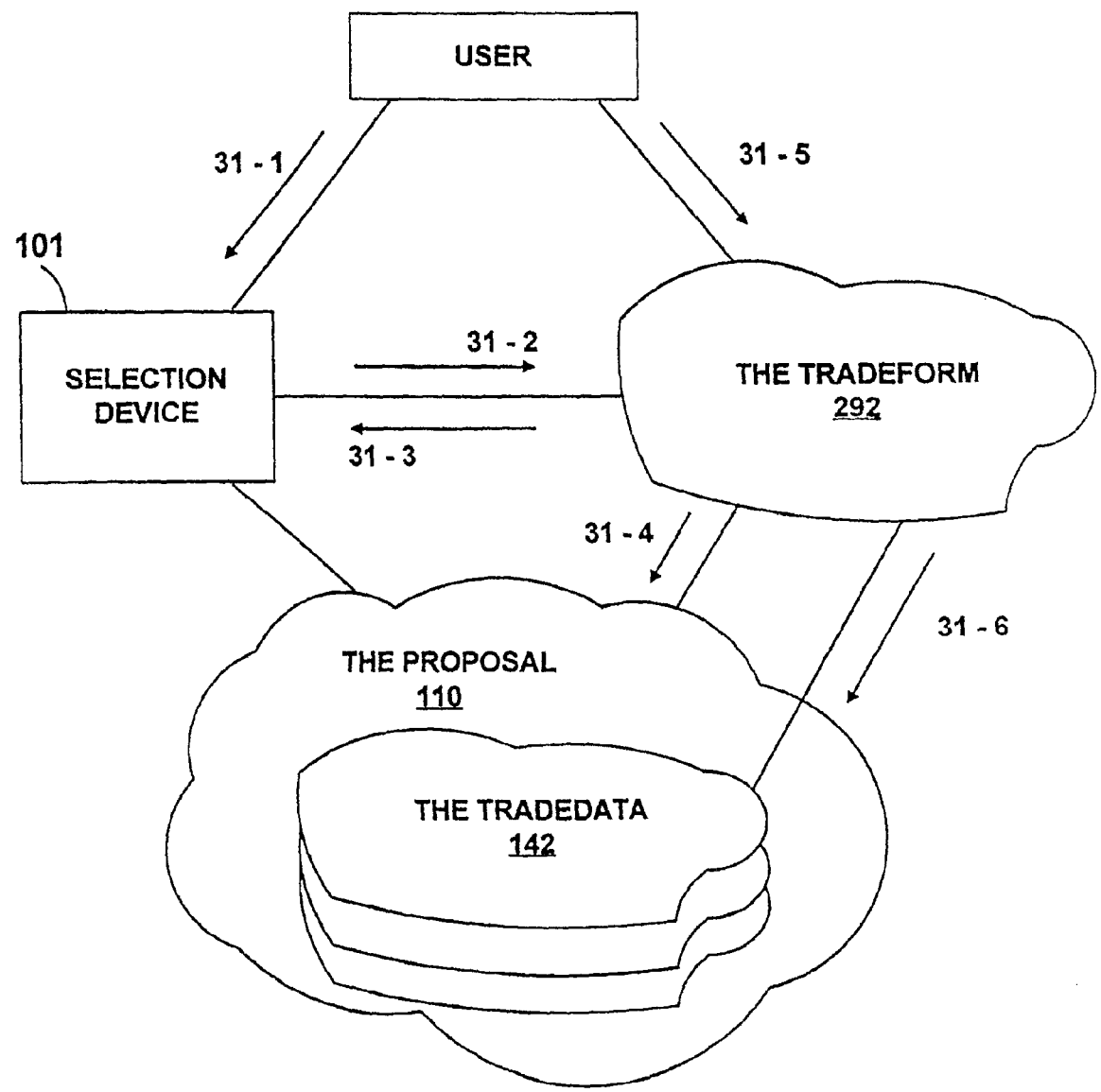
FIG. 31 is an object diagram illustrating a preferred flow of control involved when entering trade-in product information.

The user may select "Customer Information" 176 from the main menu 170 of the selection device 101, as shown by step 31-1 in FIG. 31. The user further selects "Trade" 206 from the customer information menu. In response, the selection device 101 preferably sends a load message to the TradeForm object 292, as shown by step 31-2 in FIG. 31. On receipt of the load message, the TradeForm object 292 may display itself in a window within the main window of the selection device 101. Upon loading itself, the TradeForm object 292 obtains a pointer to a proposal object 110, as shown by step 31-3 in FIG. 31. The TradeForm object 292 then obtains a pointer from the proposal object 110 to a TradeData object 142, as shown by step 31-4 in FIG. 31.

The TradeForm object 292 presents a user interface 102 to the user typically comprising text entry fields and predetermined questions for the user, as shown by step 31-5 in FIG. 31. This user interface 102 allows the user to enter information regarding a trade-in product to be traded in by the individual customer who is to receive the proposal. The user may fill in various data fields with information comprising a description and appraised value for the trade-in product. The predetermined questions allow the user to select one of a list of predetermined answers that correspond to the trade-in product of the customer who is to receive the proposal. The trade-in information gathered by the TradeForm object 292 may be stored in the TradeData object 142 which is attached to the current proposal object 110, as shown by step 31-6 in FIG. 31.

The user may decide to generate a customized, printed proposal that includes one or more pages comprising the description and appraised value of a trade-in product. To include these trade-in pages, the user may select "Contents" 174 from the main menu 170 of the selection service 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the desired trade-in pages from a list of pages that are available for inclusion in the printed proposal, as shown by step 18-5 of FIG. 18. The selected pages may be stored as PageDescriptionRecord 314 in TableOfContentsData object 130, as shown by step 18-6 of FIG. 18. These PageDescriptionRecord 314 include a field that contains an identifier that indicates which page layout 120 may be used to format each trade-in page 242. The page layout 120 preferably determines the content and appearance of the final printed page. The page layouts 120 may be stored in the report database 106.

Figure 32:
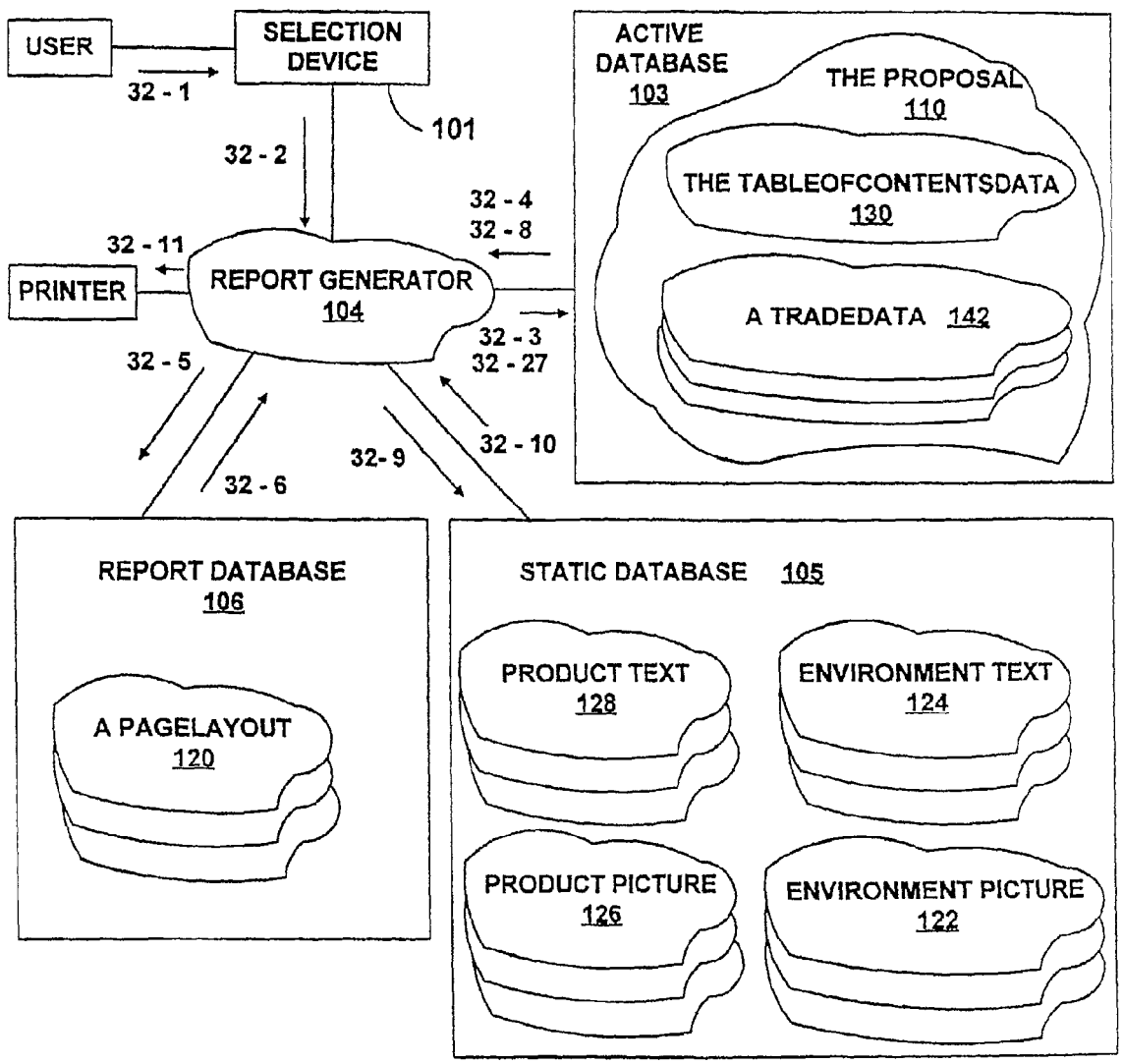
FIG. 32 is an object diagram illustrating a preferred flow of control involved when generating trade-in product pages.

To initiate the printing of the trade-in pages 242 comprising the description and appraised value of die trade-in product, the user may select "Print" 178 from the main menu 170 of the selection device 101, as shown by step 32-1 of FIG. 32. In response, the selection device 101 preferably sends a print request to the report generator 104, as shown by step 32-2 of FIG. 32. The report generator 104 queries the active database 103 for successive page description records that describe the pages of the printed proposal, as shown by step 32-3 of FIG. 32. The active database 103 typically processes the request by searching the TableOfContentsData object 130 located in the current proposal. If the proposal is to include one or more pages comprising the description and appraised value of a trade-in product, the active database 103 queries the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 32-4 in FIG. 32. These PageDescriptionRecord 314 may include a field that contains an identifier that indicates which page layout may be used to format these particular trade-in pages 242. The report generator 104 queries the report database 106 for the applicable page layout, as shown by step 32-5 in FIG. 32. The report database 106 returns the relevant page layout to the report generator 104, as shown by step 32-6 in FIG. 32.

Each page layout may contain formatting specifications that indicate where specific information regarding the description and appraised value of the trade-in product may appear on the printed page. The report generator 104 may read each format specification to determine the data required at that location on the page.

If the format specifications require data relating to the description and appraised value of the trade-in product, the report generator 104 preferably queries the active database 103, as shown by step 32-7 in FIG. 32. The active database 103 queries the TradeData object 142, locates and retrieves the applicable description and appraised value information from the TradeData object 142, and returns this trade-in information to the report generator 104, as shown by step 32-8 in FIG. 32.

If the format specifications require static pictures or text segments, then the report generator 104 may retrieve the applicable information from the static database 105 object, as shown by step 32-9 in FIG. 32. The static database 105 may return this information to the report generator 104, as shown by step 32-10 in FIG. 32. The report generator 104 typically repeats this process for each format specification on the page layout, which builds a trade-in page 242 that may then be sent to the printer, as shown by step 32-11 in FIG. 32.

In this fashion, the report generator 104 may print one or more customized and individualized trade-in product pages 242 which comprise the description and appraised value of a trade-in product, along with the predetermined text segments and pictures that correspond with this specified trade-in product.

The trade-in page layout 120 may specify that the name, address and telephone number or other identification data of the customer appear on the trade-in pages. The customer information may be initially entered via the CustomerForm object 286. (See FIG. 20). The customer information may be stored in the CustomerData object 136 attached to the proposal.

The report generator 104 may read format specifications from the page layout via the report database 106, as shown by step 21-1 in FIG. 21. When the particular formatting specification in the page layout requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The trade-in page layout may specify that the name, address and telephone number of the salesperson appear on the trade-in pages. The salesperson information may be initially entered by the employer in the ListOfSalesPersonsData object 158 and may be stored in the individual salesperson's SalesPersonData object 134 attached to the proposal. (See FIG. 22). The report generator 104 may read format specifications from the page layout via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Product Price Quotation Pages

The user interface 102 provides means for presenting a series of predetermined queries related to the product price quotation for a product of interest to a potential customer. The user interface 102 also provides means for inputting individualized answers to the predetermined queries, the individualized answers relating to the product price quotation of a particular product configuration that is of particular interest to the individual customer who is to receive the proposal.

Figure 33:
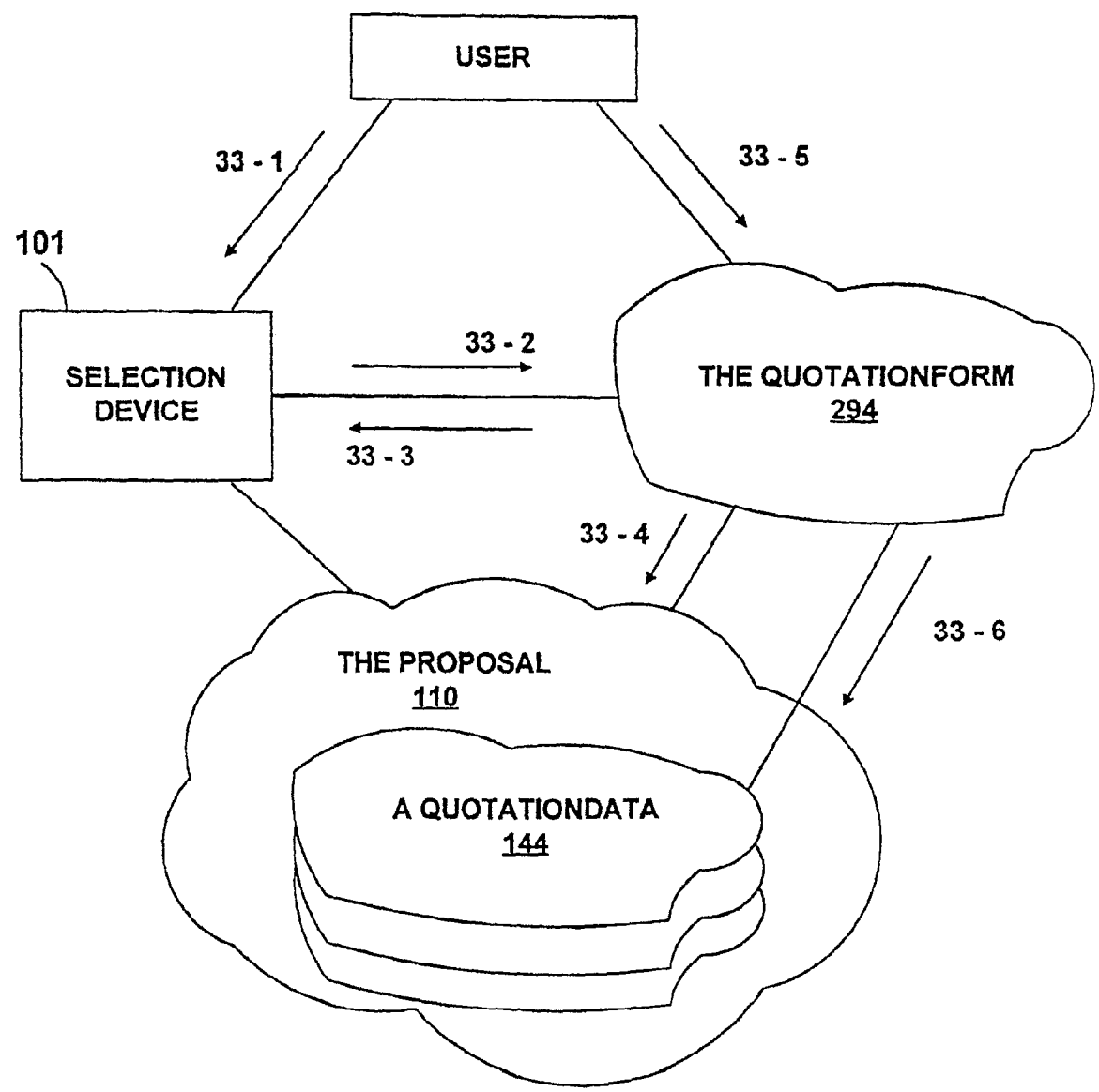
FIG. 33 is an object diagram illustrating a preferred flow of control involved when entering product price quotation information.

The user may select "Customer Information" 176 from the main menu 170 of the selection device 101, as shown by step 33-1 in FIG. 33. The user may further select "Quotation" from the "Customer Information" 176 menu. In response, the selection device 101 preferably sends a load message to the QuotationForm object 294, as shown by step 33-2 in FIG. 33. On receipt of the load message, the QuotationForm object 294 may display itself in a window within the main window of the selection device 101.

Upon loading itself, the QuotationForm object 294 obtains a pointer to a proposal object 110, as shown by step 33-3 in FIG. 33. The QuotationForm object 294 then obtains a pointer from the proposal object 110 to a QuotationData object 144, as shown by step 33-4 in FIG. 33.

The QuotationForm object 294 presents a user interface 102 to the user typically comprising text entry fields and predetermined questions for the user, as shown by step 33-5 in FIG. 33. The user interface 102 provides means for inputting individualized answers to the predetermined queries, the individualized answers relating to the price quotation for a product configuration that is of particular interest to the individual customer who is to receive the proposal. The predetermined questions may allow the user to modify the price quotation for to a product configuration that is of particular interest to the customer who is to receive the proposal. The price quotation information gathered by the QuotationForm object 294 may then be stored in the QuotationData object 144 which is attached to the current proposal object 110, as shown by step 33-6 in FIG. 33. The user may wish to compare the product price quotations of different product configurations. This comparison may be accomplished by repeating the process described above and in FIG. 33 to create multiple QuotationData objects 144.

When the user begins a deal with a customer, the user may want to include in the proposal one or more individualized pages comprising the product price quotation which is of particular interest to the customer who is to receive the proposal. To include the product price quotation pages, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the desired price quotation pages from a list of pages that are available for inclusion in the printed proposal, as shown by step 18-5 of FIG. 18. The selected pages may be stored as PageDescriptionRecord 314 in a TableOfContentsData object 130, as shown by step 18-6 of FIG. 18. These PageDescriptionRecord 314 typically include a field that contains an identifier that indicates which page layout may be used to format each price quotation page. The page layout may determine the content and appearance of the final printed page. The page layout may be stored in the report database 106.

Figure 34:
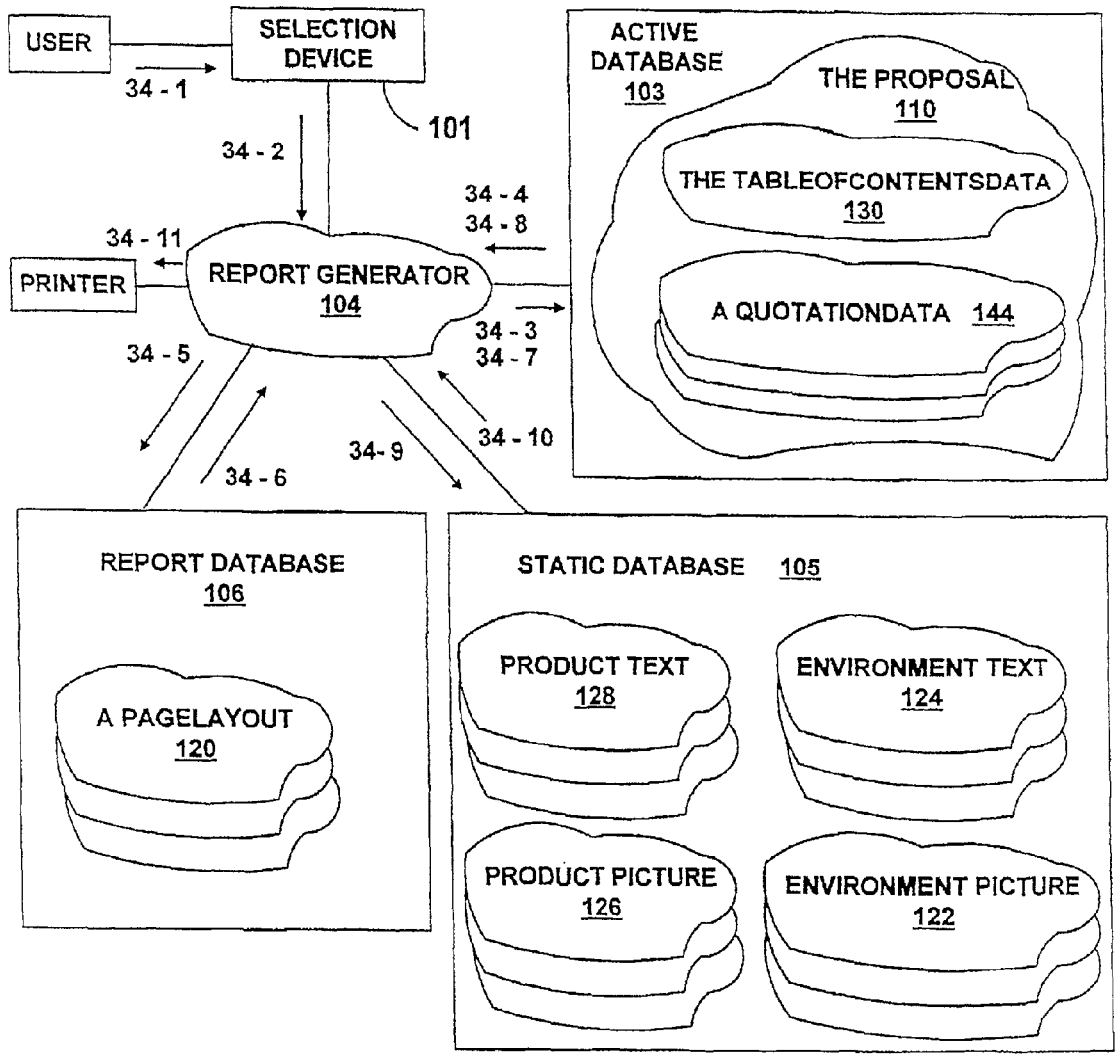
FIG. 34 is an object diagram illustrating a preferred flow of control involved when generating product price quotation pages.

To initiate the printing of the product price quotation pages, the user may select "Print" 178 from the main menu 170 of the selection device 101, as shown by step 34-1 of FIG. 34. In response, the selection device 101 preferably sends a print request to the report generator 101, as shown by step 34-2 of FIG. 34. The report generator 104 queries the active database 103 for successive page description records that describe the pages of the printed proposal, as shown by step 34-3 of FIG. 34. The active database 103 typically processes the request by searching the TableOfContentsData object 130 located in the current proposal. If the proposal is to include one or more product price quotation pages, the active database 103 queries the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 34-4 in FIG. 34. These PageDescriptionRecord 314 may include a field that contains an identifier that indicates which page layout may be used to format these particular product price quotation pages. The report generator 104 queries the report database 106 for the applicable page layout, as shown by step 34-5 in FIG. 34. The report database 106 returns the relevant page layout to the report generator 104, as shown by step 34-6 in FIG. 34.

Each page layout preferably contains formatting specifications that indicate where specific product price quotation information may appear on the printed page. The report generator 104 may read each format specification to determine the data required at that location on the page.

If the format specifications require data relating to the product price quotation of interest to a customer, the report generator 104 queries the active database 103 for the product price quotation information, as shown by step 34-7 in FIG. 34. The active database 103 will preferably handle the process of calculating the desired product price quotation based on the product specification stored within itself and on additional price information stored in the static database 105 and linked to this product information 238. The active database 103 may return this information to the report generator 104, as shown by step 34-8 in FIG. 34.

If the format specifications require static pictures or text segments, then the report generator 104 preferably retrieves the applicable information from the static database 105 object, as shown by step 34-9 in FIG. 34. The static database 105 may return this information to the report generator 104, as shown by step 34-10 in FIG. 34. The report generator 104 typically repeats this process for each format specification on the page layout, which builds a product price quotation page that is then sent to the printer, as shown by step 34-11 in FIG. 34. In this fashion, the report generator 104 may print one or more customized and individualized product price quotation pages. The product price quotation page layout may specify that the name, address and telephone number or other identification data of the customer appear on the product price quotation pages. The customer information was initially entered via the CustomerForm object 286. (See FIG. 20). The customer information may be stored in the CustomerData object 136 attached to the proposal.

The report generator 104 reads format specifications from the page layout via the report database 106, as shown by step 21-1 in FIG. 21. When the particular formatting specification in the page layout requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object. The active database 103 then returns this information to the report generator 104, as shown by step 21-3 in FIG. 21. The report generator 104 typically builds the page using this information and sends it to the printer, as shown by step 21-4 in FIG. 21.

The product price quotation page layout may specify that the name, address and telephone number of the salesperson appear on the product price quotation pages. The salesperson information may be initially entered by the employer in the ListOfSalesPersonsData object 158 and is stored in the individual salesperson's SalesPersonData object 134 attached to the proposal. (See FIG. 22). The report generator 104 reads format specifications from the product price quotation page layout via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Finance Pages

When the user begins a deal with a customer, the user may want to include one or more individualized pages which comprise the financing information to be included in the customized, printed proposal that will be prepared for the customer. The user interface 102 provides means for presenting a series of predetermined queries related to financing a product of interest to different potential customers who may purchase the product. The user interface 102 also provides means for inputting individualized answers to the predetermined queries, the individualized answers relating to the finance cost of product configurations that are of particular interest to the individual customer who is to receive the proposal.

The user may select "Customer Information" 176 from the main menu 170 of the selection device 101, as shown by step 35-1 in FIG. 5. The user may further select "Payment Schedule & Terms" from the "Customer Information" 176 menu. In response, the selection device 101 preferably sends a load message to the FinanceForm object 296, as shown by step 35-2 in FIG. 35. On receipt of the load message, the FinanceForm object 296 may display itself in a window within the main window of the selection device 101. Upon displaying itself, the FinanceForm object 296 obtains a pointer to a proposal object 110, as shown by step 35-3 in FIG. 35. The FinanceForm object 296 then obtains a pointer from the proposal object 110 to a FinanceData object 146, as shown by step 35-4 in FIG. 35.

Figure 35:
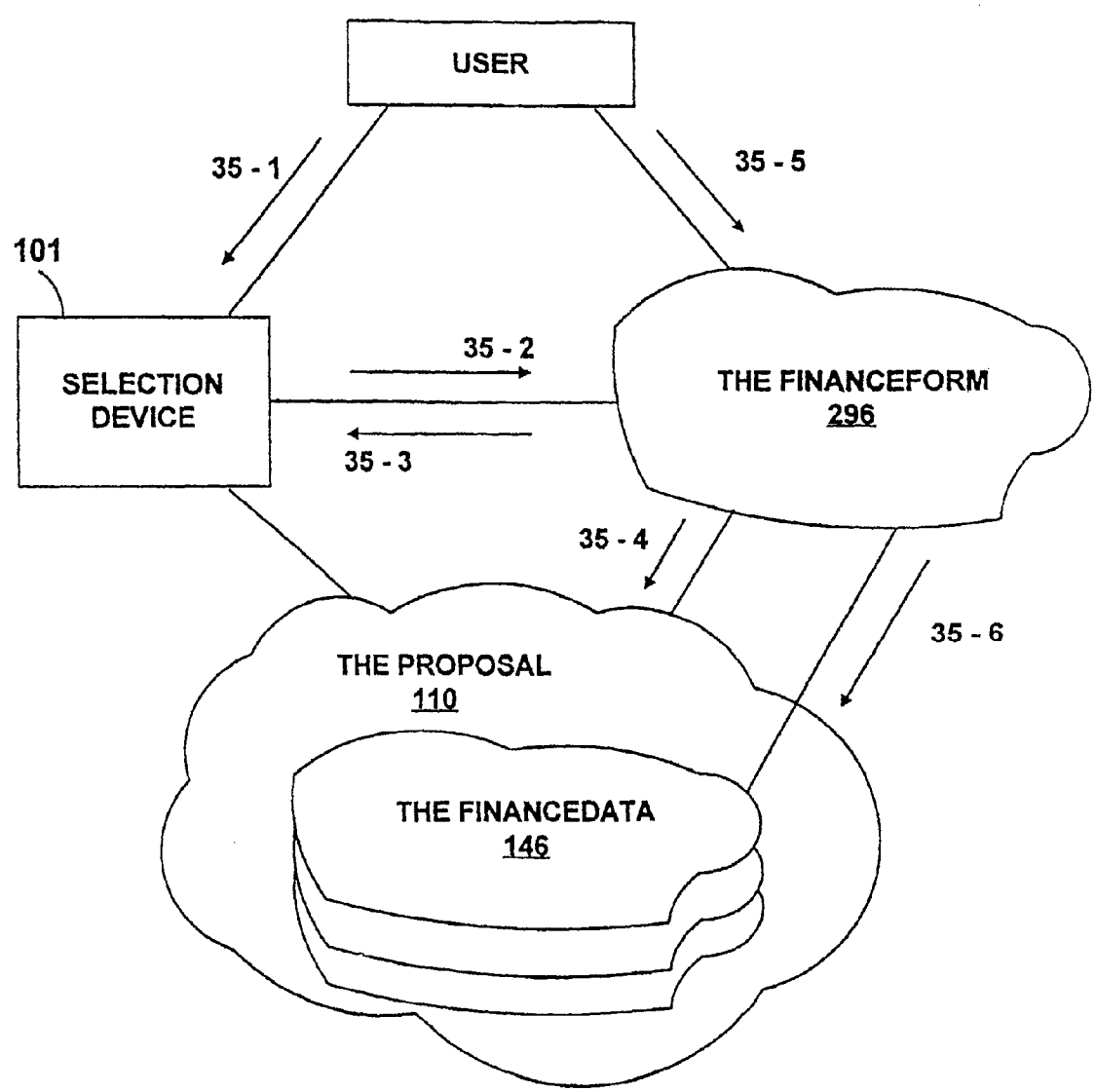
FIG. 35 is an object diagram illustrating a preferred flow of control involved when entering product financing information.

The FinanceForm object 296 presents a user interface 102 to the user typically comprising text entry fields and predetermined questions for the user, as shown by step 35-5 in FIG. 35. This user interface 102 provides means for inputting individualized answers to the predetermined queries, the individualized answers relating to financing a product configuration that is of particular interest to the individual customer who is to receive the proposal. The predetermined questions allow the user to select one of a list of predetermined answers that correspond to the financing of a product configuration that is of particular interest to the customer who is to receive the proposal. The finance cost information gathered by the FinanceForm object 296 is then stored in the FinanceData object 146 which is attached to the current proposal object 110, as shown by step 35-6 in FIG. 35. The user may wish to compare the finance cost of different finance plans. This comparison may be accomplished by repeating the process described above and in FIG. 35 to create multiple FinanceData objects 146.

The user may decide to generate a customized, printed proposal that includes one or more pages comprising the financing information. To include these finance pages, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the desired finance pages from a list of pages that are available for inclusion in the printed proposal, as shown by step 18-5 of FIG. 8. The selected pages may be stored as PageDescriptionRecord 314 in a TableOfContentsData object 130, as shown by step 18-6 of FIG. 18. These PageDescriptionRecord 314 include a field that contains an identifier that indicates which page layout may be used to format each finance page. The page layout may determine the content and appearance of the final printed page. The page layout may be stored in the report database 106.

Figure 36:
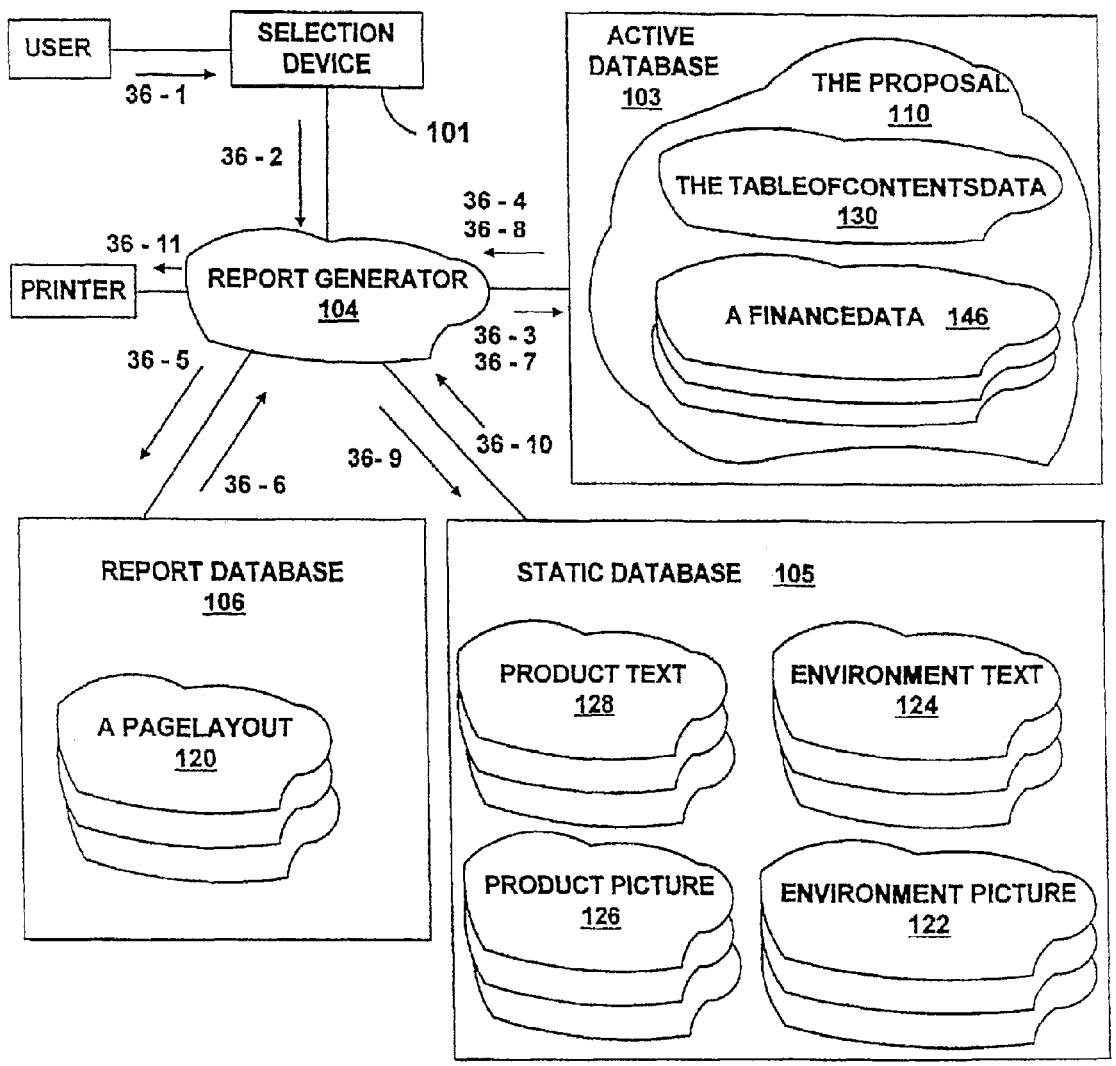
FIG. 36 is an object diagram illustrating a preferred flow of control involved when entering product financing pages.

To initiate the printing of the Finance pages, the user may select "Print" 178 from the main menu 170 of the selection device 101, as shown by step 36-1 of FIG. 36. In response, the selection device 101 preferably sends a print request to the report generator 104, as shown by step 36-2 of FIG. 36. The report generator 104 queries the active database 103 for successive page description records that describe the pages of the printed proposal, as shown by step 36-3 of FIG. 36. The active database 103 typically processes the request by searching the TableOfContentsData object 130 located in the current proposal. If the proposal is to include one or more pages comprising the financing information of a product configuration, the active database 103 may query the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 36-4 in FIG. 36. These PageDescriptionRecord 314 may include a field that contains an identifier that indicates which page layout may be used to format these particular finance pages. The report generator 104 queries the report database 106 for the applicable page layouts 120, as shown by step 36-5 in FIG. 36. The report database 106 returns the relevant page layouts 120 to the report generator 104, as shown by step 36-6 in FIG. 36. Each page layout preferably contains formatting specifications that indicate where specific finance information may appear on the printed page. The report generator 104 reads each format specification to determine the data required at that location on the page.

If the format specifications require data relating to the financing of a product configuration, the report generator 104 queries the active database 103, as shown by step 36-7 in FIG. 36. The active database 103 queries the FinanceData object 146 locates and retrieves the applicable financing information from the FinanceData object 146, and returns this financing information to the report generator 104, as shown by step 36-8 in FIG. 36. If the format specifications require static pictures or text segments, then the report generator 104 preferably retrieves the applicable information from the static database 105 object, as shown by step 36-9 in FIG. 36. The static database 105 will typically return this information to the report generator 104, as shown by step 36-10 in FIG. 36. The report generator 104 preferably repeats this process for each format specification on the page layout, which builds a finance page that is then sent to the printer, as shown by step 36-11 in FIG. 36.

In this fashion, the report generator 104 may print one or more customized and individualized finance pages, along with the predetermined text segments and pictures that correspond with the financing information related to a particular product configuration.

The finance page layouts 120 may specify that the name, address and telephone number or other identification data of the customer appear on the finance pages. The customer information may be initially entered via the CustomerForm object 286. (See FIG. 20). The customer information may be stored in the CustomerData object 136 attached to the proposal.

The report generator 104 reads format specifications from the page layout via the report database 106, as shown by step 21-1 in FIG. 21. When the particular formatting specification in the page layout requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The finance page layouts 120 may specify that the name, address and telephone number of the salesperson appear on the finance pages. The salesperson information may be initially entered by the employer in the ListOfSalesPersonsData object 158 and may be stored in the individual salesperson's SalesPersonData object 134 attached to the proposal. (See FIG. 22). The report generator 104 reads format specifications from the page layout via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 ion FIG. 23.

Proposal: Life Cycle Pages

When the user begins a deal with a customer, the user may want to include one or more individualized Economics pages 248 which comprise the life cycle cost information to be included in the customized, printed proposal that will be prepared for the customer.

The user interface 102 provides means for presenting a series of predetermined queries related to the life cycle cost of product configurations that are of interest to different potential customers who may purchase the product. The user interface 102 also provides means for inputting individualized answers to the predetermined queries, the individualized answers relating to the life cycle cost of product configurations that are of particular interest to the individual customer who is to receive the proposal.

Figure 37:
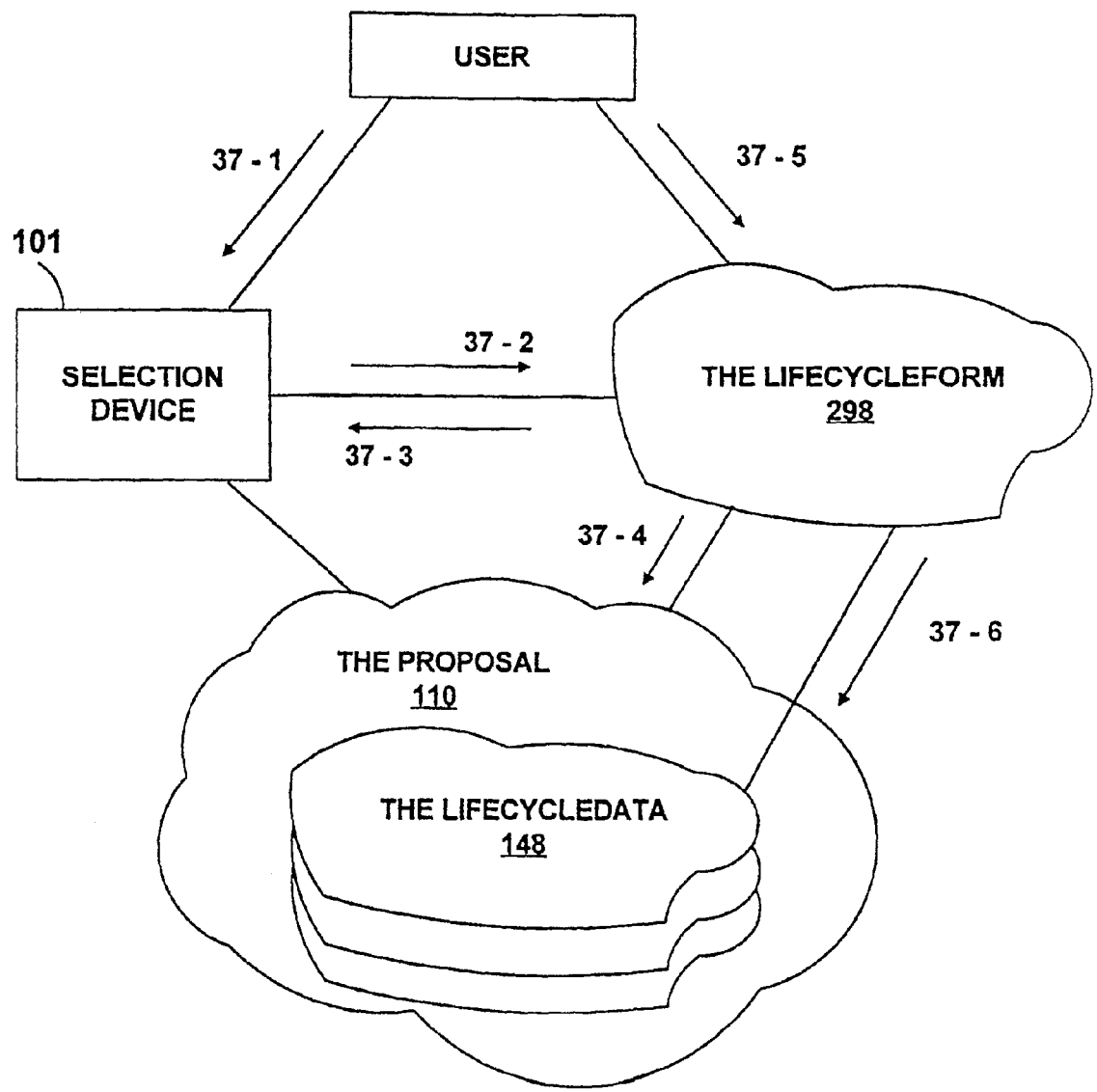
FIG. 37 is an object diagram illustrating a preferred flow of control involved when entering life cycle cost information.

The user may select "Customer Information" 176 from the main menu 170 of the selection device 101, as shown by step 37-1 in FIG. 37. The user may further select "Economics" 212 from the "Customer Information" 176 menu. In response, the selection device 101 preferably sends a load message to the LifeCycleForm object 298, as shown by step 37-2 in FIG. 37. On receipt of the load message, the LifeCycleForm object 298 may display itself in a window within the main window of the selection device 101.

Upon loading itself, the LifeCycleForm object 298 obtains a pointer to a proposal object 110, as shown by step 37-3 in FIG. 37. The LifeCycleForm object 298 then obtains a pointer from the proposal object 110 to a LifeCycleData object 148, as shown by step 37-4 in FIG. 37.

The LifeCycleForm object 298 presents a user interface 102 to the user typically comprising text entry fields and predetermined questions for the user, as shown by step 37-5 in FIG. 37. This user interface 102 provides means for inputting individualized answers to the predetermined queries, the individualized answers relating to the life cycle cost of a product configuration that is of particular interest to the individual customer who is to receive the proposal. The predetermined questions allow the user to select one of a list of predetermined answers that correspond to the life cycle cost relating to a product configuration that is of particular interest to the customer who is to receive the proposal. The life cycle cost information gathered by the LifeCycleForm object 298 is then stored in the LifeCycleData object 148 which is attached to the current proposal object 110, as shown by step 37-6 in FIG. 37. The user may wish to compare the life cycle costs of different product configurations. This comparison may be accomplished by repeating the process described above and in FIG. 37 to create multiple LifeCycleData objects 148.

The user may decide to generate a customized, printed proposal that includes one or more Economics pages 248 comprising the life cycle cost. To include these life cycle Economics pages 248, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user then selects the desired life cycle pages, Economics 248, from a list of pages that are available for inclusion in the printed proposal, as shown by step 18-5 of FIG. 18. The selected pages may be stored as PageDescriptionRecord 314 in a TableOfContentsData object 130, as shown by step 18-6 of FIG. 18. These PageDescriptionRecord 314 typically include a field that contains an identifier that indicates which page layout may be used to format each Economics 248 page. The page layout may determine the content and appearance of the final printed page. The page layouts 120 may be stored in the report database 106.

Figure 38:
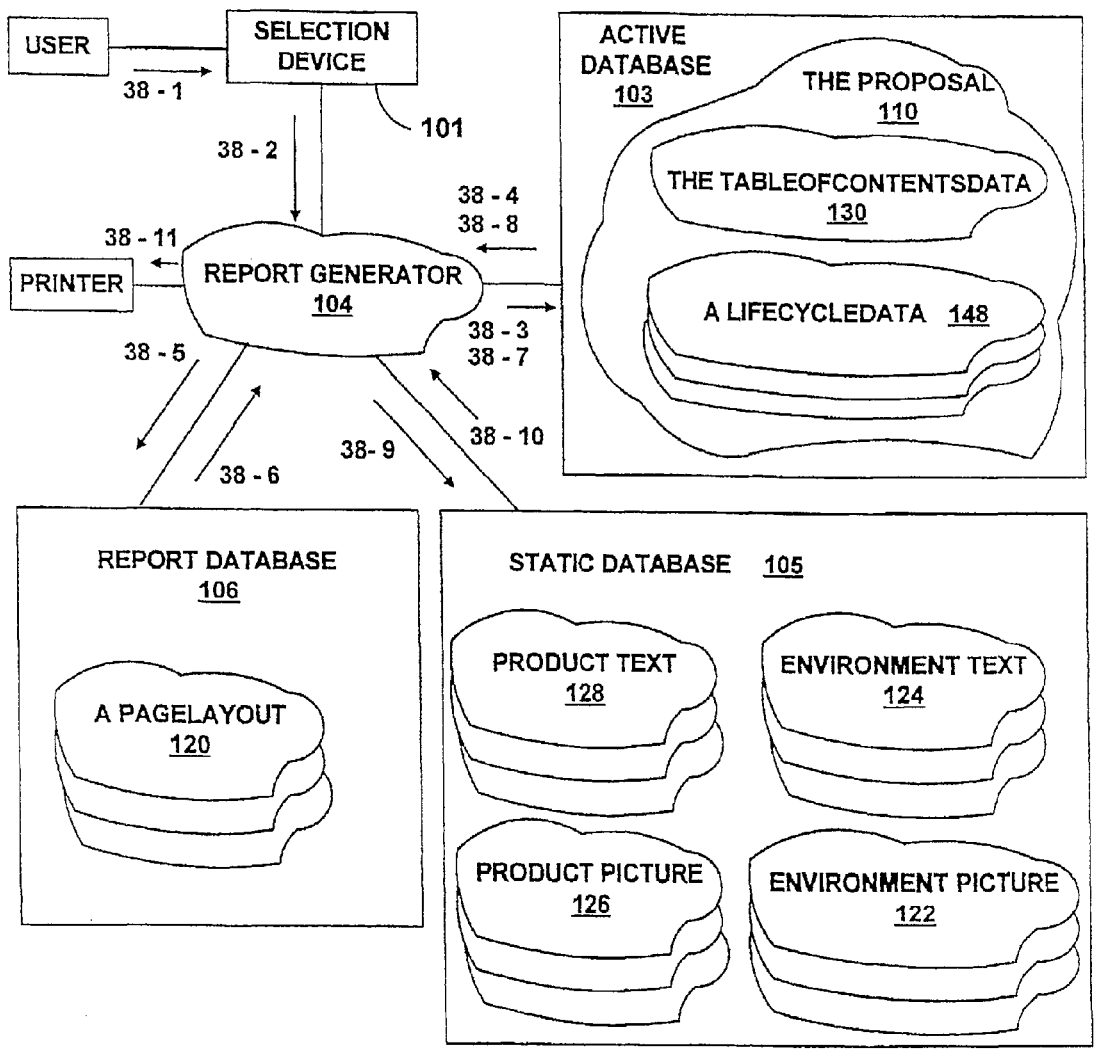
FIG. 38 is an object diagram illustrating a preferred flow of control involved when generating life cycle cost pages.

To initiate the printing of the life cycle economics pages 248, the user may select "Print" 178 from the main menu 170 of the selection device 101, as shown by step 38-1 of FIG. 38. In response, the selection device 1011 preferably sends a print request to the report generator 104, as shown by step 38-2 of FIG. 38. The report generator 104 queries the active database 103 for successive page description records that describe the pages of the printed proposal, as shown by step 38-3 of FIG. 38. The active database 103 typically processes the request by searching the TableOfContentsData object 130 located in the current proposal. If the proposal is to include one or more pages comprising the life cycle cost of a product configuration, the active database 103 queries the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 38-4 in FIG. 38. These PageDescriptionRecord 314 may include a field that contains an identifier that indicates which page layouts 120 may be used to format these particular life cycle pages. The report generator 104 queries the report database 106 for the applicable page layouts 120, as shown by step 38-5 in FIG. 38. The report database 106 returns the relevant page layouts 120 to the report generator 104, as shown by step 38-6 in FIG. 38.

Each page layout preferably contains formatting specifications that indicate where specific life cycle information may appear on the printed page. The report generator 104 may read each format specification to determine the data required at that location on the page.

If the format specifications require data relating to the life cycle of a product configuration, the report generator 104 preferably queries the active database 103, as shown by step 38-1 in FIG. 38. The active database 103 queries the LifeCycleData object 148 locates and retrieves the applicable life cycle information from the LifeCycleData object 148, and returns this life cycle information to the report generator 104, as shown by step 38-8 in FIG. 38.

If the format specifications require static pictures or text segments, then the report generator 104 preferably retrieves the applicable information from the static database 105 object, as shown by step 38-9 in FIG. 38. The static database 105 may return this information to the report generator 104, as shown by step 38-10 in FIG. 38. The report generator 104 typically repeats this process for each format specification on the page layout, which builds a life cycle page that is then sent to the printer, as shown by step 38-11 in FIG. 38.

In this fashion, the report generator 104 may print one or more customized and individualized life cycle pages, along with the predetermined text segments and pictures that correspond with this specified life cycle cost of a product configuration.

The life cycle page layouts 120 may specify that the name, address and telephone number or other identification data of the customer appear on the life cycle pages. The customer information may be initially entered via the CustomerForm object 286. (See FIG. 20). The customer information may be stored in the CustomerData object 136 attached to the proposal. The report generator 104 reads format specifications from the page layouts 120 via the report database 106, as shown by step 21-1 in FIG. 21. When the particular formatting specification in the page layout requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The life cycle page layouts 120 may specify that the name, address and telephone number of the salesperson appear on the life cycle pages. The salesperson information may be initially entered by the employer in the ListOfSalesPersonsData object 158 and may be stored in the individual salesperson's SalesPersonData object 134 attached to the proposal. (See FIG. 22). The report generator 104 reads format specifications from the page layout via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Table of Contents Page

When the user begins a deal with a customer, the user may want to include in the proposal a Table of Contents 252 page as part of the proposal. To include the Table of Contents 252 page, the user may select Contents 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 139, as shown by step 18-4 of FIG. 18. The user may then select the "Table of Contents" page from a list of pages that are available for inclusion in the printed proposal, as shown by step 18-5 of FIG. 18. The selected page may be stored as a PageDescriptionRecord 314 in a TableOfContentsData object 130, as shown by step 18-6 of FIG. 18. In other words, the PageDescription record for the "Table Of Contents" page is stored in the TableOfContentsData object 130, as it is one of the pages to be printed in the proposal. These PageDescriptionRecord 314 typically include a field that contains an identifier that indicates which page layout may be used to format each price quotation page. The page layout may determine the content and appearance of the final printed page. The page layout may be stored in the report database 106.

Figure 39:
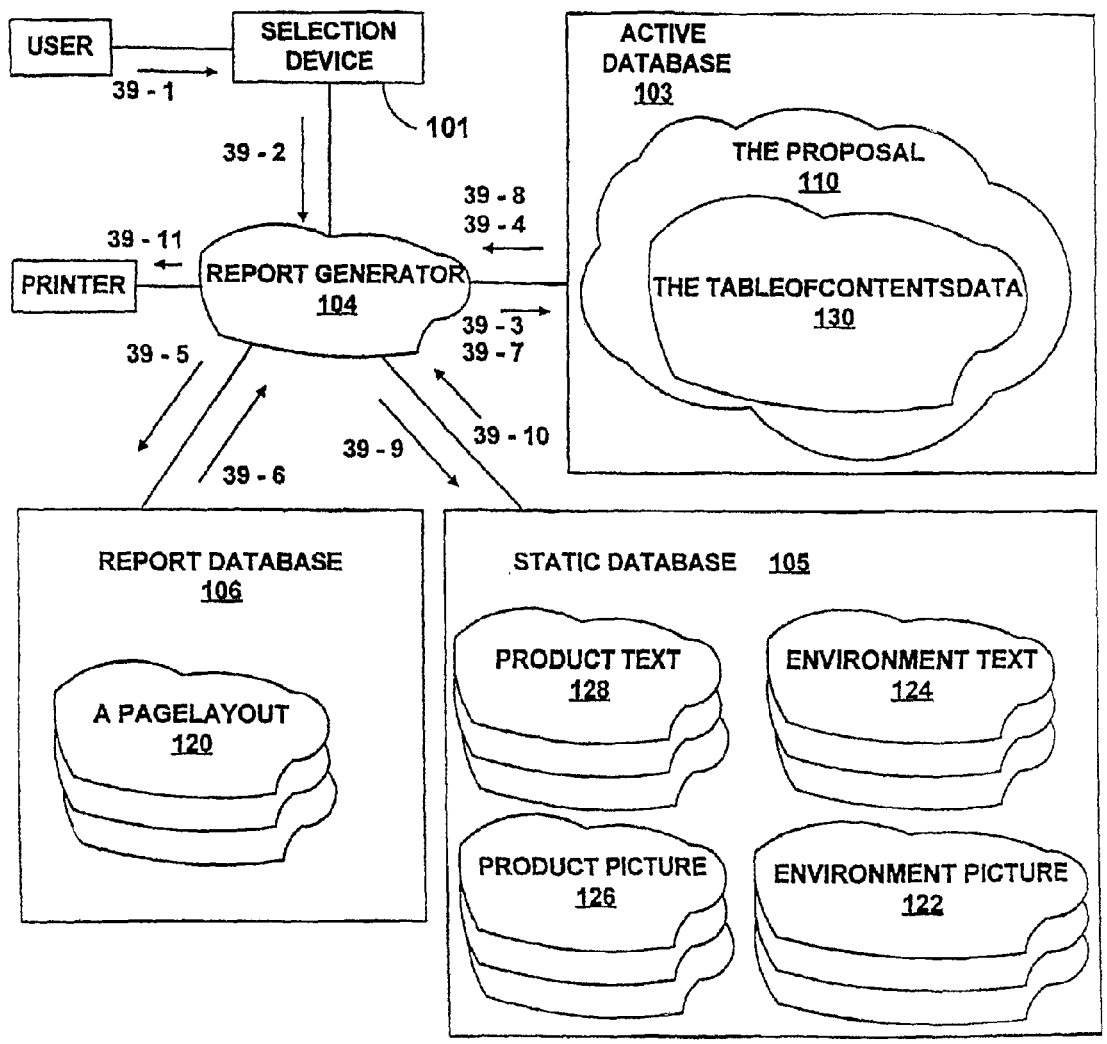
FIG. 39 is an object diagram illustrating a preferred flow of control involved when generating a table of contents page.

To initiate the printing of the Table of Contents 252 page, the user may select "Print" 178 from the main menu 170 of the selection device 101, as shown by step 39-1 of FIG. 39. In response, the selection device 101 preferably sends a print request to the report generator 104, as shown by step 39-2 of FIG. 39. The report generator 104 queries the active database 103 for successive page description records that describe the pages of the printed proposal, as shown by step 39-3 of FIG. 39. The active database 103 processes the request by searching the TableOfContentsData object 130 located in the current proposal. If the proposal is to include a Table of Contents 252 page, the active database 103 queries the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 39-4 in FIG. 39. These PageDescriptionRecord 314 may include a field that contains an identifier that indicates which page layout may be used to format the Table of Contents 252 page. The report generator 104 queries the report database 106 for the applicable page layouts 120, as shown by step 39-5 in FIG. 39. The report database 106 returns the relevant page layouts 120 to the report generator 104, as shown by step 39-6 in FIG. 39.

Each page layout preferably contains formatting specifications that indicate where specific Table of Contents 252 information may appear on the printed page. The report generator 104 reads each format specification to determine the data required at that location on the page. If the format specifications require data relating to the Table of Contents 196 of the proposal, the report generator 104 queries the active database 103 for the Table of Contents 196 information, as shown by step 39-7 in FIG. 39. The active database 103 preferably retrieves the Table of Contents 196 information from the TableOfContentsData object 130 and return this information to the report generator 104, as shown by step 39-8 in FIG. 39.

If the format specifications require static pictures or text segments, then the report generator 104 preferably retrieves the applicable information from the static database 105 object, as shown by step 39-9 in FIG. 39. The static database 105 may return this information to the report generator 104, as shown by step 39-10 in FIG. 39. The report generator 104 typically repeats this process for each format specification on the page layout 120, which builds a Table of Contents 252 page that is then sent to the printer, as shown by step 39-11 in FIG. 39. In this fashion, the report generator 104 may print one or more customized and individualized Table of Contents 252 pages.

The Table of Content 252 page layouts 120 may specify that the name, address and telephone number or other identification data of the customer appear on the Table of Contents 252 pages. The customer information may be initially entered via the CustomerForm object 286. (See FIG. 20). The customer information may be stored in the CustomerData object 136 attached to the proposal.

The report generator 104 reads format specifications from the page layout 120 via the report database 106, as shown by step 21-1 in FIG. 21. When the particular formatting specification in the page layout 120 requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The Table of Contents 252 page layouts may specify that the name, address and telephone number of the salesperson appear on the Table of Contents 252 pages. The salesperson information may be initially entered by the employer in the ListOfSalesPersonsData object J58 and stored in the individual salesperson's SalesPersonData object 134 attached to the proposal. (See FIG. 22). The report generator 104 reads format specifications from the Table of Contents 252 page layout 120 via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Trademark

The system may also print a trademark identifying the product on at least one of the pages of the customized printed proposal. If a trademark is to appear on a page, the page layout 120 for that page will preferably contain a format specification that specifies the trademark and its location on the page. The report generator 104 queries the report database 106 for each page layout 120, as shown by step 40-1 in FIG. 40.

Figure 40:
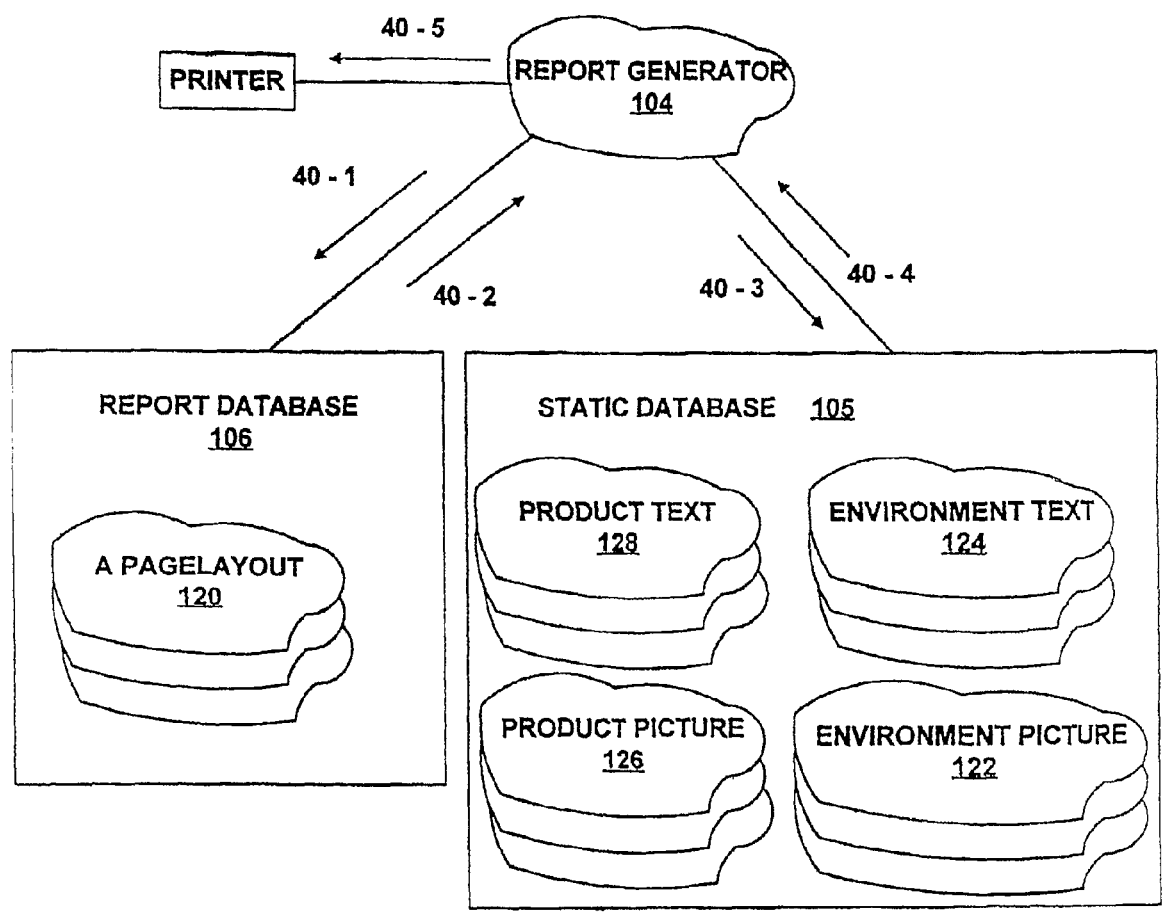
FIG. 40 is an object diagram illustrating a preferred flow of control involved when printing a trademark.

The report database 106 returns each page layout 120, as shown by step 40-2 in FIG. 40. If the page layout 120 contains a format specification requiring a trademark picture, then the report generator 104 may retrieve the trademark picture from the static database 105 object, as shown by step 40-3 in FIG. 40. The static database 105 may return this picture to the report generator 104, as shown by step 40-4 in FIG. 40. The report generator 104 may include the trademark picture when it builds the page to be printed. The report generator 104 typically builds the page using this information and sends it to the printer, as shown by step 40-5 in FIG. 40.

Proposal: Printing Language

The user interface 102 provides means for presenting a series of predetermined queries related to the language in which the user interface 102 should be presented. In addition, the user interface 102 provides means for presenting a series of predetermined queries related to the language in which the proposal should be printed. The user interface 102 is also a means for inputting individualized answers to the predetermined queries, the individualized answers relating to the language of choice for the user interface 102 presentation and for the printed proposal.

Figure 41:
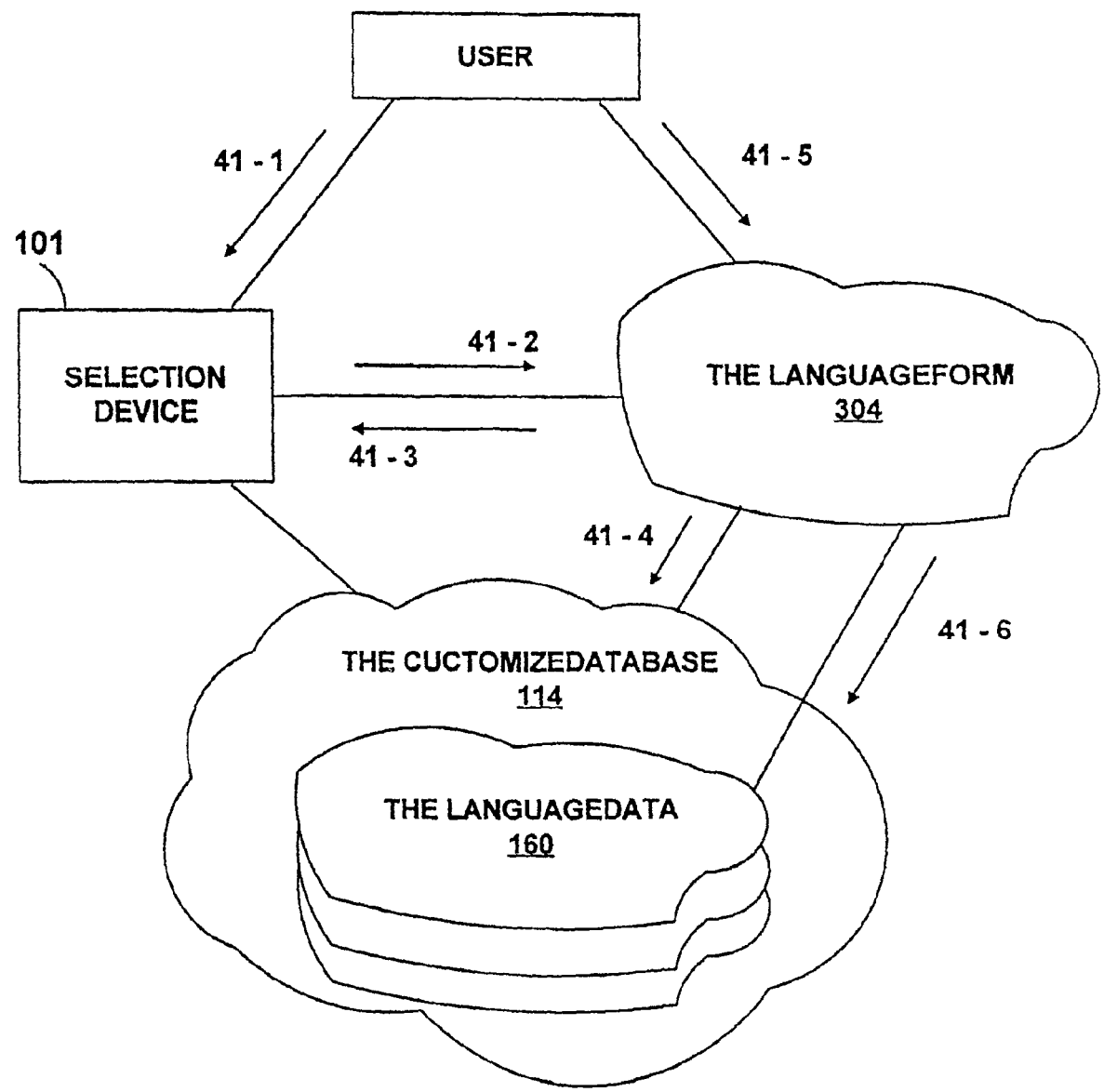
FIG. 41 is an object diagram illustrating a preferred flow of control involved when choosing a language.

The user may select customized menu selection 177 from the main menu 170 of the selection device 101, as shown by step 41-1 in FIG. 41. The user may further select "International" from the customized menu selection 177. In response, the selection device 101 preferably sends a load message to the LanguageForm object 304, as shown by step 41-2 in FIG. 41. On receipt of the load message, the LanguageForm object 304 may display itself in a window within the main window of the selection device 101.

Upon loading itself, the LanguageForm object 304 obtains a pointer to a customized database 114, as shown by step 41-3 in FIG. 41. The LanguageForm object 304 then obtains a pointer from the customized database 114 to a LanguageData object 160, as shown by step 41-4 in FIG. 41.

The LanguageForm object 304 presents a user interface 102 to the user typically comprising text entry fields and predetermined questions for the user, as shown by step 41-5 in FIG. 41. This user interface 102 provides means for inputting individualized answers to the predetermined queries, the individualized answers relating to the language for presenting the user interface 102 and the language for printing the proposal. The language information gathered by the LanguageForm object 304 may then be stored in the LanguageData object 160 which is attached to the customized database 114, as shown by step 41-6 in FIG. 41.

The user interface 102 max further comprise means for displaying forms in anyone of a plurality of languages. Upon receiving a load message, a form may query the LanguageData object 160 in the customized database 114 in the active database 103 to determine the language in which it should display itself. The form may then display itself in the specified language.

The system may also generate the printed proposal in anyone of a plurality of languages. Upon receiving a print message, the report generator 104 may query the LanguageData object 160 in the customized database 114 in the active database 103 to determine the language in which it should print the proposal. The report generator 104 will then preferably query the static database 105 for pictures and text that are in the appropriate language. The report generator 104 typically builds each page using pictures and text in the specified language and sends it to the printer.

Proposal: Signature Page

The user may decide to generate a customized, printed proposal that includes a Signature page as part of the proposal. To include this Signature page, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the desired Signature page from a list of pages that are available for inclusion in the printed proposal, as shown by step 18-5 of FIG. 18. The selected page may be stored as a PageDescription record in TableOfContentsData object 130, as shown by step 18-6 of FIG. 18. This PageDescription record preferably includes a field that contains an identifier that indicates which page layout 120 may be used to format the Signature page. The page layout 120 may determine the content and appearance of the final printed page. The page layouts 120 may be stored in the StaticData object, accessible through the report database 106.

Figure 42:
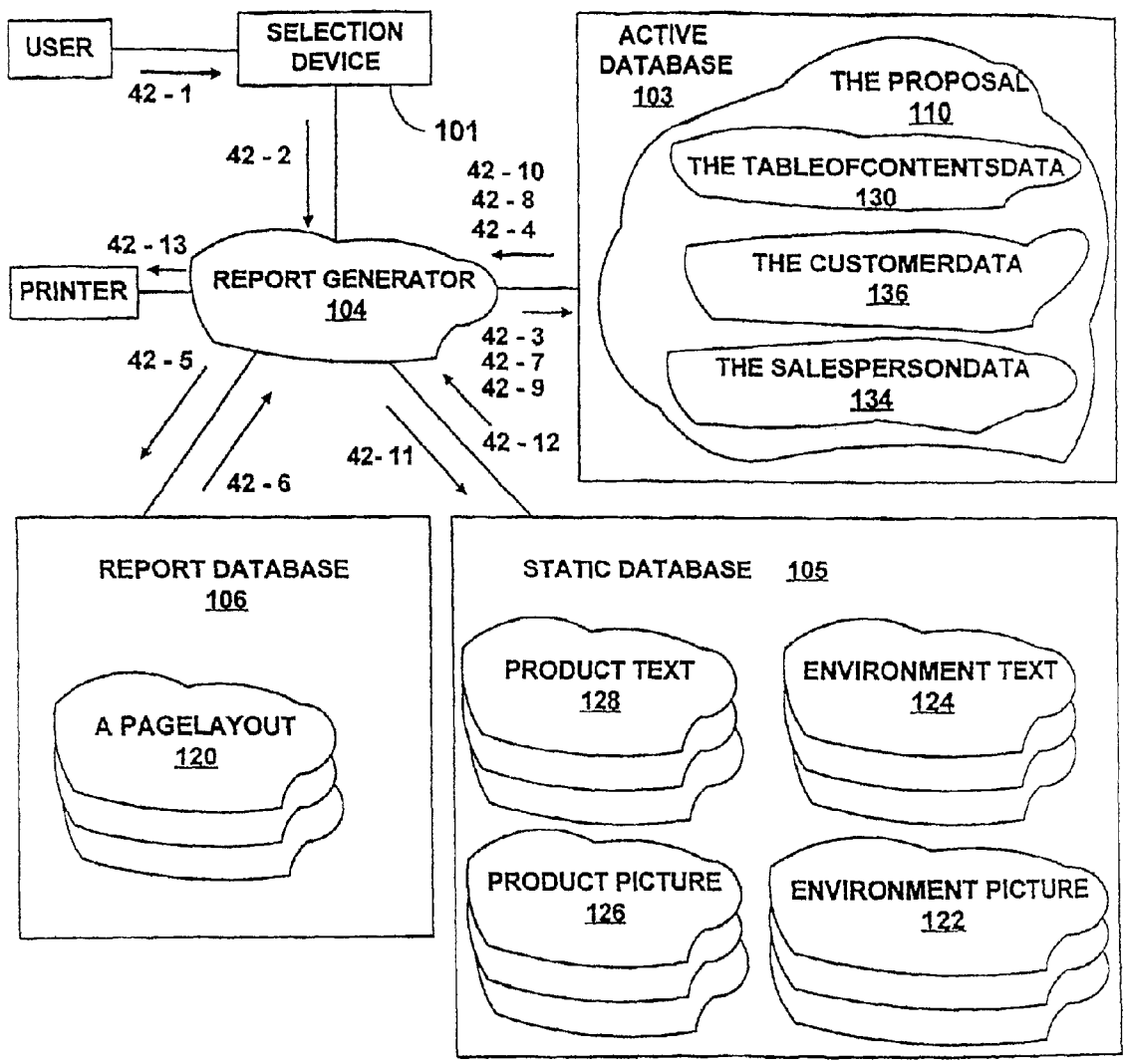
FIG. 42 is an object diagram illustrating a preferred flow of control involved when generating a signature page.

To initiate the printing of the Signature page, the user may select "Print" 178 from the main menu 170 of the selection device 1001, as shown by step 42-1 of FIG. 42. In response, the selection device 101 preferably sends a print request to the report generator 104, as shown by step 42-2 of FIG. 42. The report generator 104 queries the active database 103 for successive page description records that describe the pages of the printed proposal, as shown by step 42-3 of FIG. 42. The active database 103 processes the request by searching the TableOfContentsData object 130 located in the current proposal.

If the proposal is to include a Signature page, the active database 103 queries the TableOfContentsData object 130 for the applicable PageDescription record. The TableOfContentsData object 130 returns the relevant PageDescription record to the active database 103. The active database 103 then sends the relevant PageDescription record to the report generator 104, as shown by step 42-4 in FIG. 42.

This PageDescription record may include a field that contains an identifier that indicates which page layout 120 may be used to format this particular Signature page. The report generator 104 queries the report database 106 for the applicable page layout 120, as shown by step 42-5 in FIG. 42. The report database 106 returns the relevant page layout 120 to the report generator 104, as shown by step 42-6 in FIG. 42. The page layout 120 preferably contains formatting specifications that indicate where specific information may appear on the printed page. The report generator 104 reads each format specification to determine the data required at that location on the page. The report generator 104 typically repeats this process for each format specification in the page layout 120.

The Signature page layout 120 may specify that the customer's name, address, telephone number or other identification data is to appear on the Signature page. If the format specification in the page layout 120 requires the customer's name, address, telephone number or other identification data, the report generator 104 sends a request to the active database 103 for the specified customer information, as shown by step 42-7 in FIG. 42. The active database 103 obtains the specified customer information from the CustomerData object 136 stored within the current proposal object 110. The active database 103 then returns this information to the report generator 104, as shown by step 42-8 in FIG. 42.

The Signature page layout 120 may specify that the name, address and telephone number or other identification data of the salesperson is to appear on the Signature page. If the format specification specifies the salesperson's name, address and telephone number, or other identification data, the report generator 104 sends a request to the active database 103 for the specified salesperson information, as shown by step 42-9 in FIG. 42. The active database 103 obtains this salesperson information from the SalesPersonData object 134 in the proposal and returns this salesperson information to the report generator 104, as shown by step 42-10 in FIG. 42.

If the format specifications require static pictures or text segments, then the report generator 104 preferably requests the applicable information from the static database 105, as shown by step 42-11 in FIG. 42. The static database 105 returns the requested information to the report generator 104, as shown in step 42-12 in FIG. 42. The report generator 104 repeats this process for each format specification on the page layout 120, which builds a signature page that is then sent to the printer, as shown by step 42-13 in FIG. 42.

In this fashion, the report generator 104 may print a customized and individualized signature page, along with any predetermined text segments and pictures that may relate to the product configuration that is of particular interest to the customer who is to receive the proposal.

While the present invention has been described in connection with the preferred embodiment thereof, it will be understood that many modifications will be readily apparent to those skilled in the art, and this application is intended to cover any adaptations or variations thereof. It is manifestly intended that this invention be limited only by the claims and equivalents thereof.

What is claimed is:

1. A computer system for facilitating sales of a product to a user, the computer system comprising:
   a user interface configured to query the user regarding product interests of the user;
   a selection device operatively connected to the user interface, and configured to present a customized proposal to the user based on the user's product interests;
   an active database operatively connected to the selection device, and configured to store the user's product interests;
   a report database operatively connected to the selection device, and configured to store a plurality of page layouts;
   a static database operatively connected to the selection device, and configured to store product information;
   a difference database operatively connected to the static database, wherein the difference database stores update information configured for transmittal to the static database; and
   a report generator operatively connected to the active database, the report database, the selection device, and the static database, and configured to link page layout identifiers with particular data that appear in the customized proposal, wherein the customized proposal includes at least one item based upon the user's product interests, and wherein the at least one item includes at least one of: a product picture, an environment picture, and a text portion.

2. The computer system of claim 1, wherein the user interface is configured to query the user regarding interests of the user.

3. The computer system of claim 2, wherein the query includes at least one of the following query portions: a first query portion regarding selecting the product, a second query portion regarding an intended use for the product, a third query portion regarding a request for technical information, and a fourth query portion regarding selecting a product option by the user.

4. The computer system of claim 1, wherein the selection device is configured to create a proposal for the user by using information regarding interests of the user obtained via the user interface.

5. The computer system of claim 4, wherein the proposal includes at least one product picture, at least one environment picture, and at least one text portion based upon information regarding interests of the user obtained via the user interface.

6. The computer system of claim 1, wherein the active database is configured to store information regarding interests of the user obtained via the user interface.

7. The computer system of claim 6, wherein the information stored in the active database includes information received from the user in response to at least one of the following query portions: a first query portion regarding selecting the product, a second query portion regarding an intended use for the product, a third query portion regarding a request for technical information, and a fourth query regarding a selection of a product option by the user.

8. The computer system of claim 1, wherein the report database stores a plurality of page layouts.

9. The computer system of claim 8, wherein at least one of the page layouts is configured to display a product picture of a product selected by the user, an environment picture of an environment selected by the user, and a text portion, wherein the text portion is associated with at least one of the product and the environment.

10. The computer system of claim 1, wherein the static database stores a plurality of product pictures, a plurality of environment pictures, and a plurality of text portions, wherein each text portion is associated with at least one of a product and a environment.

11. The computer system of claim 10, wherein the static database further stores a plurality of product technical detail specifications, a plurality of price specifications, and a plurality of life cycle specifications.

12. The computer system of claim 1, wherein the report generator is configured to:
read a page layout from the report database,
read a product picture, an environment picture, and a text portion selected by the selector from the static database based upon information from the active database, and
generate a report by inserting the product picture, the environment picture, and the text portion into the page layout.

13. The computer system of claim 12, wherein the report generator is further configured to:
insert salesperson information into the report, and
transmit the report.

14. The computer system of claim 1, wherein the at least one item based upon the user's product interests includes a product picture, an environment picture, and a text portion.

15. The computer system of claim 1, wherein the query of the user interface comprises the following query portions: a first query portion regarding selecting the product, a second query portion regarding an intended use for the product, a third query portion regarding a request for technical information, and a fourth query portion regarding selecting a product option by the user.

16. The computer system of claim 1, wherein the selection device is further configured to create a proposal for the user by using information regarding interests of the user obtained via the user interface, and wherein the proposal includes at least one product picture, at least one environment picture, and at least one text portion based upon information regarding interests of the user obtained via the user interface.

17. The computer system of claim 1, wherein the active database is further configured to store information regarding interests of the user obtained via the user interface, and wherein the information stored in the active database includes information received from the user in response to at least one of the following query portions: a first query portion regarding selecting the product, a second query portion regarding an intended use for the product, a third query portion regarding a request for technical information, and a fourth query regarding a selection of a product option by the user.

18. The computer system of claim 1, wherein at least one of the page layouts of the report database is configured to display a product picture of a product selected by the user, an environment picture of an environment selected by the user, and a text portion, and wherein the text portion is associated with at least one of the product and the environment.

19. The computer system of claim 1, wherein the static database stores a plurality of product pictures, a plurality of environment pictures, and a plurality of text portions, wherein each text portion is associated with at least one of a product and a environment, and wherein the static database further stores a plurality of product technical detail specifications, a plurality of price specifications, and a plurality of life cycle specifications.

20. The computer system of claim 1, wherein the report generator is further configured to: (i) read a page layout from the report database, (ii) read a product picture, an environment picture, and a text portion selected by the selector from the static database based upon information from the active database, (iii) generate a report by inserting the product picture, the environment picture, the text portion, and salesperson information into the page layout, and (iv) transmit the report.

21. A computer system for facilitating sales of a product to a user, the computer system comprising:
a user interface configured to query the user regarding interests of the user, wherein the query comprises the following query portions: a first query portion regarding selecting the product, a second query portion regarding an intended use for the product, a third query portion regarding a request for technical information, and a fourth query portion regarding selecting a product option by the user;
a selection device operatively connected to the user interface, wherein the selection device is configured to create a proposal for the user by using information regarding interests of the user obtained via the user interface, wherein the proposal includes at least one product picture, at least one environment picture, and at least one text portion based upon information regarding interests of the user obtained via the user interface;

an active database operatively connected to the selection device, wherein the active database is configured to store information regarding interests of the user obtained via the user interface, and wherein the information stored in the active database includes information received from the user in response to at least one of the following query portions: a first query portion regarding selecting the product, a second query portion regarding an intended use for the product, a third query portion regarding a request for technical information, and a fourth query regarding a selection of a product option by the user;

a difference database operatively connected to the static database, wherein the difference database stores update information configured for transmittal to the static database;

a report database operatively connected to the selection device, wherein the report database stores a plurality of page layouts, wherein at least one of the page layouts is configured to display a product picture of a product selected by the user, an environment picture of an environment selected by the user, and a text portion, and wherein the text portion is associated with at least one of the product and the environment;

a static database operatively connected to the selection device, wherein the static database stores a plurality of product pictures, a plurality of environment pictures, and a plurality of text portions, wherein each text portion is associated with at least one of a product and a environment, and wherein the static database further stores a plurality of product technical detail specifications, a plurality of price specifications, and a plurality of life cycle specifications; and a report generator operatively connected to the active database, the report database, the selection device, and the static database, wherein the report generator is configured to: (i) read a page layout from the report database, (ii) read a product picture, an environment picture, and a text portion selected by the selector from the static database based upon information from the active database, (iii) generate a report by inserting the product picture, the environment picture, the text portion, and salesperson information into the page layout, and (iv) transmit the report.

22. A method of generating a customized output with a computer system to facilitate a sale of a tangible product, the method comprising:

receiving via a computer system, answers to a plurality of questions related to at least one of a desired feature and a desired use by a customer of a tangible product for sale;

automatically selecting by the computer system, in response to at least one of the answers, an image of the tangible product for sale, an image of an environment in which the tangible product for sale is to be used, and a text segment comprised of a description of product specifications and performances that are of particular interest to the customer; and integrating the selected images and selected text segment into a proposal for the sale of the tangible product for the customer such that a single composite customized output representing the tangible product in the environment in which the tangible product is to be used along with said text segment can be generated, wherein the single composite customized output is generated by a selection device operatively interconnected to an active database, the active database configured to electronically store customer information obtained via the answers, and operatively connected to a static database, the static database electronically storing at least one of (a) text, (b) pictures or (c) text and pictures relating to at least one product; and the computer system dynamically building a template utilizing the selection device to fill in the template to produce the composite customized output.

23. The method of claim 22 further comprising outputting the composite customized output to a user as a customized proposal.

24. The method of claim 23 wherein outputting comprises displaying the composite customized output on a computer display for viewing by the user.

25. The method of claim 23 wherein outputting comprises printing the composite customized output as a printed document.

26. The method of claim 25 wherein outputting further comprises configuring the printed document as a printed proposal.

27. The method of claim 22 wherein the computer system stores a plurality of predetermined environment text segments related to environments in which the tangible product may be used, and the method further comprises linking at least one of the answers with one of the plurality of predetermined environment text segments for inclusion in the composite customized output.

28. The method of claim 22 wherein the computer system stores a plurality of product specifications related to producing the tangible product in a variety of configurations, and the method further comprises linking at least one of the answers with one of the plurality of product specifications for inclusion in the composite customized output.

29. The method of claim 22 wherein the computer system stores a plurality of performance specifications related to performance of the tangible product in a variety of configurations, and the method further comprises linking at least one of the answers with one of the plurality of performance specifications for inclusion in the composite customized output.

30. The method of claim 22 further comprising: presenting a series of predetermined queries related to financing the tangible product; receiving individualized answers to the predetermined queries; and generating, for inclusion in the composite customized output, financing information related to the tangible product.

31. A computer system for generating a customized proposal to facilitate a sale of a tangible product, the system comprising:

a memory system having stored therein images of a tangible product for sale, images of environments in which the tangible product is to be used, and text segments comprising descriptions of product specifications and performances; and a processing system, operatively coupled to the memory system, said processing system configured to automatically select, in response to receipt of at least one answer to one or more questions related to a desired feature and desired use of the product posed to a customer, one of the images of the tangible product, one of the images of the environment in which the tangible product is to be used, and one of the text segments comprised of a description of product specifications and performances that are of particular interest to the customer from those stored in the memory system, and to integrate the selected images and the selected text segment into a proposal for the sale of the product customized to the customer's interests such that a single composite output representing the tangible product in the environment in which it is to be used along with said selected text segment can be generated, wherein the single composite customized output is generated by a selection device operatively connected to (i) an active database configured to electronically store customer information, and (ii) a static database electronically storing at least one of (a) text, (b) pictures, or (c) text and pictures relating to the tangible product; and the computer system dynamically builds a template utilizing the selection device to fill in the template to produce the single composite output.

32. The system of claim 31 wherein the processing system is further configured to provide a user interface to present the single composite output as a visual output to a user of the computer system.

33. The system of claim 31 further comprising a printer communicatively coupled to the processing system and configured to print the single composite output as a printed document.

34. The system of claim 31 wherein the memory system further has stored therein a plurality of predetermined environment text segments related to environments in which the tangible product may be used, and the processing system links at least one of the answers with one of the plurality of predetermined environment text segments.

35. The system of claim 31, wherein the memory further has stored therein a plurality of predetermined product specifications related to producing the tangible product in a variety of configurations, and the processing system links at least one of the answers with one of the plurality of predetermined product specifications for inclusion in the proposal.

36. The system of claim 31, wherein the memory further has stored therein a plurality of predetermined performance specifications related to performance of the tangible product in a variety of configurations, and the processing system links at least one of the answers with one of the plurality of performance specifications for inclusion in the proposal.

37. The system of claim 31 wherein the processing system is further configured to provide a user interface to a user of the computer system, said user interface including a series of predetermined queries related to financing the tangible product and said user interface configured to receive individualized answers to the predetermined queries; and the processing system generates, for inclusion in the proposal financing information related to the tangible product.

38. The system of claim 31 wherein the memory system further has stored therein a plurality of predetermined environment text segments related to environments in which the tangible product may be used, a plurality of predetermined product specifications related to producing the tangible product in a variety of configurations, and a plurality of predetermined performance specifications related to performance of the tangible product in a variety of configurations.

39. A computer-implemented method of generating a customized output to facilitate a sale of a tangible product, the method comprising:

receiving, at a computer system, answers to inquiries intended to determine a customer's desired features for and desired use of a tangible product for sale;

automatically selecting, by the computer system and in response to at least one of the answers, an image of the tangible product for sale, an image of an environment in which the tangible product for sale is to be used, and a text segment comprising a description of product specifications and performances that are of interest to the customer; and generating and displaying, by the computer system, a single composite customized output representing the tangible product in the environment in which the tangible product is to be used along with said text segment, wherein a single composite customized output is:
generated by a selection device operatively connected to (i) an active database configured to electronically store customer information, and (ii) a static database electronically storing at least one of (a) text, (b) pictures, or (c) text and pictures relating to the tangible product;

arranged as a proposal for the sale of the tangible product customized in accordance with the customer's desires; and presented within a template dynamically constructed by the computer system utilizing the selection device.

40. A computer system for generating a customized proposal to facilitate a sale of a tangible product, the system comprising:

a storage system having stored therein images of the tangible product, images of environments in which the tangible product is to be used, and text segments comprising descriptions of product specifications and performances;

a processing system, operatively coupled to the storage system and configured to:
receive information concerning desired features and use of the tangible product by a customer, automatically select from the storage system, in response to receipt of the information, one of the images of the tangible product, one of the images of the environment in which the tangible product is to be used, and one of the text segments that conform to interests of the customer, and generate, using a selection device, a customized sales proposal for the customer that integrates, within a template dynamically constructed by the computer system, selected ones of the images and text segments in a single composite output representing the tangible product in the environment in which it is to be used along with said selected text segment, wherein the selection device is operatively connected to (i) an active database configured to electronically store customer information, and (ii) a static database electronically storing at least one of (a) text, (b) pictures, or (c) text and pictures relating to the tangible product.

* * * * *

UNITED STATES PATENT AND TRADEMARK OFFICE
CERTIFICATE OF CORRECTION

| | | |
|---|---|---|
| PATENT NO. | : 8,121,904 B2 | |
| APPLICATION NO. | : 12/577194 | |
| DATED | : February 21, 2012 | |
| INVENTOR(S) | : Jerome D. Johnson | |

It is certified that error appears in the above-identified patent and that said Letters Patent is hereby corrected as shown below:

Page 3, right column, line 60, change "on" to --in--; and
line 63, change "th" to --the--.

Page 4, left column, line 63, change "Dimensiion" to --Dimension--.

Page 5, left column, line 24, change "Suppiletnental" to --Supplemental--; and
right column, line 14, change "*LLc*" to --*LLC*--.

Page 6, right column, line 15, change "*Dismanting*" to --*Dismantling*--;
line 17, change "Etal." to --et al.--;
line 28, change "*Mitubishi*" to --*Mitsubishi*--; and
line 67, change "Sand" to --San--.

Column 5, line 18, change "customers" to --customer's--; and
line 34, change "anyone" to --any one--.

Column 9, line 44, change "ProposalDatas" to --ProposalData--.

Column 11, line 58, change "anyone" to --any one--.

Column 12, line 9, change "1-30" to --130--; and
line 34, change "13Q" to --130--.

Column 14, line 37, change "1-23" to --23-1--;
line 41, change "2-23" to --23-2--;
line 45, change "3-23" to --23-3--; and
line 48, change "4-23" to --23-4--.

Column 15, line 40, change "Personalized" to --personalized--.

Signed and Sealed this
Nineteenth Day of June, 2012

David J. Kappos
*Director of the United States Patent and Trademark Office*

CERTIFICATE OF CORRECTION (continued)
U.S. Pat. No. 8,121,904 B2

Column 22, line 57, change "Z40" to --240--.

Column 25, line 11, change "die" to "the".

Column 27, line 10, delete "to" (first occurrence).

Column 32, line 54, change "1011" to --101--.

Column 33, line 19, insert a --,-- after "148".

Column 35, line 11, change "return" to --returns--; and
          line 51, change "J58" to --158--.

Column 36, line 59, change "max" to --may--;
          line 60, change "anyone" to --any one--; and
          lines 66-67, change "any-one" to --any one--.

Column 37, line 40, change "1001" to --101--.

Claim 17, column 40, line 27, after "query", insert --portion--.

Claim 21, column 41, line 30, change "a" (second occurrence) to --an--.